US012392919B2

(12) United States Patent
Castrigno et al.

(10) Patent No.: US 12,392,919 B2
(45) Date of Patent: Aug. 19, 2025

(54) FLUID DETECTION SYSTEMS AND METHODS USING THE SAME

(71) Applicant: WATTS REGULATOR CO., North Andover, MA (US)

(72) Inventors: Steven Castrigno, Chester, NH (US); James Erhardt, Bedford, NH (US); Christopher Krause, Haverhill, MA (US)

(73) Assignee: WATTS REGULATOR CO., North Andover, MA (US)

( * ) Notice: Subject to any disclaimer, the term of this patent is extended or adjusted under 35 U.S.C. 154(b) by 0 days.

(21) Appl. No.: 18/265,934

(22) PCT Filed: Dec. 8, 2021

(86) PCT No.: PCT/US2021/062336
§ 371 (c)(1),
(2) Date: Jun. 7, 2023

(87) PCT Pub. No.: WO2022/125618
PCT Pub. Date: Jun. 16, 2022

(65) Prior Publication Data
US 2024/0036226 A1 Feb. 1, 2024

Related U.S. Application Data

(63) Continuation-in-part of application No. 17/115,682, filed on Dec. 8, 2020, now Pat. No. 12,188,213.

(51) Int. Cl.
*G01V 3/02* (2006.01)
(52) U.S. Cl.
CPC ..................................... *G01V 3/02* (2013.01)

(58) Field of Classification Search
CPC ....................................................... G01V 3/02
(Continued)

(56) References Cited

U.S. PATENT DOCUMENTS

| 3,695,104 A | 10/1972 | Mannherz et al. |
| 4,241,752 A | 12/1980 | Ackroyd |

(Continued)

FOREIGN PATENT DOCUMENTS

| EP | 3455596 A1 | 3/2019 |
| WO | 0165212 | 9/2001 |

(Continued)

OTHER PUBLICATIONS

Extended European Search Report from related Application No. 21904305.6, dated Dec. 18, 2023. 8 pages.

(Continued)

*Primary Examiner* — Walter L Lindsay, Jr.
*Assistant Examiner* — Philip T Fadul
(74) *Attorney, Agent, or Firm* — Grossman, Tucker, Perreault & Pfleger, PLLC

(57) ABSTRACT

Fluid detection systems and methods using the same are disclosed. In embodiments the fluid detection systems include a sensor module and an electronics module. The sensor module includes a sensor housing that includes a liquid flow path and a sensor element disposed around at least part of the liquid flow path. The sensor element can detect a capacitance of the liquid flow path and provide a sensor signal to a controller in the electronics module. The electronics module can determine a detected capacitance in the liquid flow path based at least in part on the sensor signal, and can determine whether a wet event has occurred based on a comparison of the detected capacitance to a (Continued)

Exploded View threshold capacitance. Methods using the fluid detection systems and fluid supply systems including the fluid detection systems are also disclosed.

19 Claims, 52 Drawing Sheets

(58) Field of Classification Search
USPC .......................................................... 324/686
See application file for complete search history.

(56) References Cited

U.S. PATENT DOCUMENTS

| | | | |
|---|---|---|---|
| 4,499,640 A | | 2/1985 | Brenton et al. |
| 4,749,988 A | * | 6/1988 | Berman ................ G01F 23/268 |
| | | | 73/304 C |
| 5,181,022 A | | 1/1993 | Schupp |
| 5,291,791 A | | 3/1994 | Lucas et al. |
| 5,421,210 A | | 6/1995 | Kobayashi et al. |
| 5,425,393 A | | 6/1995 | Everett |
| 7,821,411 B1 | * | 10/2010 | Ward .................... G01F 23/266 |
| | | | 340/616 |
| 10,127,790 B2 | | 11/2018 | Doughty et al. |
| 10,373,471 B2 | | 8/2019 | Doughty et al. |
| 10,760,938 B2 | * | 9/2020 | Newman ............... F24F 13/222 |
| 2010/0201118 A1 | | 8/2010 | Anton et al. |
| 2013/0180318 A1 | | 7/2013 | Howard et al. |
| 2014/0239984 A1 | * | 8/2014 | Alameh .................. G01R 1/04 |
| | | | 324/686 |
| 2015/0317895 A1 | * | 11/2015 | Azizgolshani ......... G08B 23/00 |
| | | | 340/606 |
| 2015/0338252 A1 | | 11/2015 | Schmidt et al. |
| 2019/0035252 A1 | | 1/2019 | Doughty et al. |
| 2020/0141773 A1 | | 5/2020 | Burke et al. |
| 2022/0170769 A1 | | 6/2022 | Ebert et al. |
| 2022/0178121 A1 | | 6/2022 | Castrigno |

FOREIGN PATENT DOCUMENTS

| | | |
|---|---|---|
| WO | 2017197021 A1 | 11/2017 |
| WO | 2020023586 | 1/2020 |

OTHER PUBLICATIONS

Office Action from corresponding U.S. Appl. No. 17/115,682, dated Sep. 28, 2022. 15 pages.
"Avoid the Call at 3 a.m. When your Mechanical Room is Underwater!", PF-ACV Flood Protection 1425, A Watts Water Technologies Company, 2014, 2 pages.
Gangl, et al, "Influence of Measurement Inaccuracies at a Storage Tank on Water Losses", IWA Water Loss Conference 2007, Bucharest, Conference Proceedings vol. II, pp. 474-484.
"Electromagnetic Flow Meter", Flow Knowledge, Keyence America, May 29, 2018, https://www.keyence.com/ss/products/process/flowknowledge/types/electromagnetic.jsp., pp. 1-5.
International Preliminary Report on Patentability from corresponding PCT Appln. No. PCT/US21/62336, dated Feb. 18, 2022, 9 pages.
Office Action from corresponding U.S. Appl. No. 17/115,682, dated Sep. 2, 2022. 12 pages.
Final Office Action from corresponding U.S. Appl. No. 17/115,682, dated Apr. 12, 2023. 14 pages.
International Search Report and Written Opinion from corresponding PCT Appln. No. PCT/US21/62336, dated Dec. 8, 2020. 12 pages.
Office Action from related Australian Appln. No. 2021394753, dated Jun. 24, 2023. 3 pages.
WATTS Engineering Specification, Air Gaps, Elbows, and Test Cocks For Reduced Pressure Zone Assemblies, 2023, 2 pages.
WATTS Engineering Specification, Series 957, 957N, 957Z Reduced Pressure Zone Assemblies, 2020, 4 pages.
WATTS Engineering Specification, Series LF909 Reduced Pressure Zone Assembly, 2023, pp. 1-4.
WATTS Installation, Maintenance, and Repair Manual Series 909, LF909, 909RPDA Reduced Pressure Zone Assemblies Reduced Pressure Detector Assemblies, 2023, pp. 1-8.
U.S. Appl. No. 18/407,136 filed at the United States Patent and Trademark Office, Jan. 8, 2024, 25 pages.

* cited by examiner

Inlet Side

Outlet Side

Left Side

Right Side

Bottom Side

Top Side

Sensor Cover Removed

Perspective Cross Section Cover Removed

Exploded

Partial Exploded

Sensor Cover Front

Sensor Cover Rear

Sensor Base Top

Sensor Base Bottom

Sensor Element Detail

Sensor Housing Perspective View

Exploded View

Sensor Cover Top Perspective View

Sensor Cover Bottom Perspective View

Sensor Base Top Perspective View

Sensor Base Bottom Perspective View

Base Part Perspective with Sensor

Base Part Perspective with Sensor Separate

Base Part Side View (Sensor Element Removed)

Base Part Cross Section (A-A)

Electronics Module Top Perspective View

Partial Assembly Perspective View

Sensor Housing Bottom View

Sensor Housing Top View

Sensor Housing Left Side View

Sensor Housing Right Side View

Sensor Housing Back View

Sensor Housing Front View

Sensor Housing Back Left Perspective

Sensor Cover with Base Removed

Sensor Element

Sensor Base Perspective

Electronics Module Front Perspective

Electronics Module Rear Perspective

Partial Assembly Perspective View

Sensor Cover with Sensor Installed

Sensor Element

Sensor Cover Top View

Sensor Cover Bottom View

Sensor Cover Front View

Sensor Cover Side View

Sensor Housing

Exploded View

Sensor Base Front View

Sensor Base Side View

Sensor Base Top View

Sensor Base Bottom View

Perspective Exploded View

Electronics Module

FLUID DETECTION SYSTEMS AND METHODS USING THE SAME

CROSS-REFERENCE TO RELATED APPLICATIONS

This application is a U.S. National Stage Application of PCT/US21/62336 filed 8 Dec. 2021, and claims priority to U.S. application Ser. No. 17/115,682, filed Dec. 8, 2020, the entire contents both of which are incorporated herein by reference.

TECHNICAL FIELD

The present disclosure relates to fluid detection systems and methods using the same. In particular, the present disclosure relates to fluid detection systems for use with fluid supply equipment such as backflow prevention devices and relief valves.

BACKGROUND

Fluid supply systems are often configured to convey fluid (e.g., water) from a pressurized source to a destination, such as a building or other structure. For example, buildings often include a water supply system that is configured to receive a pressurized supply of water from a municipal water supply, and to convey water to various outlets such as toilets, faucets, fire prevention systems, etc., within the building. When the water is provided at a sufficient pressure, it will be pressurized against and can flow through the outlets in a forward direction. If pressure is lost or reduced below a threshold amount, however, a "backflow" condition may arise in which the water flows backwards toward the source. As fluid backflow may contaminate the source, technologies such as backflow preventers have been developed to limit or prevent fluid backflow.

FIG. 1 depicts one example of a fluid supply system 100 that includes a backflow preventer. System 100 includes a strainer 101 that is includes an inlet 103 that receives a fluid (e.g., water) from a supply, such as a municipal water supply. Strainer 101 is coupled to an inlet side of backflow preventer 105. The outlet side of backflow preventer 105 is coupled to a proximal end of a supply pipe 111. Backflow preventer includes an upstream shutoff valve 107, a double check valve assembly (DCVA) 108, and a downstream shutoff valve 109. The distal end of supply pipe 111 conveys water to a destination, such as a building. Backflow preventer 105 is also coupled to a discharge pipe 113. In normal operation fluid such as water is conveyed under pressure from the supply to inlet 103. The pressure from the supply sufficiently biases the fluid in the forward direction to keep the check valves in DCVA 108 open and allow the fluid to flow through pipe 111 to the destination/building in a forward direction. When pressure is lost upstream of backflow preventer 105, however, one or both of the check valves in DCVA 108 will close to prevent backflow of fluid into the supply.

Backflow preventer 105 may operate in a normal (flow) condition for many years without any backflow events. During that time, mechanical components within backflow preventer 105 may corrode or otherwise degrade such that they might not function as intended during a backflow event. For example, one or more of the double check valves in DCVA 108 may not fully close during a backflow event, resulting in leakage of back flowing fluid. To address that issue backflow preventer 105 is fluidly coupled to a discharge pipe 113, and is configured to direct fluid leaking through DCVA 108 in a backflow condition to discharge pipe 113 such that the leaking fluid does not enter the supply. While redirecting leaking fluid into discharge pipe 113 can prevent contamination of the supply, the discharge of fluid from discharge pipe 113 may be problematic. For example, fluid discharged from discharge pipe 113 may flood the surrounding environment, which may cause substantial damage—particularly when the outlet of discharge pipe 113 is within a mechanical room of a building.

Systems have been developed to detect fluid flow through a discharge flow path, such as may occur during a backflow event. FIG. 2. illustrates one such system. System 200 includes a gate valve 201, a strainer 101, an automatic valve control 203, a backflow preventer 105, a flow sensor 212, and a controller 217. Under normal operation, pressurized fluid is provided by a supply and flows/is pressured in a forward direction through the gate valve 201, strainer 101, automatic valve control 203, and backflow preventer 105. Like system 100, backflow may occur when pressure is lost upstream of backflow preventer 105, but such backflow may be stopped or substantially stopped by backflow preventer 105. Back flowing fluid that that may leak through backflow preventer 105 (i.e., leakage fluid) may be directed into a discharge pipe 113, where it may flow through an air gap 205, into a vertical discharge conduit 207, and then into a horizontal discharge conduit 209.

System 200 further includes a flow detector 211 coupled in-line with horizontal discharge conduit 209. Flow detector 211 includes a flow sensor 212 that includes one or more probes 213 that extend into a discharge flow path 215. Flow sensor 212 is generally configured to monitor the voltage of probes 213 in order to determine whether there is liquid within discharge flow path 215 that is coupled in line with horizontal discharge conduit 209. If liquid is detected in discharge flow path 215, controller may cause automatic valve control 203 to actuate one or more gate valves to physically prevent liquid flow toward and/or from the supply, toward and/or from the building, or both.

Although effective, flow detector 211 is not without certain limitations. For example, probes 213 of flow detector 211 must extend into and thus partially obstruct discharge flow path 215, which may be undesirable. Moreover, due to the nature of probes 213, flow detector 211 needs to be installed into a horizontal length of discharge flow path 215. This can impose a meaningful limitation on the manner in which system 200 may be configured within a mechanical room or other confined space. The orientation of probes 213 may also make it difficult for flow detector 211 to detect relatively small flows of fluid within discharge conduit, particularly if the fluid flow is insufficient to cause the fluid to contact probes 213.

A need therefore remains in the art for improved technologies for detecting fluid within a flow path. The present disclosure is aimed at that need.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
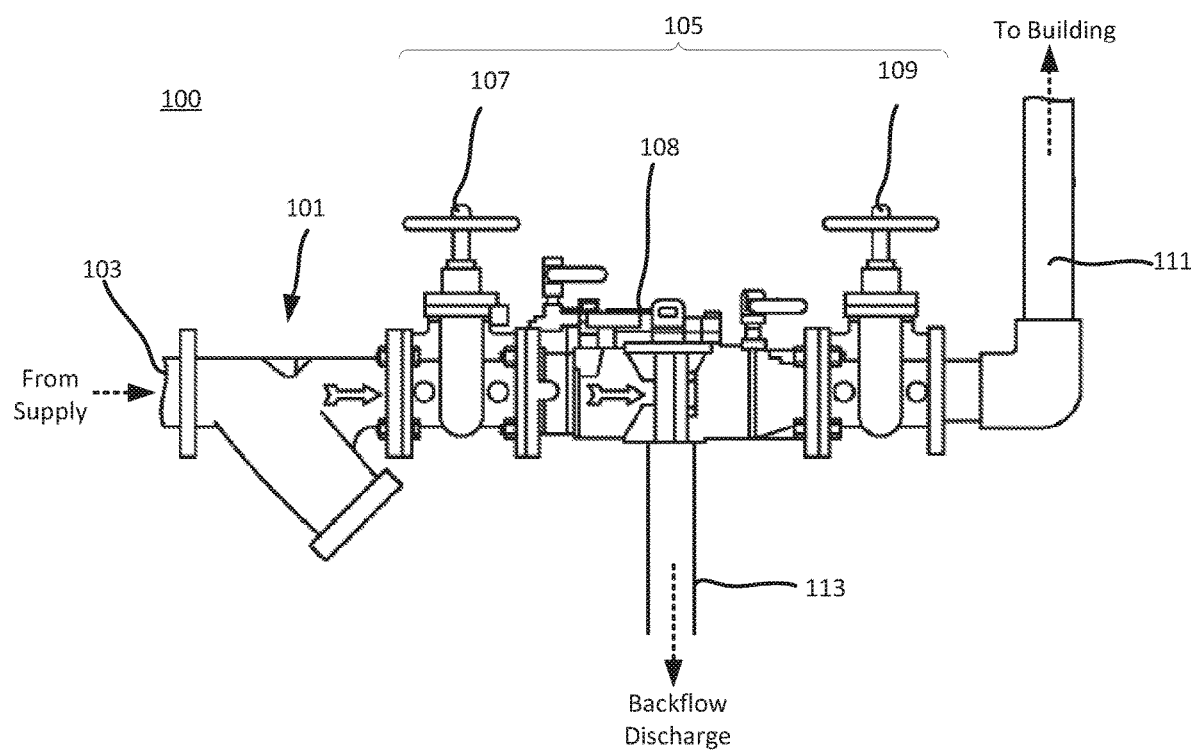
FIG. 1 is a schematic drawing of a prior art fluid supply system including a backflow preventer.
Figure 2:
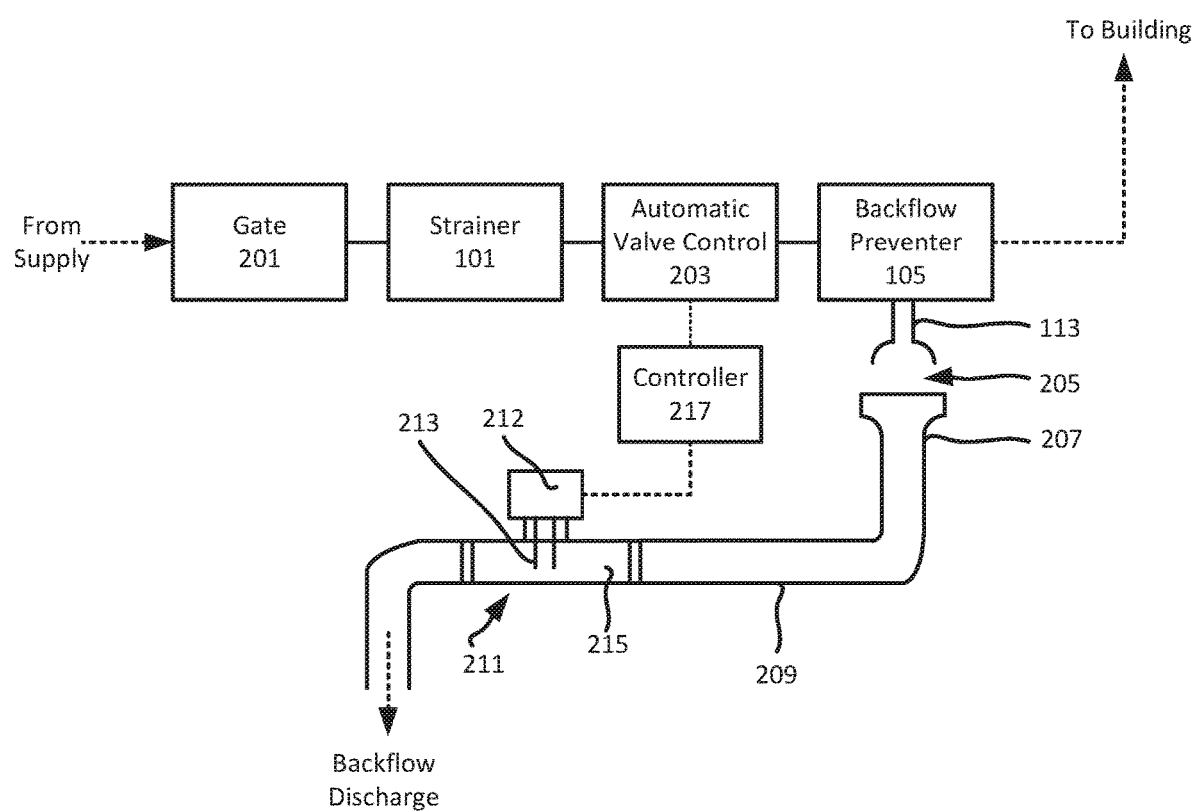
FIG. 2 is a schematic drawing of a prior art fluid supply system including a backflow preventer and a discharge detection system within a length of horizontal pipe.

Although the following Detailed Description will proceed with reference being made to illustrative embodiments, many alternatives, modifications and variations thereof will be apparent to those skilled in the art.

DETAILED DESCRIPTION

The present disclosure is directed to fluid detection systems, systems including the same, and methods using the same. In embodiments the fluid detection systems include a sensor module that includes a sensor housing. A liquid flow path (also referred to herein as a sensing conduit) extends through the sensor housing from a first inlet opening to a first outlet opening. The sensor module further includes a sensor element that is located outside the liquid flow path and which extends at least partially around a perimeter of the liquid flow path. The sensor element is configured to detect a capacitance within the liquid flow path and to provide a detection signal indicative of a detected capacitance within the liquid flow path. The sensor element is also configured to communicatively couple to a controller within an electronics module.

The sensor modules described herein may optionally include an air flow path that extends through the sensor housing, e.g., from a second inlet opening to a second outlet opening. The air flow path is configured to allow air or another gas to flow, e.g., when the fluid detection system is coupled to another component of a fluid supply system such as a backflow preventer or a relief valve. In embodiments, at least a portion of the liquid flow path and at least a portion of the air flow path extend parallel or substantially parallel to each other.

The sensor modules described herein may also include a sensor channel that is generally configured to house at least a portion of the sensor element. In embodiments the sensor channel is at least partially disposed outside the perimeter of the liquid flow path, and at least a portion of the sensor element is within the sensor channel. In such embodiments the sensor element does not obstruct any part of the liquid flow path due to its position and configuration.

The sensor element may include several parts (or portions), which may be coupled to or integral with one another. For example, the sensor element may include a first portion and a second portion, wherein the first portion is disposed around at least a portion of the perimeter of the liquid flow path. In such embodiments the second portion of the second element may be configured to communicatively couple to the controller, e.g., within the electronics module. Of course, sensor elements with one or greater than two portions may also be used. The liquid flow path may have any suitable shape and the first portion of the sensor element may substantially correspond to that shape. For example, at least a portion of the liquid flow path may have a circular, c shape, or d shape cross section, and the first portion of the sensor element may have a corresponding circular, c shape, or d shape cross section.

In embodiments the fluid detection systems described herein include the electronics module and the controller. In such embodiments the controller may be located within the electronics module, i.e., within a housing of the electronics module (hereinafter, the "electronics housing"). The electronics housing may be configured to physically couple to the sensor housing such that the sensor element is communicatively coupled to the controller. Physical coupling of the electronics module and the sensor housing may be accomplished in any suitable manner. In some embodiments the electronics housing and sensor housing may be integral with one another. In other embodiments, the electronics housing may be detachable from the sensor housing. In such instances the electronics housing may be configured such that the sensor element is communicatively coupled within the controller when the electronics housing and sensor housing are in an assembled state. Physical decoupling of the electronics housing from the sensor housing may, in some embodiments, break communication between the sensor element and the controller.

The controller is generally configured to receive a detection signal from the sensor module and determine whether fluid is present within the liquid flow path based at least in part on the detection signal. In embodiments the sensor signal is indicative of a capacitance within the liquid flow path that is detected by the sensor element, and the controller is configured to determine the capacitance detected by the sensor element (i.e., the detected capacitance) based at least in part on the detection signal. The controller may then compare the detected capacitance to a capacitance threshold and determine whether liquid is present within the liquid flow path based at least in part on that comparison. The controller may record a wet event (e.g., in a memory thereof) when it determines that liquid is present in the liquid flow path. In contrast, the controller may discard a reading and/or record a dry event when it determines that liquid is not present in the liquid flow path. In embodiments, the controller is configured to determine that liquid is present within the liquid flow path when the detected capacitance is at or above the capacitance threshold, and to determine that liquid is not within the liquid flow path when the detected capacitance is above the capacitance threshold. In embodiments the determination of whether a wet event is occurring may depend on whether the controller determines that the detected capacitance within the liquid flow path remains above or below the threshold capacitance for at least a (first) threshold period of time (i.e., for at least a first measurement period).

The controller may also be configured to determine whether a flood event is occurring. The controller may make that determination by comparing a total number of wet events within a (second) measurement period (i.e., a (second) threshold period of time) to a threshold number of wet events for that (second) measurement period. If the comparison indicates that total number of wet events recorded within the (second) measurement period is greater than or equal to the threshold number of wet events for the (second) measurement period, the controller may record a flood event. If the total number of wet events in the (second) measurement period is less than the threshold number of wet events for the (second) measurement period, however, the controller may continue to monitor for the occurrence of wet and/or flood events as previously described.

The fluid detection systems described herein may also include communications circuitry (COMMS). In embodiments the COMMS is located within the electronics housing, though it may be located elsewhere (e.g., in the sensor housing). The COMMS is generally configured to communicate with one or more external devices (e.g., cell phones, smart phones, computers, tablets, combinations thereof, and the like), e.g., via a wired or wireless communication protocol. When the systems described herein include COMMS, the controller may be configured to cause the COMMS to issue an alert (e.g., wet notification and/or flood notification) to an external device via wired or wireless communication, e.g., in response to the detection of a wet event or a flood event, respectively. Alternatively, or additionally, the controller may issue an alert in another form, such as an audio, visual, or audiovisual alert that is configured to notify a user of the occurrence of a wet and/or flood event.

In embodiments the fluid detection systems described herein further include a calibration module that is configured to establish a baseline capacitance within the liquid flow path. The calibration module may be in the electronics module, the sensor module, or another other suitable location. In any case, the controller may be configured to set the capacitance threshold relative to the baseline capacitance, e.g., to improve the controller's ability to accurately detect the occurrence of wet and flood events. For example, the controller may be configured to set the capacitance threshold above the baseline capacitance by a predetermined margin. Alternatively, or in addition to a calibration module, the capacitance threshold may be set by a physical component of the electronics module (e.g., one or more jumpers such as dip switches).

Figure 3:
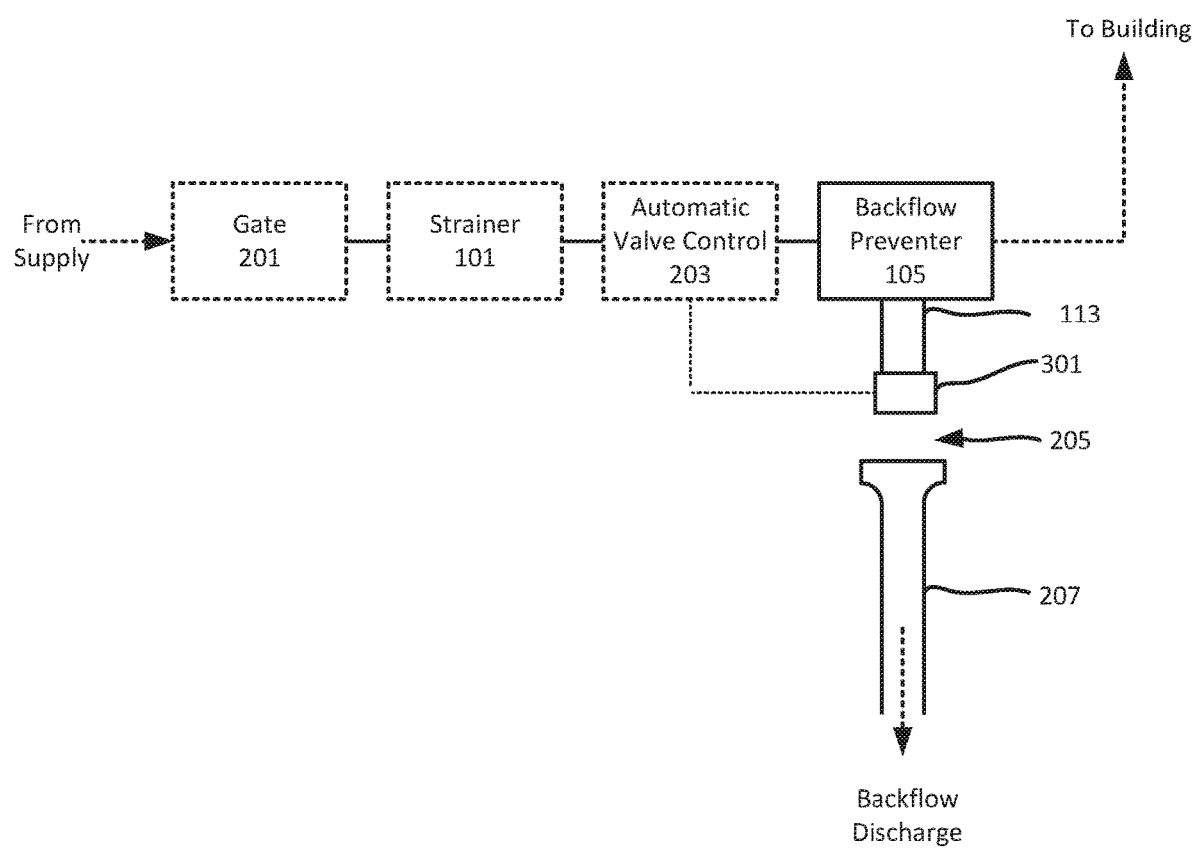
FIG. 3 is a schematic drawing illustrating one example of a fluid supply system including a backflow preventer and a fluid detection system consistent with the present disclosure.

FIG. 3 is a block diagram of one example of a fluid supply system including a backflow preventer and a fluid detection system consistent with the present disclosure. Similar to system 200, system 300 includes a backflow preventer 105 and a discharge pipe 113. System 200 can also include can include a gate valve 201, strainer 101, and automatic valve control 203, but such components are not required. When used, the gate valve 201 includes an inlet that is fluidly coupled to a fluid source such as a municipal water supply. Gate valve 201 further includes a valve (not shown) that may be used to shut off the supply of fluid to system 300. Strainer 101, when used, is fluidly coupled to the gate valve 201 (or directly to the fluid source) and is configured to remove solids that may be present within a supplied fluid. Automatic valve control 203, when used, has an inlet that is fluidly coupled to the strainer 101, gate valve 201, and/or the fluid source. Automatic valve control 203 may also have an outlet that is fluidly coupled to an inlet of a backflow preventer 105. In any case, automatic valve control 203 is configured to control one or more valves, e.g., in backflow preventer 105, automatic valve control 203, gate valve 201, etc., e.g., in response to a control signal.

Backflow preventer 105 includes an inlet and an outlet. The inlet of backflow preventer 105 is fluidly coupled (or configured to be fluidly coupled) to the fluid supply and/or one or more upstream components, such as gate valve 201, strainer 101, automatic valve control 203, or the like. The outlet of backflow preventer 105 is fluidly coupled (or configured to be fluidly coupled) to a destination for a supplied fluid. In this case the outlet of backflow preventer 105 is fluidly coupled to one or more outlets within a building, but backflow preventer 105 may be coupled to any type of destination, such as a storage tank, a fire hydrant, etc. In general, backflow preventer 105 is configured to permit forward fluid flow under normal operating conditions (i.e., when fluid is supplied under adequate pressure), and to limit or prevent backflow of fluid in the event there is a loss of pressure.

Non-limiting examples of suitable backflow preventers that may be used as backflow preventer 105 include backflow preventers produced and sold by WATTS Water Technologies, Inc., such as but not limited to the WATTS 957 RPZ backflow preventer, the WATTS series LF909 reduced pressure zone assembly, the Watts 909 series backflow preventers, combinations thereof, and the like. Of course, such backflow preventers are enumerated for the sake of example only, and any suitable backflow preventer that may be used. In embodiments, backflow preventer 105 includes at least one check valves that is biased in an open position by a fluid when a pressure of the fluid is above a threshold pressure, but which is in a closed position when the pressure of the fluid is below the threshold pressure.

In addition to being fluidly coupled to a fluid source and a fluid destination (e.g., a building), backflow preventer 105 is also fluidly coupled (or configured to fluidly couple) to a discharge pipe 113. Consistent with the foregoing discussion, discharge pipe 113 generally functions to redirect fluid that may leak through backflow preventer 105 away from the fluid source. The flow of fluid into discharge pipe 113 may be caused by various things, such as a backflow event or a problem with backflow preventer 105 (e.g., a malfunctioning check valve therein). Alternatively, fluid flow into discharge pipe 113 may happen even when backflow preventer 105 is functioning properly. In any case, fluid within discharge pipe 113 (also referred to herein as leakage flow) may flow downstream through fluid detection system 301, through an air gap 205, and into a vertical discharge conduit 207.

As will be described in further detail below fluid detection system 301 includes a sensor module and an electronics module. In embodiments the sensor module includes a sensor housing that includes a liquid flow path (i.e., a sensing conduit) that is configured to receive the leakage flow, and a sensor element disposed at least partially around the liquid flow path. The sensor element is configured to enable detection of fluid within the liquid flow path at least in part by measuring the capacitance within the liquid flow path and providing a detection signal representative of the measured capacitance within the liquid flow path. The detection signal may be provided to a controller, which may be integral with or coupled to the sensor housing in any suitable manner. In embodiments the controller is disposed within the electronics module, which is configured to physically couple to the sensor module.

When the sensor element is in communication with the controller, the controller may determine the capacitance within the liquid flow path based at least in part on a sensor signal provided by the sensor element. The controller may then determine whether a wet event is occurring within the liquid flow path based at least in part on the determined capacitance. If the controller detects a wet event (i.e., that liquid is present in the liquid flow path), it may further determine whether the wet event is part of a flood event, as described later. In response to a detected wet and/or flood event, the controller may act to alert a user of system 300 to such an event, and may issue control signals (e.g., to optional automatic valve control 203) that cause one or more valves within system 300 to close.

Figure 4:
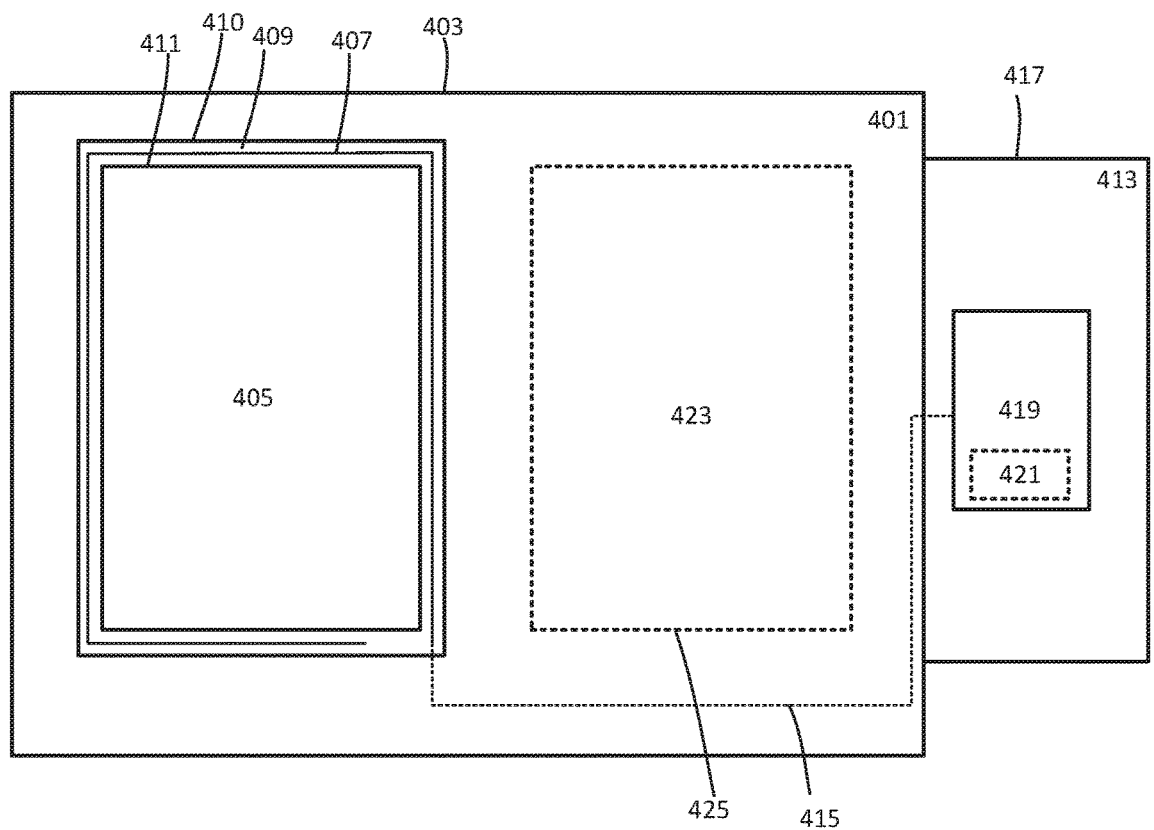
FIG. 4 is a block diagram of one example of a fluid detection system consistent with the present disclosure.

FIG. 4 is a block diagram of one example of a fluid detection system consistent with the present disclosure. As shown, fluid detection system 301 includes a sensor module 401 and an electronics module 413. Sensor module 401 includes a sensor housing 403, and electronics module 413 includes an electronics housing 417. The electronics housing 417 may be coupled to or integral with the sensor housing 403.

Sensor module 401 is configured to couple in-line with at least one fluid (e.g., liquid) conduit, such as a discharge pipe or other fluid conduit that may be used in a fluid supply system. Alternatively, or additionally, sensor module 401 is configured to couple in-line to an outlet of an upstream component used in fluid supply equipment, such as a backflow preventer, a pressure relief valve, combinations thereof and the like. In embodiments, sensor housing 403 may be configured to enable sensor module 401 to couple to an end of a fluid conduit such as but not limited to an open end of discharge conduit or pipe. The manner in which sensor module 401 is configured to couple to such a conduit is not limited. In embodiments, sensor housing 403 includes one or more fastening elements (e.g., male/female threads), which are configured to engage with corresponding fastening elements of a fluid conduit. Alternatively, or additionally, sensor housing 403 may be configured to couple to a fluid conduit via adhesive, solder, a mechanical fastener, a mechanical fitting (e.g., a press fit or other mechanical arrangement), combination thereof, and the like. Similar features may be used to couple sensor housing 403 to an outlet of equipment used in a fluid supply system, such as a backflow preventer, a pressure relief valve, or the like.

Sensor housing 403 may be formed of any suitable materials, such as plastics, metals, alloys, composites, and the like. In embodiments, sensor housing 403 is formed from or includes a plastic material, such as but not limited to polyvinylchloride (PVC), chlorinated PVC, cross linked polyethylene, epoxy, fiber reinforced plastic, acrylonitrile butadiene styrene (ABS) combinations thereof, and the like. Alternatively, or additionally, in embodiments sensor housing 403 is formed from or includes one or more metals, such as but not limited to copper, galvanized steel, stainless steel, iron, combinations thereof, and the like. In specific non-limiting embodiments, sensor housing 403 is formed from or includes a polymer coated metal, such as epoxy coated metal.

Sensor module 401 further includes liquid flow path 405, which may also be referred to as a sensing conduit. In general, liquid flow path 405 is configured to provide a passageway for the flow of a fluid such as water. Accordingly, liquid flow path 405 includes at least one inlet, at least one outlet, and a passageway that extends between the at least one inlet and the at least one outlet. The at least one inlet may be defined at least in part by an opening on an inlet side of sensor module 401 or, more specifically, of sensor housing 403. The at least one outlet may be defined at least in part by an opening on an outlet side of sensor module 401. In embodiments, the inlet and outlet sides of sensor module are opposite or substantially opposite one another, and the inlet and outlet openings of liquid flow path 405 are opposite or substantially opposite one another. That is, the inlet and outlet openings may be oriented along corresponding planes that are parallel or substantially parallel (i.e., +/−five degrees of parallel) to one another. In such embodiments the passageway between the inlet and outlet openings of liquid flow path 405 may be straight or substantially straight.

The inlet and outlet openings may of course be arranged differently. For example, when liquid flow path 405 is curved or includes a bend, the inlet and outlet openings may be angled or offset relative to one another. In embodiments, the inlet and outlet openings are oriented along respective first and second planes, wherein the first and second planes intersect with each other.

The cross sectional shape of liquid flow path 405 is not limited and liquid flow path 405 may have any suitable cross sectional shape. For example, the cross sectional shape of at least a portion of liquid flow path 405 may be a geometric (e.g., circular, ellipsoidal, oval, triangular, quadrilateral, pentagonal, etc.) shape, an irregular shape, or a combination thereof. Without limitation, at least a portion of liquid flow path 405 preferably has a circular, oval, or other geometric cross sectional shape. Still further, in some embodiments liquid flow path 405 has a cross sectional shape that is the same as or complementary to the shape of a flow path in a liquid conduit to which sensor housing 403 is to be coupled.

Liquid flow path 405 is preferably positioned within sensor housing 403 such that when sensor housing 403 is coupled to an outlet of a component used in fluid supply equipment (e.g., a discharge pipe, a backflow preventer, a relief valve, etc.), the inlet of liquid flow path 405 is aligned or substantially aligned with the outlet of the upstream component. In any case, at least a portion of the liquid flow path 405 is defined at least in part by a perimeter 411. The perimeter 411 may form an edge of an inlet or an outlet of liquid flow path 405, and/or a portion of a wall of a passageway of flow path 405. In embodiments, perimeter 411 is formed or otherwise defined at least in part by material of sensor housing 403, but of course other materials may also be used.

Sensor module 401 further includes a sensor element 407, which is generally configured to detect a capacitance within liquid flow path 405. Sensor element 407 may be any suitable sensing structure, such as a capacitance sensor. In embodiments sensor element 407 is a capacitive sensor that is in the form of or includes a conductor, such as a conductive antenna or electrode. In such embodiments the conductor of sensor element 407 may extend at least partially around the perimeter 411 of liquid flow path 405. Without limitation, sensor element 407 preferably includes at least one conductive antenna that includes or is in the form of one or more wires or strips of conductive material that extend from greater than 0 to 100% of the distance around the perimeter 411 of liquid flow path 405, such as from greater than or equal to about 25% to about 100%, from greater than or equal to about 25 to about 99%, from greater than or equal to about 40% to about 99%, from greater than or equal to about 50% to about 99% of the distance around perimeter 411, or even from greater than or equal to about 95% of the distance around perimeter 411. In specific non-limiting embodiments, sensor element 407 is located outside of liquid flow path 405 (i.e., such that no part of sensor element 407 is present within liquid flow path 405), and extends around perimeter 411 within the previously noted ranges.

The number of conductive elements used in sensor element 407 is not limited, and any suitable number of conductive elements may be used. For example, sensor element 407 may include 1, 2, 3, 4, 5, 10, 15, 20, or more conductive elements. When multiple elements are used, they may be spaced apart (laterally offset) and extend parallel or substantially parallel to one another. In specific non limiting embodiments, sensor element 407 is in the form of a flat flexible cable (FFC) that includes a plurality of parallel conductors, each conductor of which is laterally offset from one or more adjacent conductors by offset distance that ranges from greater than 0 to about 2.5 millimeters (m), such as from greater than 0 to about 1.5 mm, from greater than 0 to about 1.0 mm, or even from greater than 0 to about 0.5 mm. In a preferred non-limiting embodiment, sensor element 407 is an FFC with 20 parallel conductors, wherein each conductor is offset from one or more adjacent conductors by an offset distance of about 0.5 mm.

Any suitable conductive materials may be used as or in the conductive element(s) of sensor element 407. Non-limiting examples of suitable conductive materials that may be used in or as such conductive elements include metals such as aluminum, copper, gold, silver, conductive metal alloys, combinations thereof, and the like. Without limitation, in embodiments sensor element 407 includes one or more copper wires or strips that extend around perimeter 411 of liquid flow path 405 within the above noted ranges.

Sensor element 407 may be grounded to provide a common ground reference point that can improve the consistency and reliability of capacitance measurements taken by the element. The manner in which sensor element 407 is grounded is not limited, and any suitable grounding method may be used. For example, sensor element 407 may be connected to an earth ground or a floating ground, e.g., by one or more grounding cables or other types of ground connections.

Sensor module 401 may also include a sensor channel 409 that is configured to house or otherwise support at least a portion of sensor element 407 therein. In embodiments sensor channel 409 may extend completely around the perimeter 411 of liquid flow path 405. Alternatively, sensor channel 409 may extend at least partially around the perimeter 411 of liquid flow path 405, e.g., within the ranges noted above for sensor element 407. In any case sensor channel 409 may be defined at least in part by an inner wall 410 of sensor housing 403 and an outward facing side of perimeter 411. For example, sensor channel 409 may be in the form of a groove that includes an inner groove wall defined at least in part by an outward facing side of perimeter 411, an outer groove wall defined by inner wall 410 of sensor housing 403, and a bottom. In such instances, the groove may have a depth that is greater than or equal to the width and/or thickness of the sensor element 407, such that all or substantially all (e.g., greater than or equal to 95%) of the sensor element is within the groove.

Sensor element 407 is configured to communicatively couple with a controller. In that regard and as further shown in FIG. 4, sensor module 401 may further include a second portion 415, which may be separate from or integral with sensor element 407. When used, second portion 415 is configured to provide a communications pathway between sensor element 407 and a controller 419 as will be described later. In embodiments, the second portion 415 is in the form of or includes a conductive element (e.g., a conductive wire or stripe) that is configured to provide a physical interface between sensor element 407 and the controller 419. In such instances the second portion 415 may be coupled to or integral with sensor element 407. For example, second portion 415 may be in the form of a wire or other conductive element that is coupled to or integral with sensor element 407.

When second portion 415 is used, sensor element 407 may be understood to correspond to a first portion of a fluid sensor, and second portion 415 may be understood to correspond to a second portion of the fluid sensor. The fluid sensor is of course not limited to two portions, and may include greater (e.g., 3, 4, 5, etc.) or fewer (e.g., 1) portions. In instances where the sensor element includes a single portion (i.e., sensor element 407), second portion 415 may be omitted and sensor module 401 may be configured such that sensor element 407 can communicate with a controller in any suitable manner. For example, sensor element 407 may be physically connected to a controller (either directly or via one or more intervening components), or it may communicate with the controller via wireless communications—e.g., near field communication, a wireless local area network (WLAN), a ZIGBEE® network, BLUETOOTH®, combinations thereof, and the like. In any case, the sensor element 407 is configured to detect a capacitance within liquid flow path 405, produce a sensor signal indicative of the detected capacitance, and to provide the sensor signal to a controller to which it is communicatively coupled, as described later.

Sensor module 401 may optionally include an air flow path 423. In general, air flow path is configured to provide a passageway through sensor housing 403 for the flow of air or another gas. Such may be useful in instances where sensor module 401 is coupled to an outlet of a relief valve, where inflow of air into the relief valve can aid in flow of liquid from the relief valve. This concept will be described later in conjunction in with FIGS. 8A-8C. When used, optional air flow path 423 may be at least partially defined by a perimeter 425, which may be formed from material of sensor housing 403 and/or other material.

As noted above, electronics module 413 may be integral with or coupled to sensor module 401. In the former case electronics housing 417 is integral with sensor housing 403, such that the electronics housing 417 and sensor housing are in one piece. In the latter case, the electronics module 413 is configured to couple to sensor module 401 in any suitable manner Without limitation, electronics housing 417 is preferably configured to detachably couple to sensor module 401 and, more particularly, to detachably couple to sensor housing 403. In such instances fluid detection system 301 may be understood to have an assembled state in which electronics module 413 is coupled to sensor module 401, and a disassembled state in which electronics module 413 and sensor module 401 are separated. Accordingly, FIG. 4 may be understood to depict fluid detection system 301 in an assembled state. In any case, sensor element 407 is configured to communicatively couple to a controller 419 within electronics housing 417, e.g., by second portion 415 or in another manner as previously described.

Controller 419 is generally configured to determine a detected capacitance within liquid flow path 405 based at least in part on a sensor signal received from sensor element 407, wherein the sensor signal is indicative of a capacitance detected by the sensor element 407 within liquid flow path 405. Controller 419 can then use the detected capacitance to determine whether liquid is present within liquid flow path 405 in any suitable manner. For example, controller 419 may determine whether liquid is present within the liquid flow path 405 by comparing the detected capacitance to a capacitance threshold and to record (or not record) a wet event based on that comparison, e.g., in a memory thereof. For example, when the determined capacitance is less than or equal to the capacitance threshold, controller 419 may determine that liquid is present within liquid flow path 405 and record a wet event. Conversely when the determined capacitance is greater than the capacitance threshold, controller 419 may determine that liquid is not present within liquid flow path 405. In such instances controller may record a dry event, or may discard the determination and continue to monitor the capacitance within liquid flow path 405.

The capacitance threshold used by controller 419 can be set in any suitable manner. In embodiments, the capacitance threshold is a default capacitance threshold that may be set by the manufacturer of fluid detection system 301. Such a configuration may be useful when fluid detection system 301 is to be installed in a fluid supply system with a known configuration, i.e., one in which a baseline capacitance of the fluid supply system is known. In other embodiments, the capacitance threshold is set based on a baseline capacitance, which may be set by calibration of fluid detection system 301, e.g., post installation. Still further, the capacitance threshold may be set by one or more physical components of the controller 419 or an electronics module in which the controller 419 is installed. For example, the capacitance threshold may be set by one or more jumpers (e.g., dip switches) on controller 419 or within electronics module 413.

In that regard electronics module 413 may optionally include a user interface 421. In the embodiment of FIG. 4 optional user interface 421 is shown as part of controller 419, but such a configuration is not required and user interface 421 may be provided at any suitable location. For example, user interface 421 may be provided on or within sensor housing 403, on or within electronics housing 417, and/or within controller 419 as shown. In any case, user interface 421 may provide a mechanism for a user to interact with sensor module 401 and/or electronics module 413. For example, user interface 421 may include a calibration module that is configured to calibrate fluid detection system 301. More particularly, the calibration module may be configured to establish a baseline capacitance within liquid flow path 405. The baseline capacitance may be set based at least in part on a capacitance detected by sensor element 407, e.g., under a known condition. For example, the baseline capacitance may be set based on a capacitance detected by sensor element 407 in response to user interaction with a calibration button or other interactive element of user interface 421. Alternatively, or additionally, the baseline capacitance may be set based on capacitance readings that are taken by fluid detection system 301 automatically, e.g., a predetermined time or time interval. Still further, the baseline capacitance may be set using jumpers (e.g., dip switches) or another type of electrical control system.

Once the baseline capacitance is determined, controller 419 may set the capacitance threshold based on the baseline capacitance, e.g., with a calibration module, one or more physical elements (e.g., one or more jumpers such a dip switches), combinations thereof, and the like. For example, controller 419 may set the capacitance threshold to a value that is offset from the baseline capacitance by a predetermined margin. The predetermined margin may be any suitable value, and in some instances is equal to about 25%, about 50%, about 100%, about 150%, or even about 200% of the baseline capacitance value or more. In embodiments, controller 419 is configured to set the capacitance threshold above the baseline threshold by the predetermined margin. In embodiments, the sensor element may have a sensitivity range of 100 picofarads (pF), the range of capacitance in the typical system may range from 5 to 20 pF, and the controller may set the threshold capacitance to 10-15 pF, such as about 12 pF.

The controller may be further configured to determine that a wet event has occurred when a detected capacitance is less than or equal to the threshold capacitance for a (first) time period, i.e., a first measurement period. The length of the first measurement period is not limited and the first measurement period may be set to any suitable length of time. In embodiments, the first measurement period ranges from greater than 0 to about 5 seconds, such as from greater than 0 to about 2.5 seconds. The first measurement period may of course be set to a longer of shorter period of time. In general, use of the first measurement period can limit or prevent controller 419 from determining that a wet event has occurred due to drips or other short leaks that cause liquid to be present within the liquid flow path 405 for a very short period of time. This may improve the accuracy of controller 419 and the user experience by preventing controller 419 from falsely reporting small leaks, drips, and other minor transient events as wet events that may need attention from a user.

Controller 419 may be further configured to determine whether a flood event is occurring within liquid flow path 405. In embodiments, controller 419 may determine whether a flood event is occurring by monitoring the detected capacitance within liquid flow path 405 during a (second) measurement period, determining a total number of wet events occurring within the (second) measurement period, and comparing the total number of wet events within the (second) measurement period to a threshold number of wet events set for the (second) measurement period. The second measurement period may be used independently or in conjunction with the first measurement period, and may be set to any suitable length of time. For example, the second measurement period and may range from greater than 0 seconds to several minutes or more. In embodiments the second measurement period ranges from greater than 0 to about 10 minutes (600 seconds), such as from greater than 0 to about 5 minutes (300 seconds), from greater than 0 to about 2 minutes (120 seconds), or even from greater than 0 to about 90 seconds. In those or other embodiments, controller 419 may be configured such that the second measurement period begins at the end of a first measurement period in which a wet event is detected.

When the total number of wet events meets or exceeds the threshold number of wet events in the (second) measurement period, controller 419 may determine that a flood event is occurring within liquid flow path 405, and may record the occurrence of that flood event accordingly (e.g., in a memory thereof). Upon detection of a flood event, controller 419 may be configured to cause the issuance of an alert. The alert may be in the form of an audio, visual, or audiovisual alert (e.g., a light and/or siren), a notification message to an external device, combinations thereof, and the like. For example, controller 419 issue a control signal that is configured to cause communications circuitry (not shown) within or communicatively coupled to fluid detection system 301 to issue a notification message to an external device via a wired or wireless communication protocol, wherein the notification message is indicative of the occurrence of a flood event. In addition, controller 419 may cause an alert light and/or an alert siren to activate to provide an audio visual notice of a detected flood event.

In embodiments controller 419 may be configured to delay issuance of an alert/notification for a delay time following detection of a wet and/or flood event. During the delay time, controller 419 may continue to monitor the detected capacitance in the liquid flow path. If the controller determines that the detected capacitance returns to above the capacitance threshold during the delay time (i.e., returns to a capacitance indicative of normal operation), controller 419 may not issue a notification/alert as described above. If the detected capacitance remains at or below the capacitance threshold during the delay time, however, controller 419 may issue a notification/alert as described above. As may be appreciated, use of the delay time may limit reporting of transient wet/flood events that may not require service. The delay time may be any suitable length. For example, in embodiments the delay time ranges from greater than 0 to about 300 seconds (5 minutes), greater that 0 to about 180 seconds (3 minutes), even greater than 0 to about 60 seconds (1 minute), or even greater than 0 to about 30 seconds. The delay time may be set in any suitable manner, such as via a user interface of controller 419, a calibration module within controller 419, one or more physical elements of electronics module 413 (e.g., one or more dip switches), combinations thereof, and the like.

When the total number of wet events is below the threshold number of wet events for the (second) measurement period, controller 419 may determine that a flood event is not occurring within liquid flow path 405. In such instances controller 419 may continue to monitor the capacitance within the liquid flow path 405 for occurrence of wet and/or flood events. Controller 419 may also issue a control signal that is configured to cause communications circuitry to issue a notification message to an external device as noted above, wherein the notification message is indicative of the occurrence of the wet event(s) occurring within the measurement period, either alone or along with an indication that a flood event has not been detected.

Figure 7:
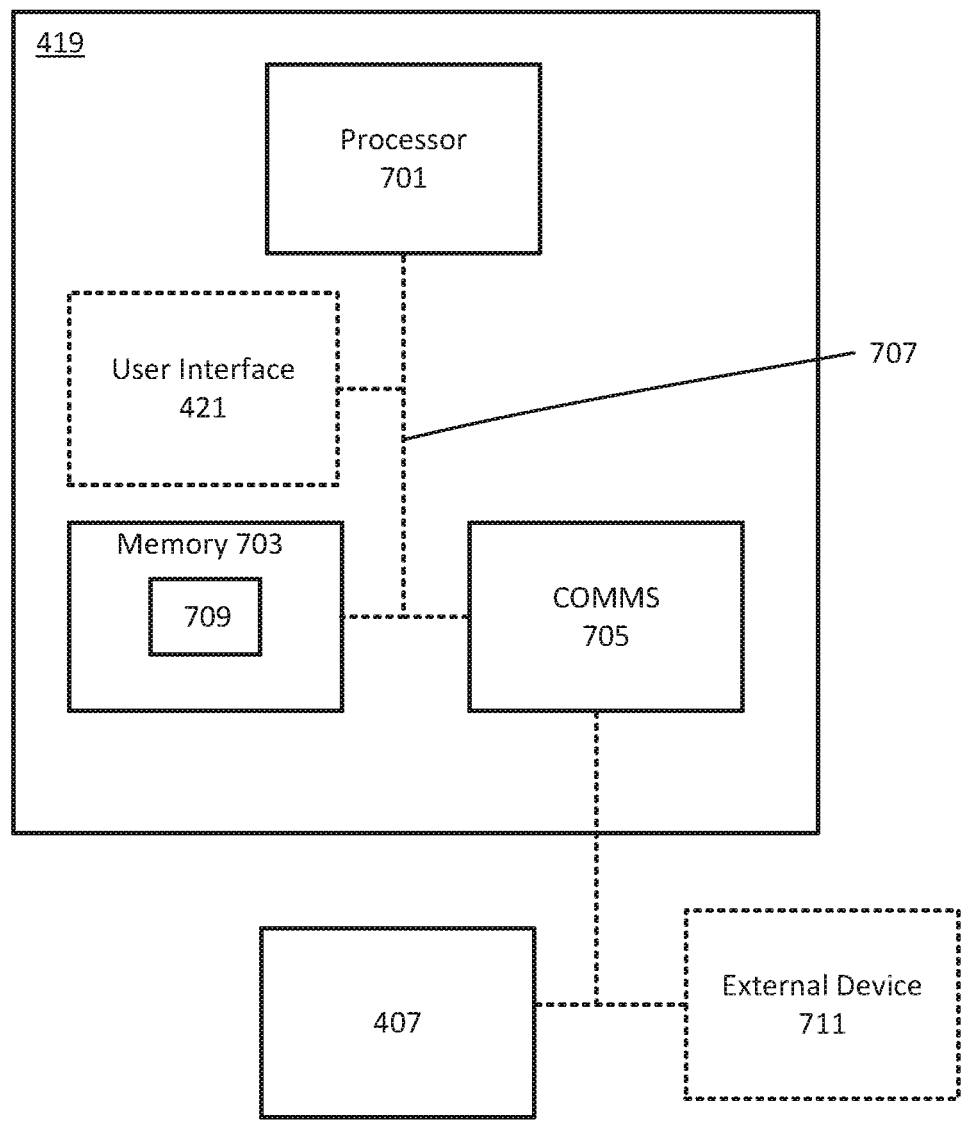
FIG. 7 is a block diagram of one example of a controller consistent with the present disclosure.

Any suitable type of controller may be used as controller 419. With that in mind, FIG. 7 is a block diagram of one example of a controller that may be used as controller 419 in accordance with the present disclosure. Controller 419 includes a processor 701, memory 703, and communications circuitry (COMMS) 705, which are communicatively coupled to one another via a bus 707. Controller 419 may optionally further include a user interface 421, as discussed above.

Processor 701 may be any suitable general-purpose processor or application specific integrated circuit. Without limitation, in embodiments processor 701 is one or more single or multicore processors produced by INTEL® corporation, APPLE® corporation, AMD® corporation, SAMSUNG® corporation, NVIDIA® corporation, Advanced Risc Machines (ARM®) corporation, combinations thereof, or the like. While FIG. 7 depicts the use of a single processor 701, it should be understood that multiple processors can be used.

Memory 703 may be any suitable type of computer readable memory. Examples of memory types that may be used as memory 703 include but are not limited to: programmable memory, non-volatile memory, read only memory, electrically programmable memory, random access memory, flash memory (which may include, for example NAND or NOR type memory structures), magnetic disk memory, optical disk memory, phase change memory, memristor memory technology, spin torque transfer memory, combinations thereof, and the like.

Additionally, or alternatively, memory 703 may include other and/or later-developed types of computer-readable memory.

COMMS 705 may include hardware (i.e., circuitry), software, or a combination of hardware and software that is configured to allow system controller 419 (or fluid detection system 301) to transmit and receive messages via wired and/or wireless communication from an external device 711. Communication between COMMS 705 and an external device 711 may occur, for example, over a wired or wireless connection using one or more currently known or future developed communication standards. COMMS 705 may include hardware to support such communication, e.g., one or more transponders, antennas, BLUETOOTH™ chips, personal area network chips, near field communication chips, wired and/or wireless network interface circuitry, combinations thereof, and the like. As shown, COMMS 705 may be communicatively coupled to sensor element 407, e.g., via wired or wireless communication. In embodiments COMMS 705 is communicatively coupled with sensor element 407 when fluid detection system 301 is in an assembled state, and is configured to receive sensor signals from sensor element 407.

Controller 419 further includes a control module 709. In this specific context, the term "module" refers to software, firmware, circuitry, and/or combinations thereof that is/are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in controller 419, e.g., within memory 703 or other storage. In embodiments, control module 709 is in the form of logic that is implemented at least in part in hardware to perform operations consistent with the present disclosure.

For example, control module 709 may be configured to cause controller 419 to establish a capacitance threshold based on a baseline capacitance as discussed previously. Control module 709 may also be configured to cause controller 419 to determine a detected capacitance within liquid flow path 405, e.g., based on a sensor signal provided by sensor element 407. Control module 709 may further be configured to cause controller 419 to determine whether liquid is present within the liquid flow path 405 based at least in part on a comparison between the detected capacitance and the capacitance threshold as previously described. Moreover, control module 709 may be configured to cause controller 419 to determine whether a flood event is occurring with liquid flow path 405 as discussed above. When a wet event and/or a flood event is detected, control module 709 may cause controller 419 (or more specifically, COMMS 705) to issue a notification message to an external device 711, e.g., via wired or wireless communication. Finally, control module 709 may be configured to cause controller 419 to perform calibration operations consistent with the present disclosure, e.g., at a predetermined time, at a predetermined interval, and/or in response to user interaction with a calibration button, e.g., on user interface 421, and/or in response to a position of a calibration jumper within controller 419. Pursuant to such calibration operations, control module 709 may cause controller to set a baseline capacitance and to set the capacitance threshold based on the baseline capacitance as discussed above.

Figure 5A:
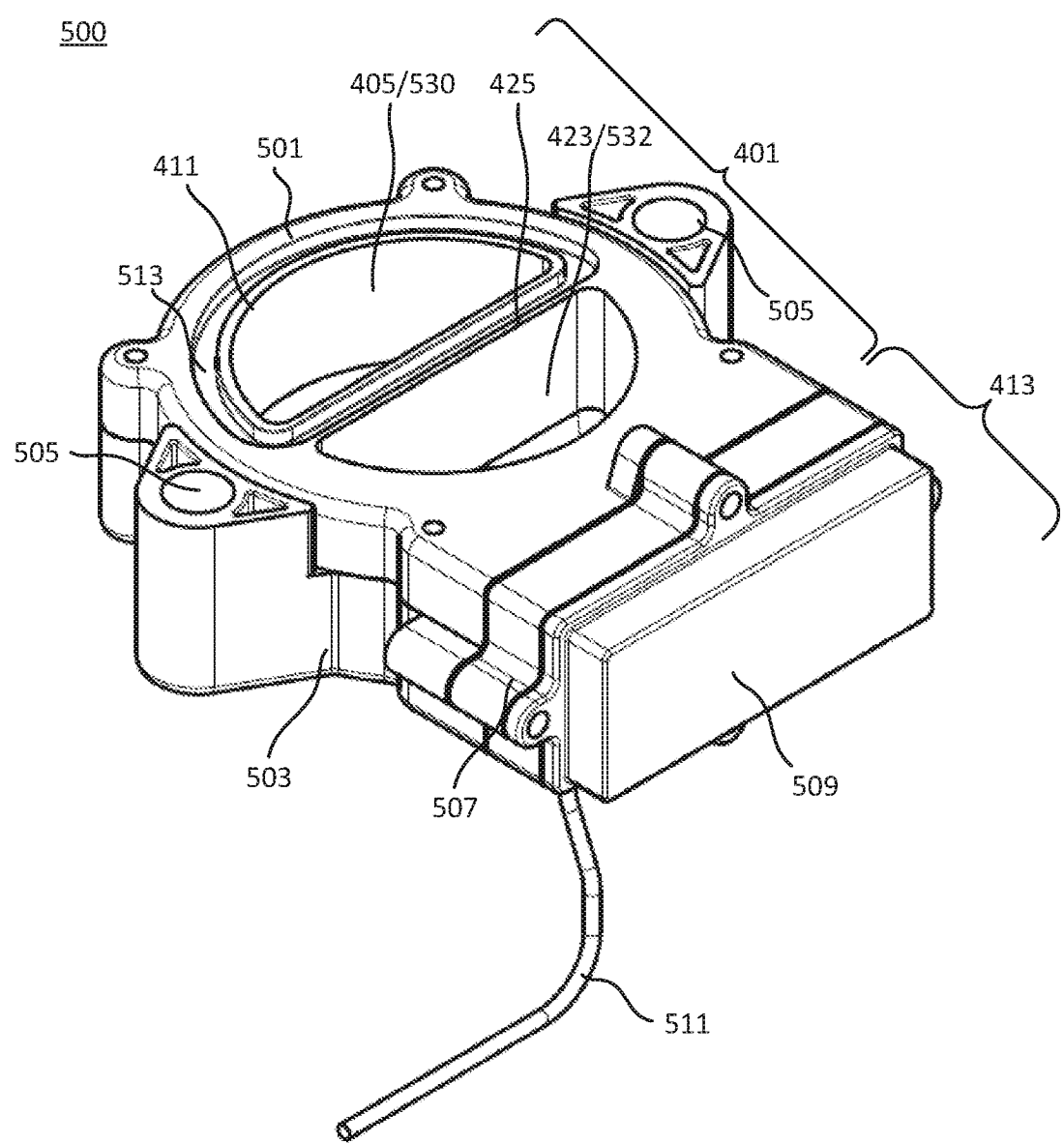
FIGS. 5A-5P depict various views of one example of a fluid detection system consistent with the present disclosure.
Figure 5B:
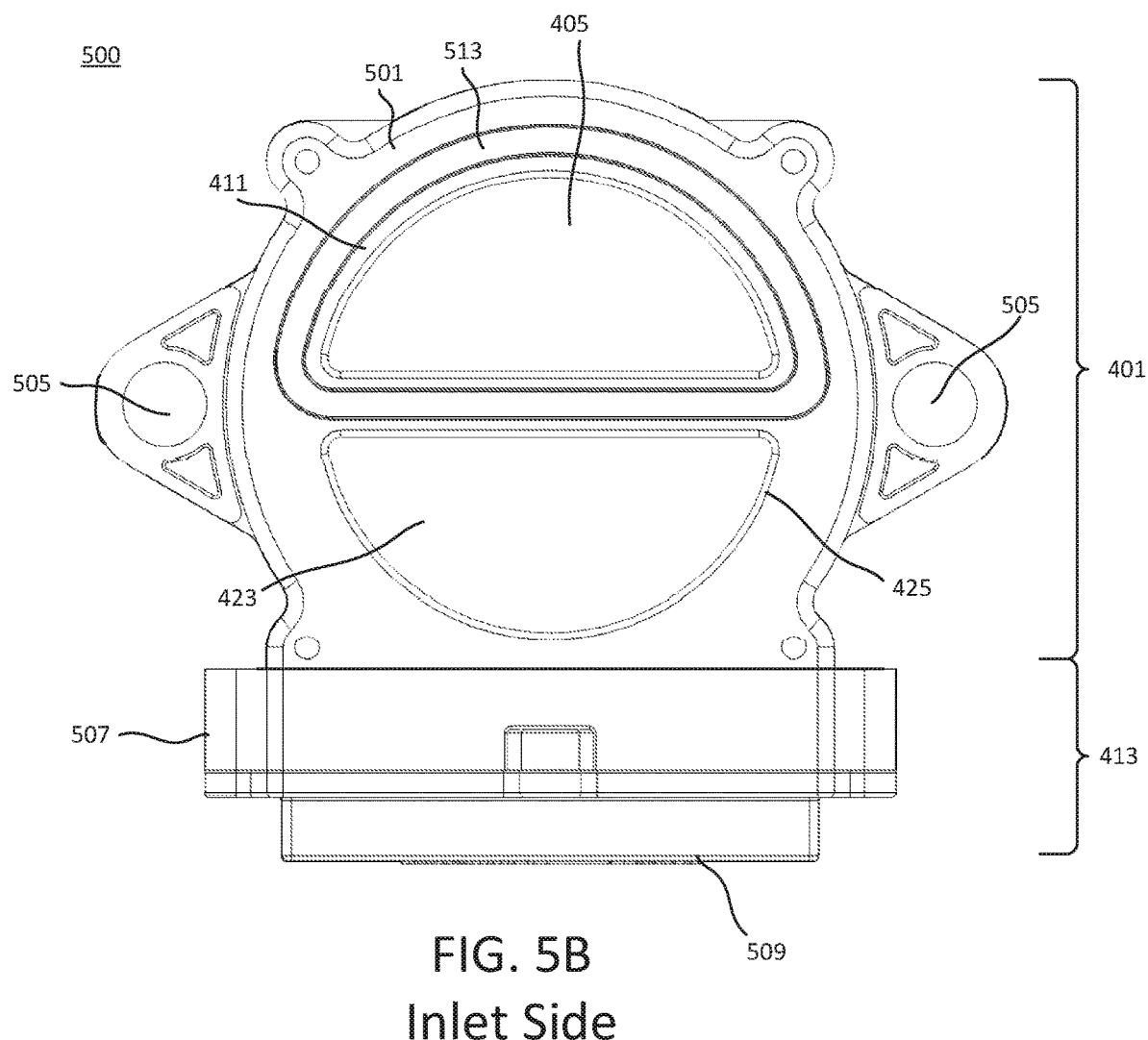
Figure 5C:
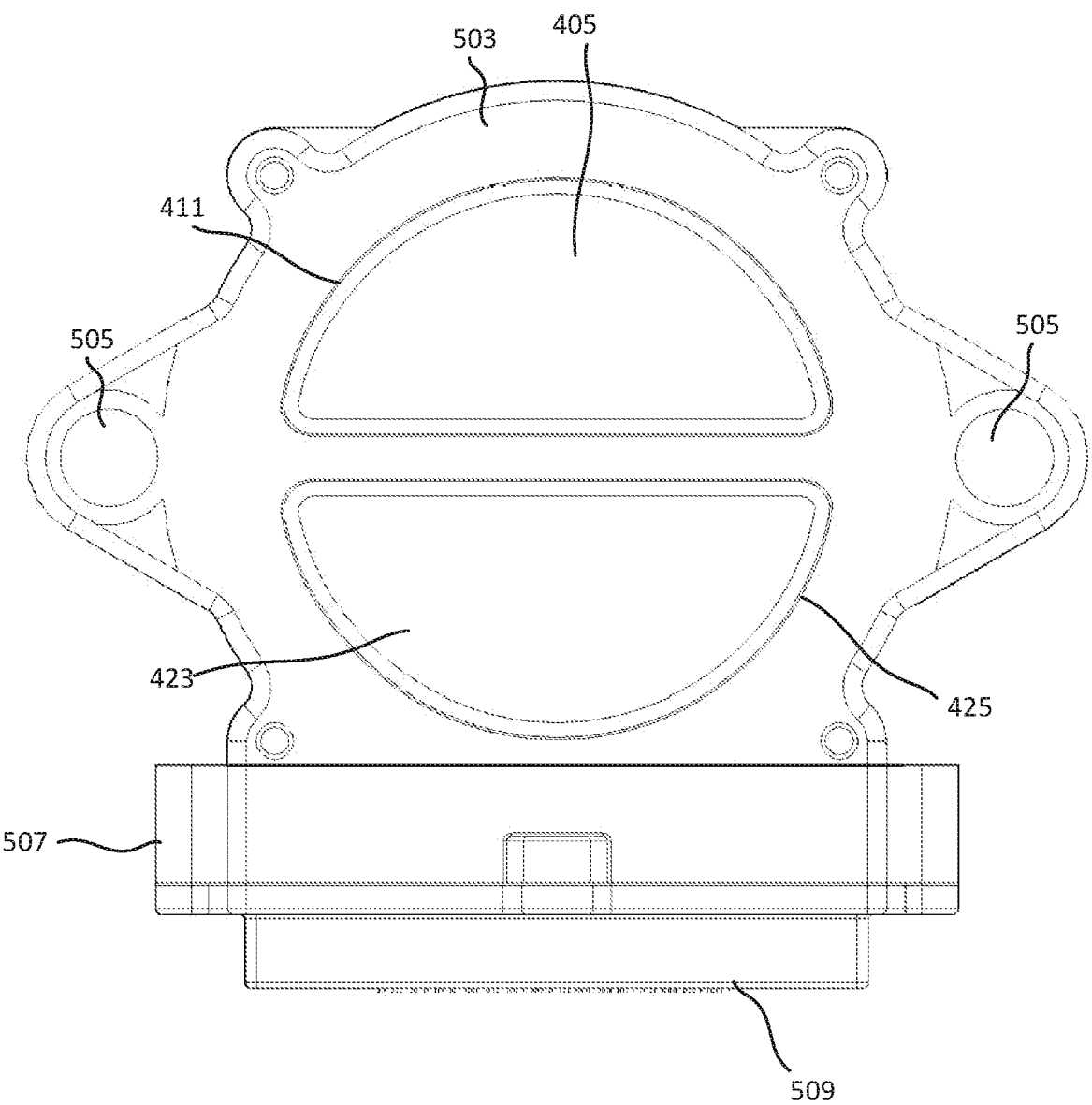
Figure 5D:
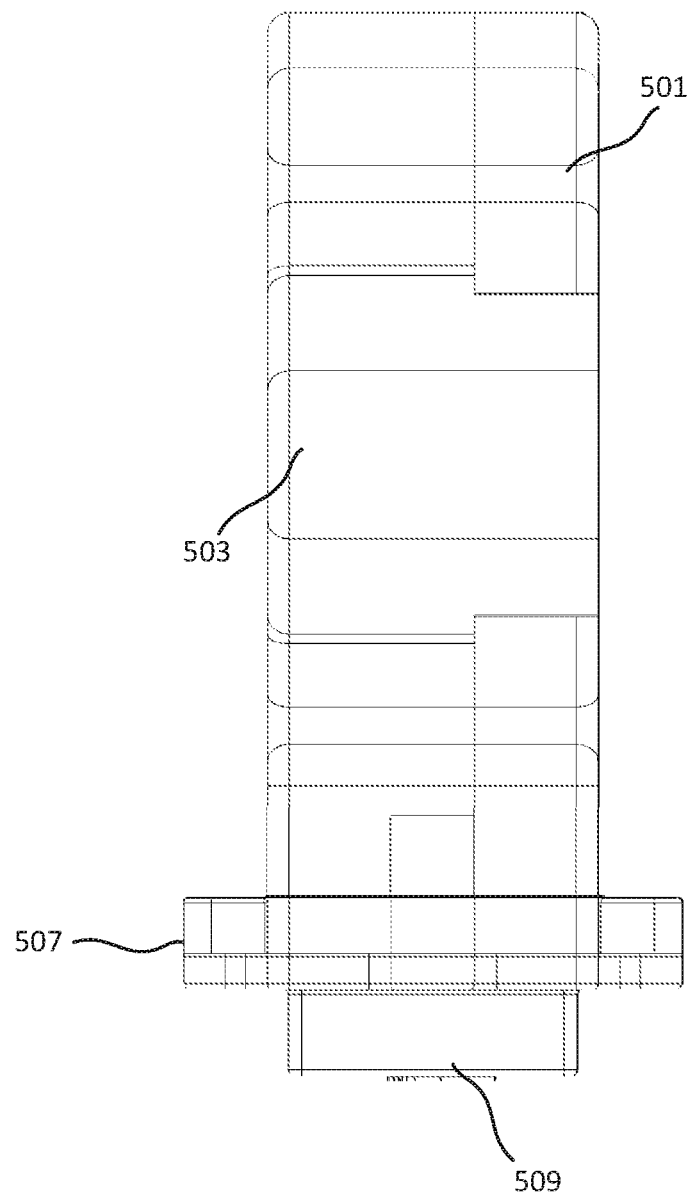
Figure 5E:
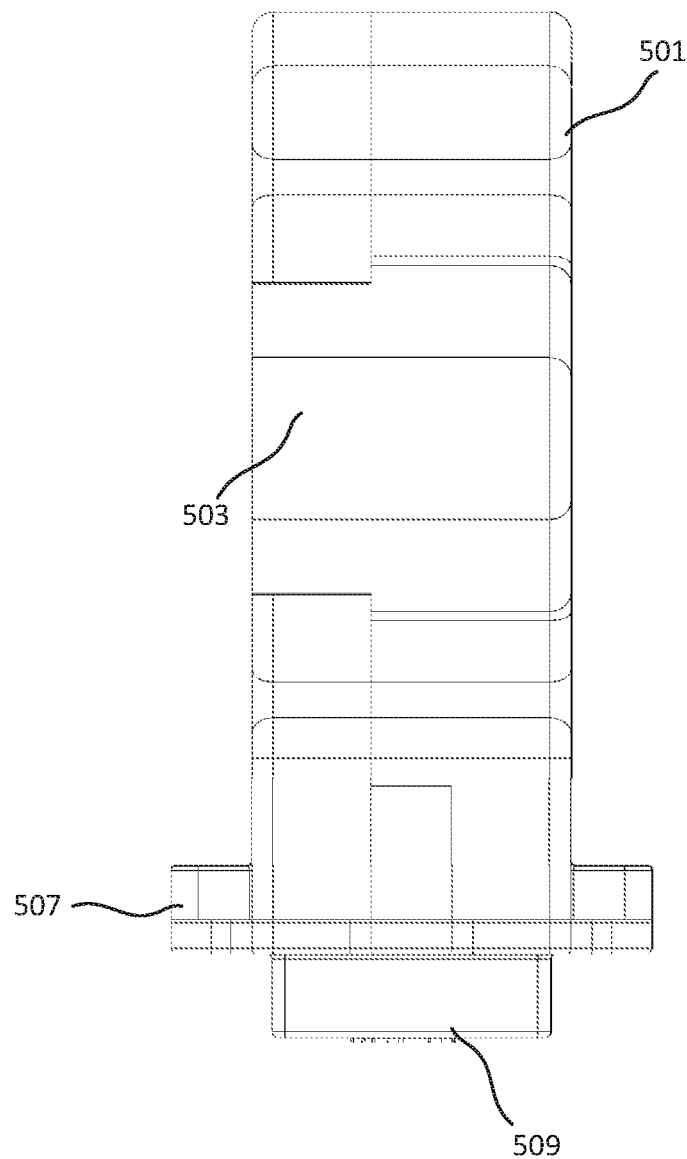
Figure 5F:
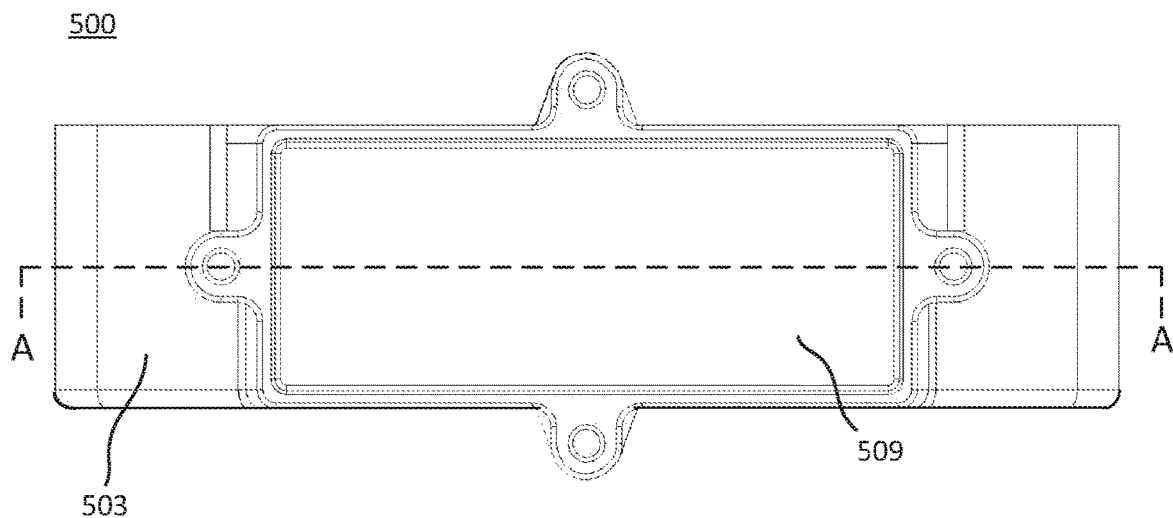
Figure 5G:
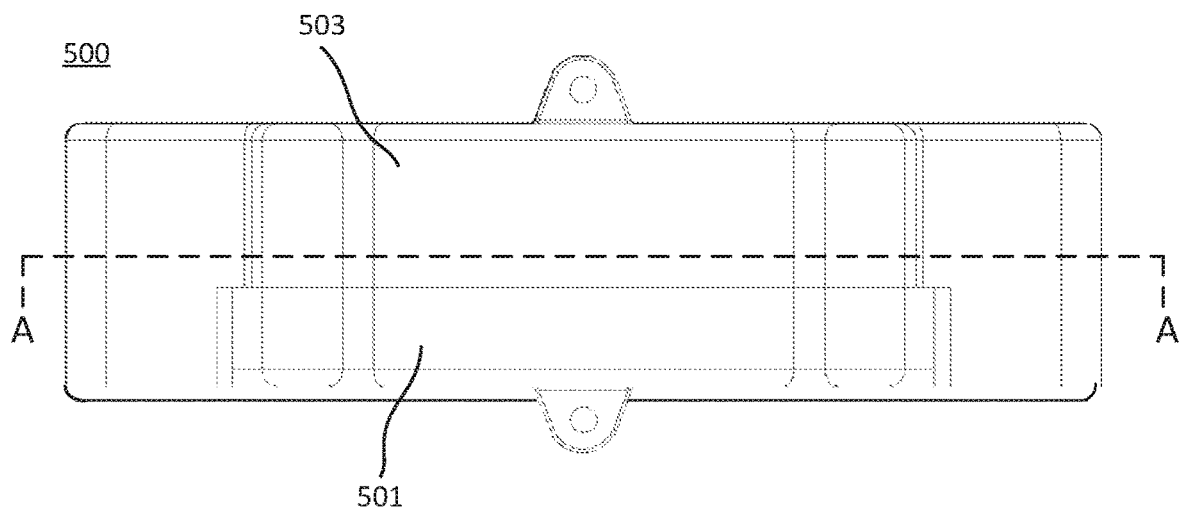
Figure 5H:
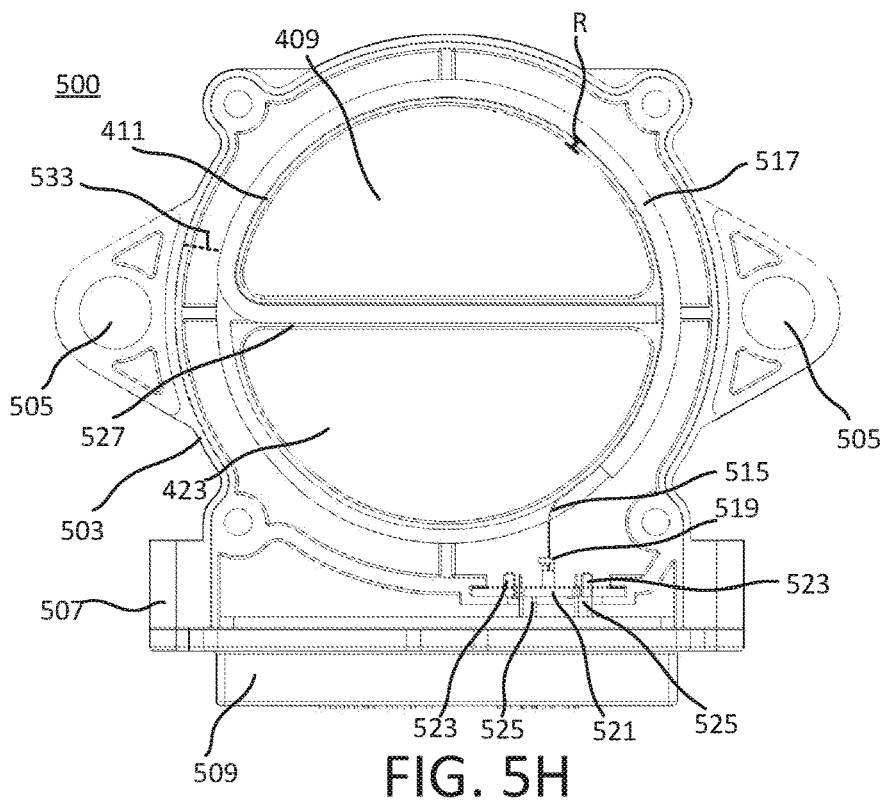
Figure 5I:
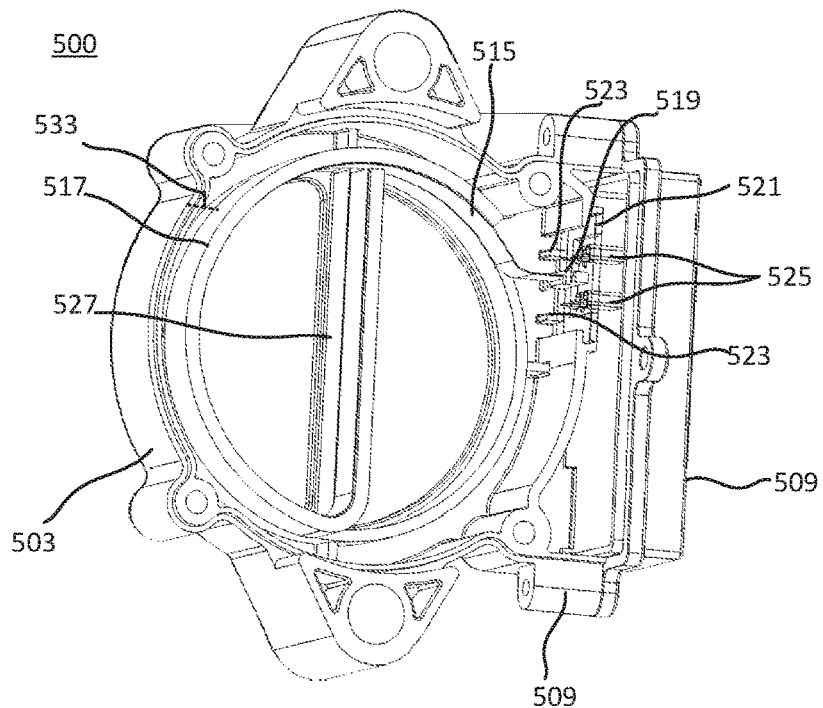
Figure 5J:
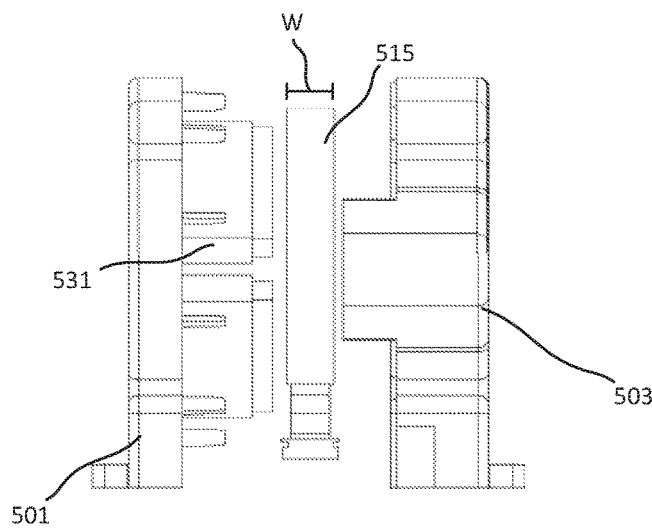
Figure 5J:
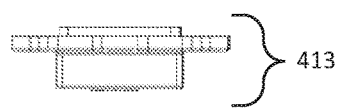
Figure 5K:
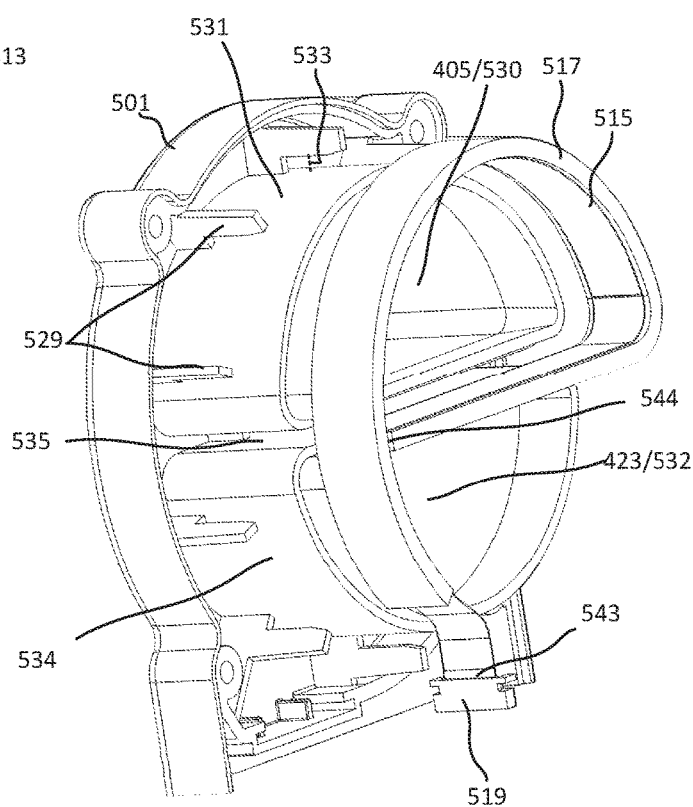
Figure 5L:
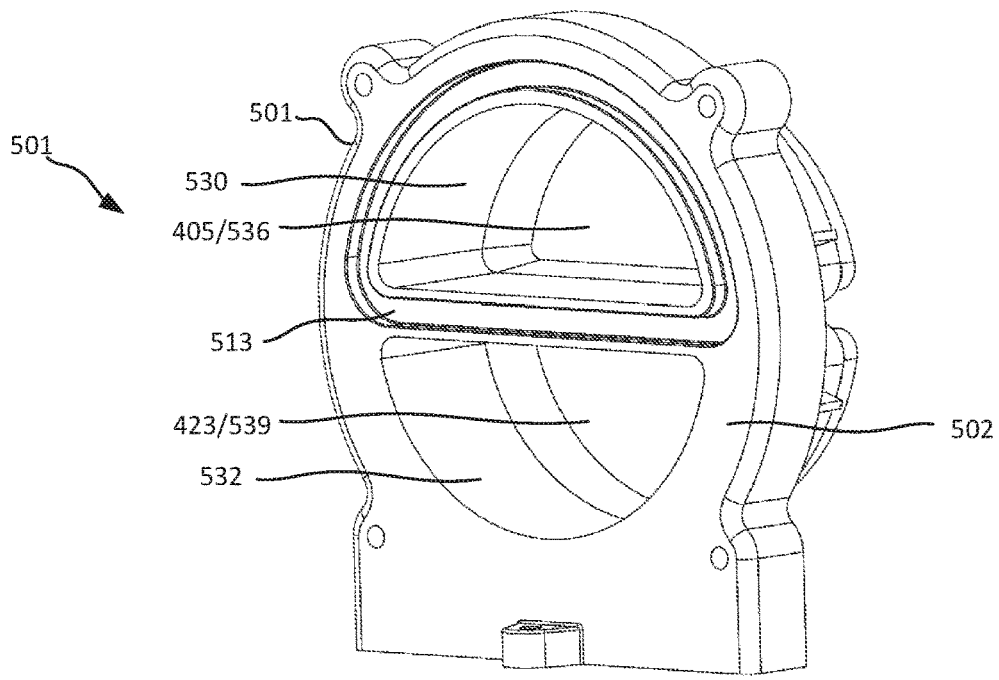
Figure 5M:
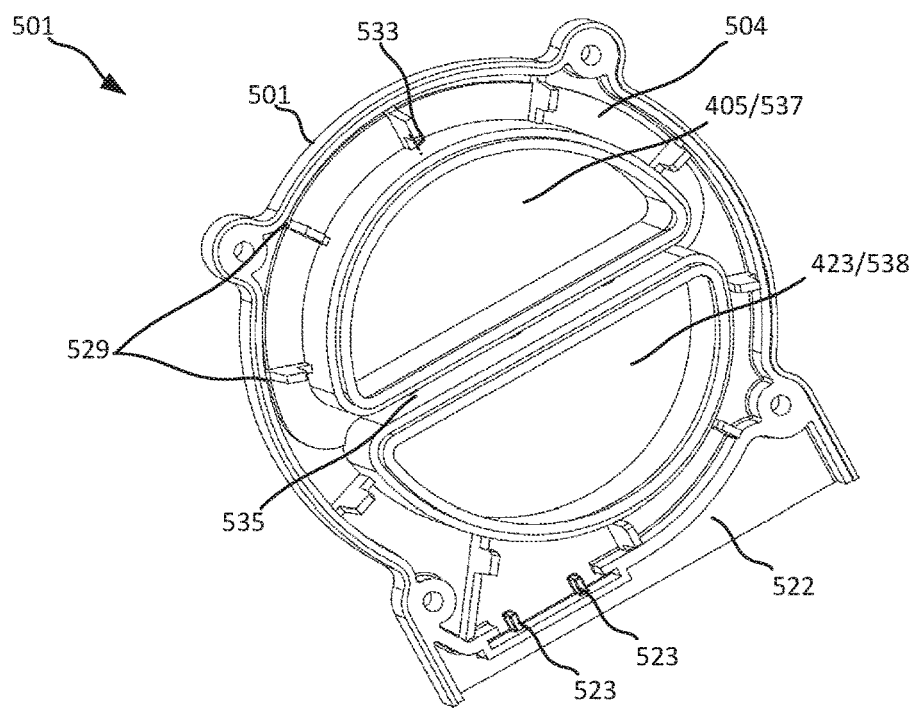
Figure 5N:
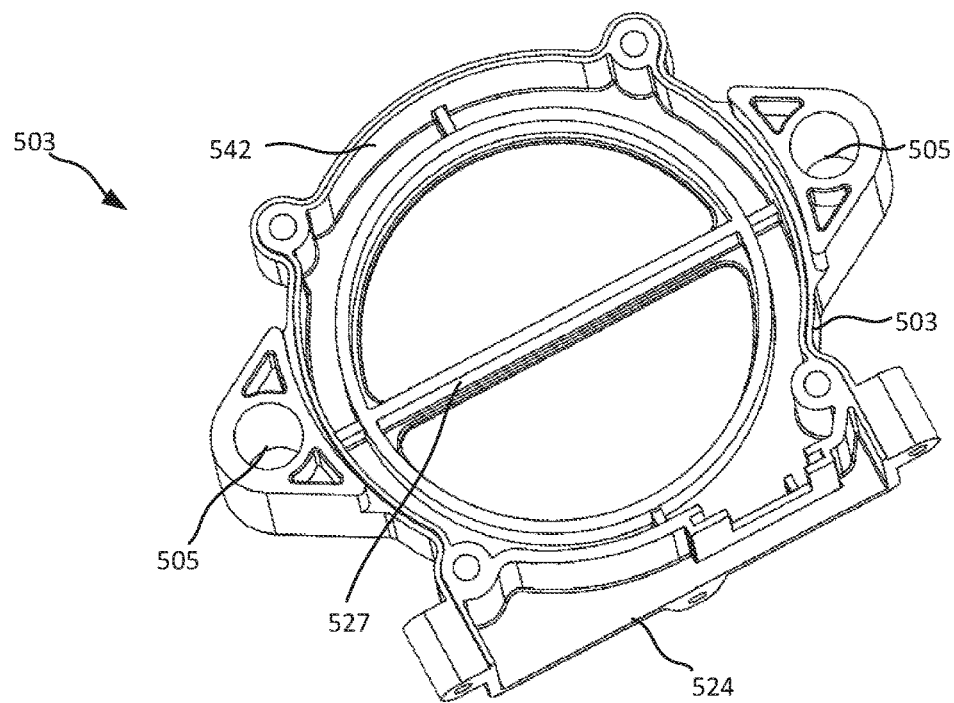
Figure 5O:
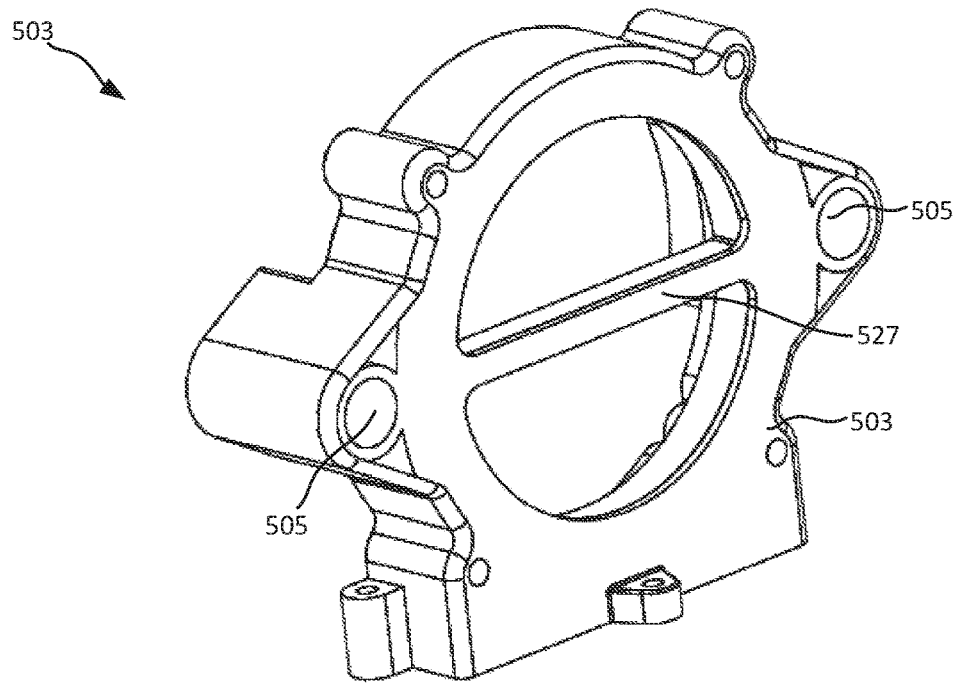
Figure 5P:
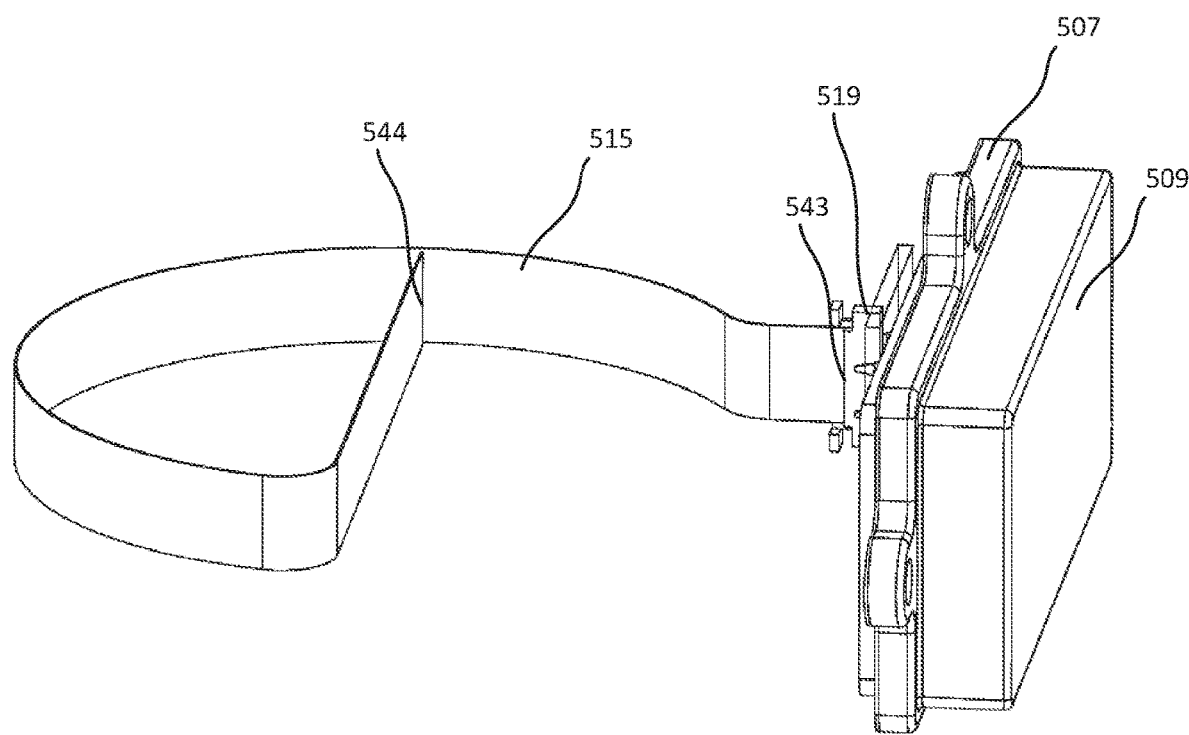

FIGS. 5A-5P depict various views of another example of a fluid detection system consistent with the present disclosure. As shown, fluid detection system 500 includes a sensor module 401 and an electronics module 413. The nature and function of sensor module 401 and electronics module 413 is the same as described above in connection with FIG. 4, and so will not be reiterated in detail.

As best shown in FIGS. 5A and 5J and 6A and 6B, electronics module 413 is separable from sensor module 401. That is electronics module 413 may be physically connected and separated from sensor module 401, such that fluid detection system 500 is in an assembled or disassembled state, respectively. In the assembled state, controller terminals 525 (best shown in FIG. 6B) on electronics module 413 are coupled to corresponding receiving terminals 523 (shown in FIG. 5I) on a printed circuit board (PCB) 521 of sensor module 401, and at least one sensor terminal 519 of a sensor element 515 (best shown in FIGS. 5H, 5I, 5K and 5P) is also coupled to sensor PCB 521. In that state, sensor PCB 521 communicatively couples the sensor element 515 to the controller 419.

With further reference to FIGS. 5A-5P—sensor module 401 includes a sensor cover 501 and a sensor base 503, which together form a sensor housing consistent with sensor housing 403 as described above in connection with FIG. 4. As best shown in FIG. 5J, sensor cover 501 and sensor base 503 are detachable from one another and form corresponding upper and lower portions of a sensor housing 403. The manner in which sensor cover 501 and sensor base 503 can be coupled to one another is not limited. In embodiments and as shown in FIG. 5J, sensor cover 501 may include one or more tabs (shown but not labeled) that are configured to be inserted into and engage with corresponding slots within sensor base 503. Sensor module 401 further includes a sensor element 515, which is functionally similar to sensor element 407 described previously.

As best shown in FIGS. 5A-5K, sensor module 401 includes a liquid flow path 405 that extends through the sensor housing formed by sensor cover 501 and sensor base 503. Like the liquid flow path in system 300, the liquid flow path 405 in fluid detection system 500 is defined at least in part by a perimeter 411. In the embodiment illustrated in FIGS. 5A-5P, perimeter 411 is D-shaped and defines at least a portion of the inlet 536 of liquid flow path 405. The shape of perimeter 411 and the inlet 536 of liquid flow path 405 is not limited to that configuration, and such components may have any suitable shape as discussed above. In this embodiment, liquid flow path 405 extends from inlet 436 on a first side of sensor module 401 to outlet 537 on a second side of sensor module 401, wherein the first and second sides are opposite to one another. Consequently, a passageway within liquid flow path 405 extends straight or substantially straight between the inlet 536 and the outlet 537. Of course, inlet 536 and outlet 537 of liquid flow path 405 may be sized and positioned differently, with a corresponding difference in the shape of the passageway there between.

In system 500, sensor module 401 further includes air flow path 423. Air flow path 423 includes an inlet 538 and an outlet 539, and is at least partially defined by a perimeter 425. In embodiments fluid detection system 500 is configured such that liquid can move through liquid flow path 405 in a first flow direction and air can move through air flow path 423 in a second flow direction that is opposite the first flow direction. Thus, inlet 538 may be on the same side of sensor module 401 as outlet 537, and outlet 539 may be on the same side of sensor module 401 as inlet 536. In this case the perimeter 425 defines at least a portion of a D-shape outlet 539 of air flow path 423. Of course, outlet 539 and air flow path 423 are not limited to such a configuration and may have any suitable shape, such as but not limited to the cross sectional shapes noted herein for liquid flow path 405.

As best shown in FIG. 5K, 5L, 5M, one or both of liquid flow path 405 and air flow path 423 may be completely defined by sensor cover 501. For example, sensor cover 501 may include first and second extensions that extend inwardly from a top surface 502 of sensor cover 501 towards sensor base 503, and which respectively define at least a portion of liquid flow path 405 and air flow path 423. The first extension may include an inner wall 530 that defines at least a portion of an inward facing side of the liquid flow path 405, and a corresponding outer wall 531. Similarly, the second extension may include an inner wall 532 that defines at least a portion of an inward facing side of the air flow path 423, and a corresponding outer wall 534.

As best shown in FIGS. 5A and 5L, sensor cover 501 may include a groove 513. In the embodiment of FIGS. 5A-5P, groove 513 extends fully around liquid flow path 405, with one side of groove 513 defined by the outer wall 531 of the first extension that defines liquid flow path 405. That configuration is not required, however, and groove 513 may be configured differently. For example, groove 513 may be configured to extend partially around the inlet opening of liquid flow path 405. Regardless of its configuration, groove 513 may be configured to facilitate in-line coupling of the inlet side of sensor module 401 to another component, such as an outlet of a discharge pipe, a backflow preventer, a relief valve or the like. Groove 513 may be configured to house or otherwise support a sealing element (e.g., an O-ring or other type of gasket) therein, wherein the sealing element is configured to form a seal between the inlet side of sensor module 401 and a corresponding surface of a component to which the inlet side is coupled, such as the outlet of a discharge pipe, a backflow preventer, etc.

Sensor cover 501 may include one or a plurality of cover spacers 529, as best shown in FIGS. 5K and 5M. When used, the cover spacers 529 may be in the form of a projection that extends from an underside 504 of sensor cover 501. The cover spacers 529 may extend from and be spaced apart from outer walls 531, 534 by a gap. The gaps between each of the cover spacers may collectively form a first sensor channel 533. The first sensor channel 533 may be sized to receive at least a portion of sensor element 515 and optionally at least a portion of a spacer element 517. In embodiments, cover spacers 529 are each sized and configured such that they are adjacent to or abut a corresponding portion of an inward facing side 542 (shown in FIG. 5N) of sensor base 503 when sensor module 401 is in an assembled state.

Sensor cover 501 may further include a second sensor channel 535 between liquid flow path 405 and air flow path 423. As best shown in FIG. 5M, the second sensor channel 535 may extend across the sensor cover 501 to at least partially separate liquid flow path 405 from air flow path 423. In embodiments the second sensor channel 535 is sized and configured to receive at least a portion of sensor element 515 and optionally at least a portion of spacer element 517 therein. As may be appreciated, the first sensor channel 533 and second sensor channel 535 can receive and support sensor element 515 and optionally spacer element 517 when sensor module is in an assembled state.

As best shown in FIGS. 5H, 5I, 5N and 5O, sensor base 503 includes one or more fastener openings 505. In general, fastener openings 505 may function to facilitate coupling of sensor base 503 to sensor cover 501 and/or another structure, e.g., with one or more fasteners. The number of fastener openings 505 is not limited, and such openings may be omitted.

As further shown in FIGS. 5H, 5I, 5N, and 5O, sensor base 503 includes a cross support 527. In general, cross support 527 functions to support a portion of a sensor element 515 within sensor module 401. In that regard, cross support 527 and cover spacers 529 similarly function to support and maintain the position of the sensor element 515 within sensor module 401. In embodiments, cross support 527 and second sensor channel 535 are sized and positioned such that they extend parallel or substantially parallel to one another when sensor module 401 is in an assembled state.

In an assembled state sensor cover 501 and sensor base 503 form a receptacle for receiving or otherwise coupling to electronics module 413. For example, and as best shown in FIGS. 5M and 5N, sensor cover 501 includes a first cavity 522 and sensor base 503 includes a second cavity 524. The first and second cavities 522, 524 form respective first and second portions of a receptacle for receiving or otherwise coupling to electronics module 413 when sensor cover 501 is coupled to sensor base 503. In embodiments the first cavity 522 and second cavity 524 form respective halves of a receptacle for electronics module 413. Of course, sensor module 401 need not be configured in that manner, and the receptacle for the electronics module 413 may be configured differently. For example, the receptacle for the electronics module 413 may be positioned entirely on sensor cover 501 or entirely on sensor base 503.

Sensor element 515 is generally configured to detect the capacitance within liquid flow path 405. In that regard, sensor element 515 may be configured to function in the same manner and be formed from the same materials noted above in connection with sensor element 407. That is, sensor element 515 is configured to detect capacitance within liquid flow path 405 and to output a sensor signal indicative of a detected capacitance, e.g., to controller 419.

In embodiments, sensor element 515 is in the form of one or more conductive strips and/or wires, which may be formed from copper or any other suitably conductive materials. Without limitation, in embodiments sensor element 515 is in the form of or includes or plurality of conductive strips or wires, such as copper wires or strips, which may be in the form of one or more open circuit conductors (antennas). The number of wires or strips may vary and is not limited. In embodiments, the number of wires or strips is greater than or equal to 1, such as ≥2, ≥3, ≥4, ≥5, ≥10, ≥20, or more. In specific non limiting embodiments, sensor element 515 is in the form of a flat flexible cable (FFC) that includes a plurality of parallel conductors, each conductor of which is laterally offset from one or more adjacent conductors by offset distance that ranges from greater than 0 to about 2.5 millimeters (m), such as from greater than 0 to about 1.5 mm, from greater than 0 to about 1.0 mm, or even from greater than 0 to about 0.5 mm. In a preferred non-limiting embodiment, sensor element 515 is an FFC with 20 parallel conductors, wherein each conductor is offset from one or more adjacent conductors by an offset distance of about 0.5 mm.

In embodiments system 500 and sensor element 515 are physically configured to facilitate detection of the capacitance of liquid flow path 405 and, more particularly, a change in the capacitance of liquid flow path 405 due to the presence of liquid. In that regard, the perimeter 411 may be defined by a wall that is configured to space sensor element 515 from an inward facing side of liquid flow path 405 by a distance R, which may also be referred to herein as a radial distance. This concept is best shown in FIG. 5H, which illustrates an embodiment in which the distance R is equivalent to the thickness of the wall defining perimeter 411. It should be understood that such illustration is for the sake of example only, and that distance R need not be equivalent to the thickness of the wall defining perimeter 411. In any case, the distance R may be any suitable thickness, and embodiments R ranges from greater than 0 to about 25.4 mm (1 inch), such as from greater than 0 to about 12.7 mm (½ inch).

In embodiments the sensor element 515 (or each conductive element therein) may also be configured to facilitate detection of the capacitance within liquid flow path 405. For example, and as best shown in FIG. 5J, sensor element 515 may be in the form of or include one or more conductive strips, wherein each of the conductive strips has an axial width W. In this context, the term axial width means a width in the direction of the conductive element that is parallel an axis extending through liquid flow path 405. W may be any suitable axial width, and in embodiments W ranges from greater than 0 to 127 mm (5 inch), such as from greater than 0 to 63.5 mm (2.5 inches), or even from greater than 0 to about 25.4 mm (1 inch).

The ratio of the axial width W to the distance R can impact the ability of sensor element 515 to detect the capacitance of liquid flow path 405. In embodiments, the ratio of W:R ranges from greater than or equal to about 2:1 to about 10:1, such as from greater than or equal to about 2:1 to about 5:1. In non-limiting preferred embodiments, the ratio of W:R is about 5:1. While smaller ratios and higher ratios are possible, it is noted that performance of sensor element 515 may decrease at a W:R ratio of less than 2:1 and that increasing the ratio beyond 5:1 was not observed to produce significant performance gains relative to a ratio of 5:1. In specific non-limiting embodiments, the ratio of W:R is about 5:1, R is about 12.7 mm (½ inch), and W is about 63.5 mm (2.5 inches).

When a plurality of open circuit conductors (antennas) are used, they may be arranged such that they each extend parallel to one another and are disposed around at least a portion of the liquid flow path 405. Notably, use of a plurality of parallel open circuit conductors can improve the sensitivity of sensor element 515, e.g., allowing sensor element 515 to sense relatively low capacitance values within liquid flow path 405. Pragmatically speaking, this means that sensor element 515 may be able to sense deviations from a relatively low baseline capacitance (e.g., detected within liquid flow path 405 during calibration), without requiring the use of specialize tooling or equipment to produce.

As best shown in FIGS. 5I and 5K, sensor element 515 extends around substantially all (≥95%) of perimeter 411 of liquid flow path 405. With reference to FIG. 5P, at least a portion of sensor element 515 may have a shape that substantially corresponds to a shape of the liquid flow path 405 or, more specifically, the shape of the side of outer wall 531. For example, when liquid flow path 405 or outer wall 531 have a D-shape, at least a portion of sensor element 515 has a D-shape as best shown in FIGS. 5I, 5K, and 5P. When liquid flow path 405 or outer wall 531 have another shape (e.g., a C shape, quadrilateral shape, a single sided (e.g., circular) shape etc.), at least a portion of sensor element 515 may have a corresponding shape. In any case, sensor element 515 is configured such that it can be disposed around the outside of the perimeter 411 of liquid flow path 405, e.g., within the first sensor channel 533 and the second sensor channel 535 noted above. In that regard, cross support 527 of sensor base 503 functions to support the section of sensor element 515 that extends within the second sensor channel 535. Notably, no portion of sensor element 515 is present within liquid flow path 405.

As best shown in FIG. 5K, sensor module further includes a spacer element 517. In general, spacer element 517 functions to maintain the position of sensor element 515 within first and second sensor channels 533, 535, and in some cases to insulate sensor element from other components of sensor module 401—such as outer walls 531, 534, and/or cover spacer(s) 529. To that end, spacer element 517 may be formed from any suitable material. In embodiments, spacer element 517 is formed from or includes an insulating material, such as but not limited to an insulating foam. Non-limiting examples of insulating foams that can be used include open or closed cell foams, such as open or closed cell neoprene foam, ethylene propylene diene monomer (EPDM) foam, styrene butadiene rubber (SBR) foam, combinations thereof and the like. Without limitation, spacer element 517 is preferably a closed cell insulating foam.

As best shown in FIG. 5P, sensor element 515 has a proximal end 543 and a distal end 544. The proximal end 543 is coupled to a sensor terminal 519. In general, sensor terminal 519 functions to communicatively couple sensor element 515 to a corresponding input terminal on sensor PCB 521. As noted previously, sensor PCB 521 generally functions to communicatively couple sensor element 515 to controller 419. In that regard, sensor PCB 521 includes receiving terminals 523 that are configured to couple to corresponding controller terminals 525 when fluid detection system 500 is in an assembled state, i.e., when electronics module is disposed within a receptacle formed by sensor cover 501 and sensor base 503 and controller terminals 525 are coupled to receiving terminals 523 on sensor PCB 521.

Figure 6A:
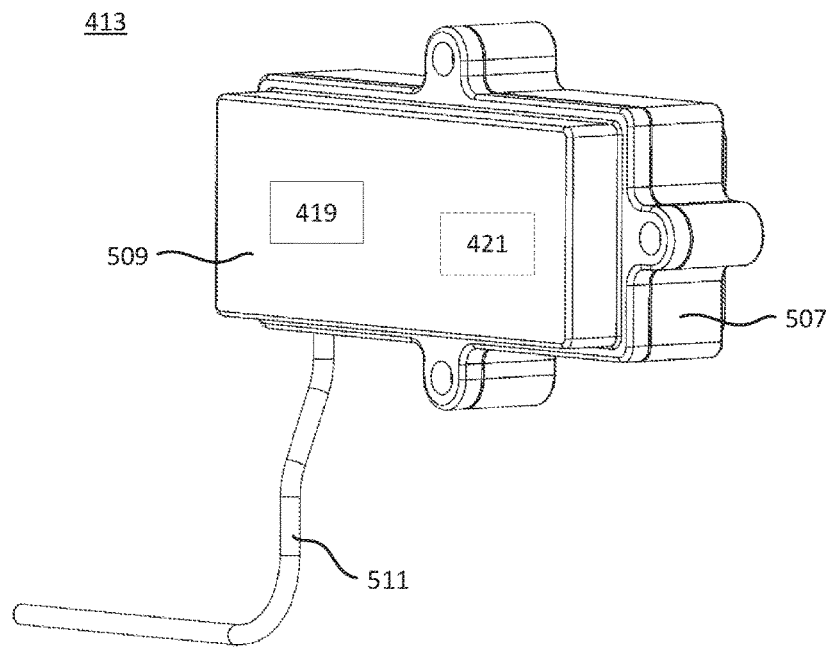
FIGS. 6A and 6B are front and rear perspective views, respectively, of one example of an electronics module for a fluid detection system consistent with the present disclosure.
Figure 6B:
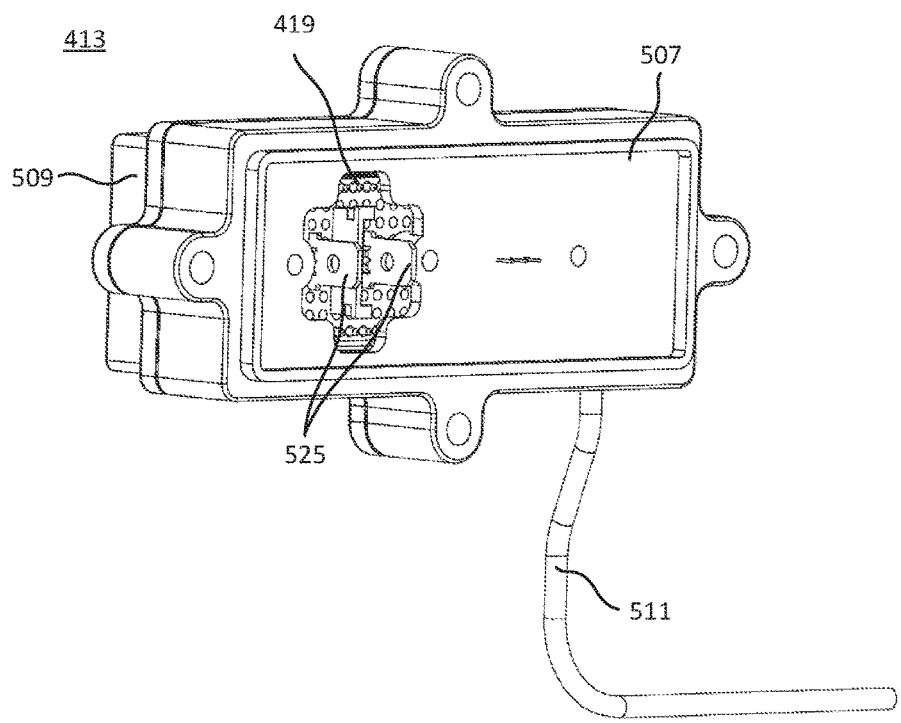

FIGS. 6A and 6B depict front and back views, respectively, of one example of an electronics module 413 consistent with the present disclosure. As shown electronics module 413 includes an electronics base 507 and electronics cover 509. Electronics base 507 and electronics cover 509 are configured to detachably couple to one another in any suitable manner, such as by a mechanical fastener, a form locking connection, a snap fit connection or the like. When so coupled, the electronics base 507 and electronics cover 509 define an electronics housing that includes a cavity for housing a controller 419 and an optional user interface 421, as shown in FIG. 6A. The nature and function of controller 419 and user interface 421 are the same as described above in connection with FIG. 4, and so are not reiterated. As best shown in FIG. 6B, electronics module 413 includes controller terminals 525 that are configured to communicatively couple controller 419 to sensor PCB 521, as described above. While FIG. 6B depicts controller terminals 525 in the form of two prongs, any type and shape of terminals may be used.

Electronics module 413 further includes a cable 511, as best shown in FIGS. 6A and 6B. Cable 511 is generally configured to provide power to the components of electronics module 413, and to provide a wired connection to a communications system (not shown) that may be used to send notification messages in response to a detected wet and/or flood event. In embodiments, cable 511 may also provide a connection to earth ground for sensor element 515. However, sensor element 515 may be ground in another manner as discussed above in connection with sensor element 407.

As noted above, when sensor module 401 includes a receptacle for receiving and coupling to electronics module 413. With that in mind, electronics module 413 may be sized and configured such that it can detachably couple the receptacle provided by sensor module 401, such that sensor module 401 is communicatively coupled to electronics module 413 (e.g., such that controller terminals 525 couple to receiving terminals 523 of sensor PCB 521).

In use, sensor module 401 may be coupled in-line with the outlet of another component, such as the outlet or inlet of a discharge pipe (or other fluid conduit), an outlet or inlet of a backflow preventer, an outlet or inlet of a check or relief valve, or the like. In any case, sensor element 515 may sense the capacitance within liquid flow path 405 and produce a sensor signal indicative of the detected capacitance. When the electronics module 413 is communicatively coupled to the sensor module 401 (e.g., as shown in FIG. 5A), the sensor signal may be provided to controller 419 via sensor terminal 519, sensor PCB 521, receiving terminals 523, and controller terminals 525. In any case, the controller 419 may determine a detected capacitance within liquid flow path 405 based at least in part on the sensor signal. Controller 419 may then determine whether a wet condition, a dry condition, and/or a flood condition is occurring based on the detected capacitance and a capacitance threshold, as previously described in association with FIG. 4. The baseline capacitance may be determined based on a capacitance of liquid flow path 405 measured during a calibration operation, e.g., in response to actuation of a calibration button or another interface element of user interface 421. If one or more of such conditions are detected, the controller 419 may cause a notification message to be sent to an external device, e.g., via communications circuitry that is communicatively coupled to controller 419. Such communications circuitry may be within sensor module 401, electronics module 413, and/or within a separate component that is communicatively coupled to controller 419 in any suitable manner.

While the present disclosure focuses on the use of the disclosed fluid detection systems in conjunction with the detection of fluid flow from an outlet of a relief valve or a backflow preventer, the fluid detection systems are not limited to such end uses. Indeed, the fluid detection systems described herein can be used to detect fluid that is passing through an outlet of any suitable fluid conduit, such as may be used in a fluid (e.g., water) supply system, a hot water heater, a recreational vehicle water system, or the like. For example, the fluid detection systems described herein may be used to couple to and detect fluid flow from one or more valves, pipes, conduits, low pressure regions, combinations thereof, and the like.

Figure 8A:
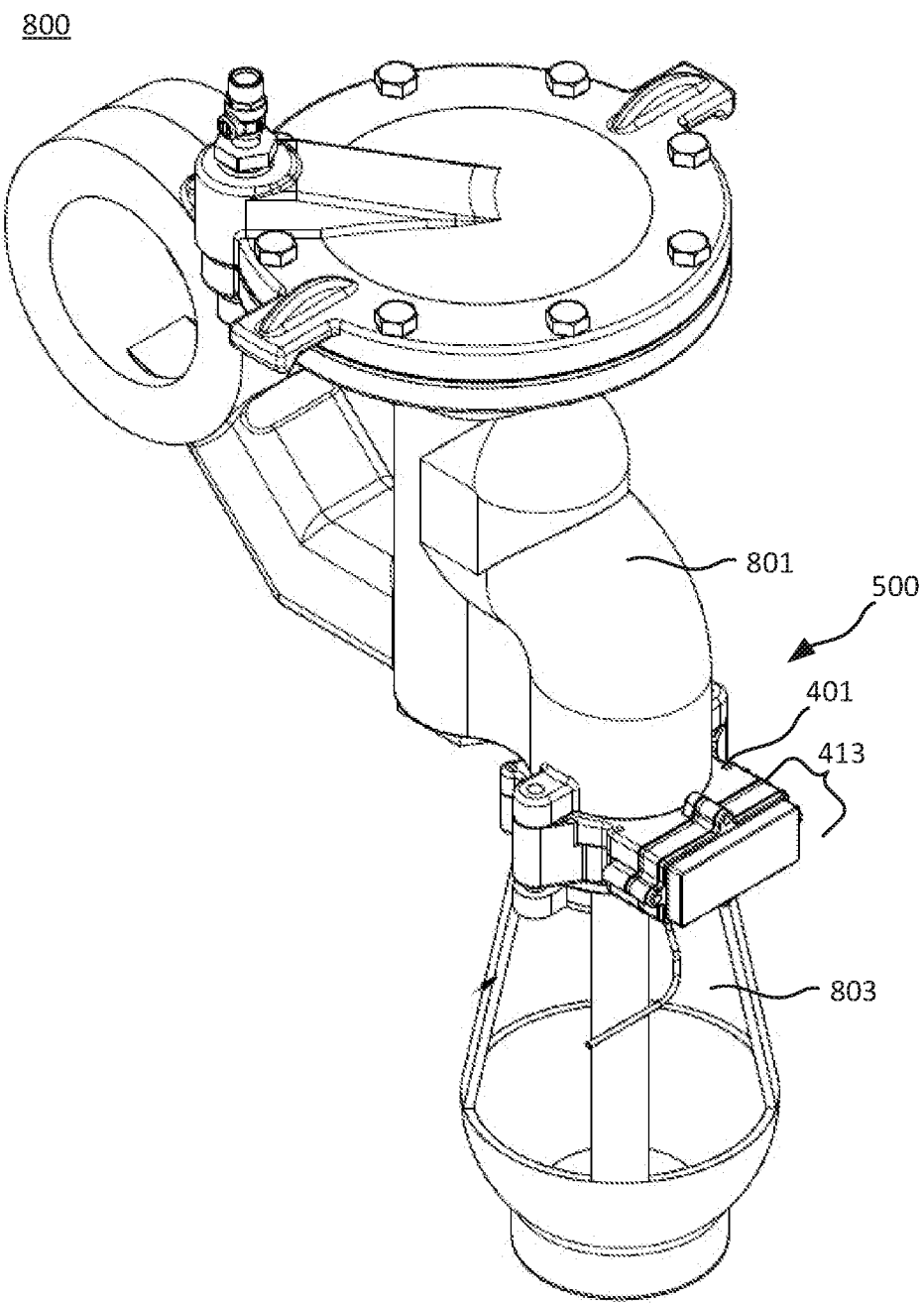
FIGS. 8A-8C are various views of one example of a backflow prevention system including a fluid detection system consistent with the present disclosure.
Figure 8B:
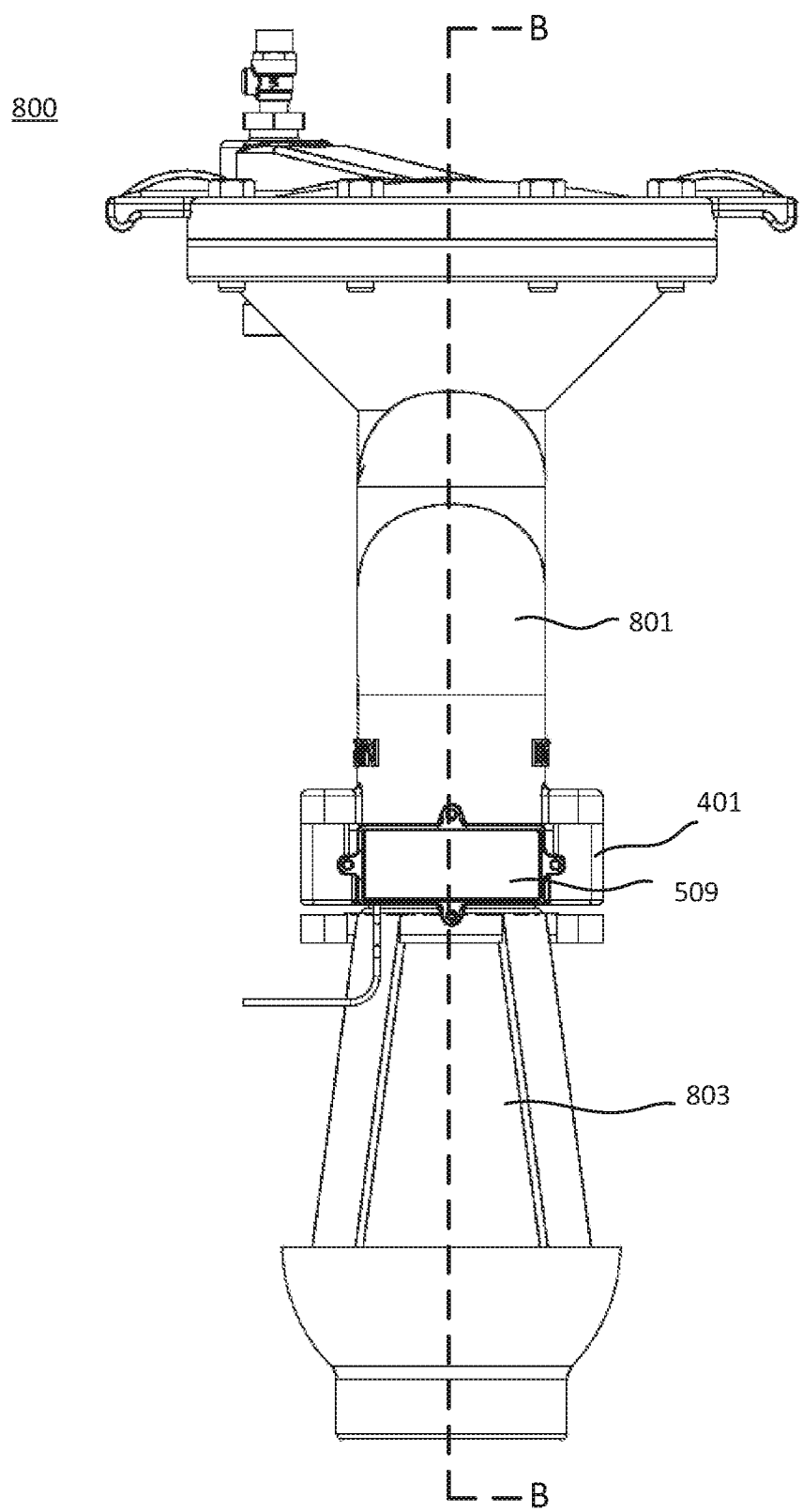
Figure 8C:
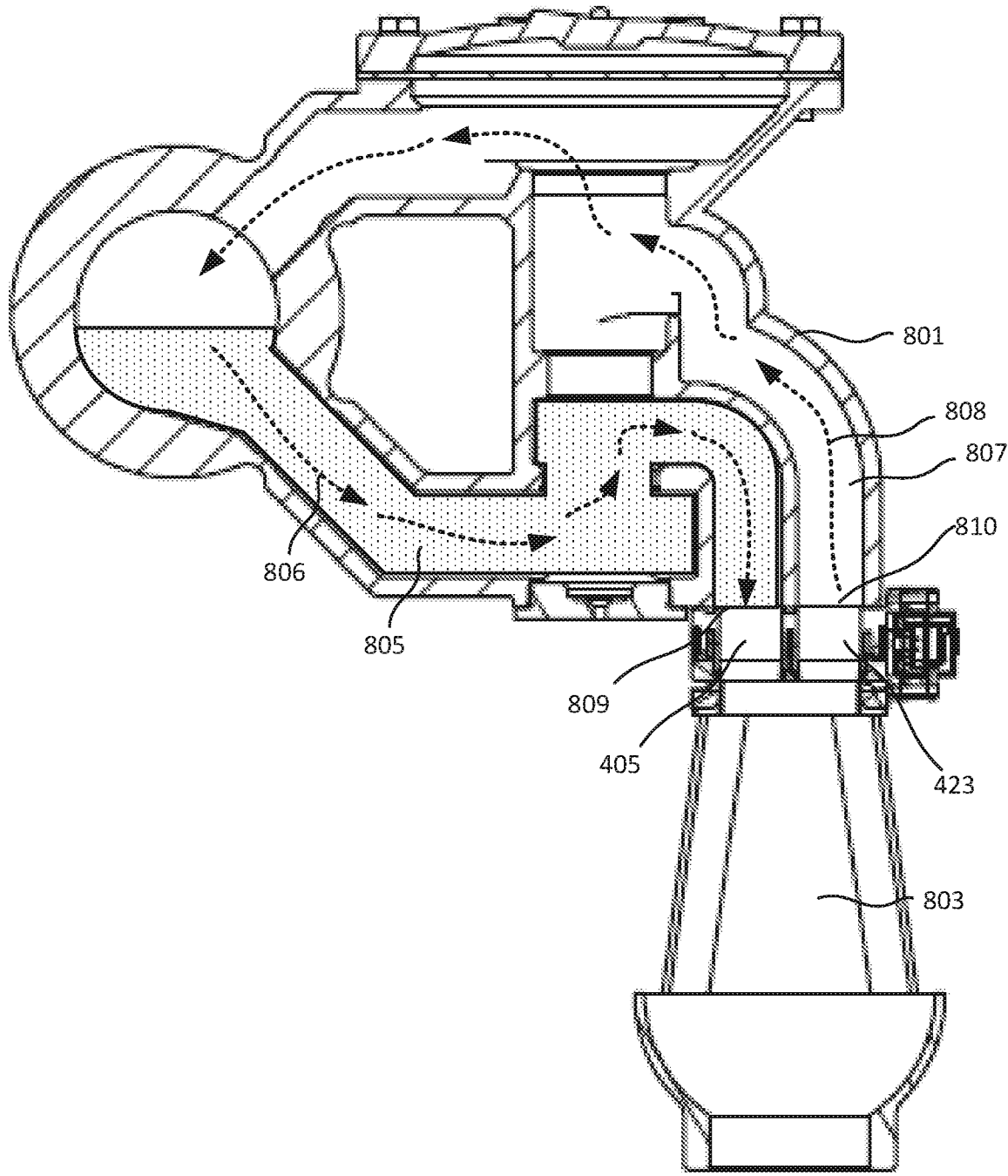

With the foregoing in mind and for the sake of illustration of one example end use, FIGS. 8A-8C depict one example of a relief valve leak detection system that includes a fluid detection system 500 consistent with the present disclosure. As shown, relief valve leak detection system 800 includes relief valve 801, fluid detection system 500, and an air gap 803. As best shown in FIG. 8C (which is a cross sectional diagram along plane B shown in FIG. 8B), relief valve includes a liquid flow path 805 with a liquid flow outlet 809, and an air flow path 807 with an air flow inlet 810. The liquid flow path 805 is configured to convey a liquid flow 806 to liquid flow outlet 809, and the air flow path 807 is configured to receive an air flow 808 via air flow inlet 810. As further shown in FIG. 8C, fluid detection system 500 is coupled to relief valve 801 such that liquid flow path 405 is fluidly coupled to liquid flow outlet 809, and air flow path 423 is fluidly coupled to air flow inlet 810. The outlet side of fluid detection system 500 is coupled to a proximal end of air gap 803, and a discharge pipe (not shown) may be coupled to a distal end of air gap 803.

In operation, relief valve 801 may regulate the pressure within a component of a liquid supply system, such as a water supply system. Under normal operating conditions liquid may flow through relief valve 801 to a downstream component at a pressure that is less than a threshold pressure of relief valve 801. Under such conditions, liquid will typically not flow through liquid flow path 805 and liquid flow outlet 809. If the pressure within relief valve exceeds threshold pressure or if relief valve malfunctions, however, liquid may flow through liquid flow outlet 809 and through liquid flow path 405, which flow may be facilitated by the flow of air into air flow inlet 810 and into air flow path 807.

Consistent with the foregoing disclosure, fluid detection system 500 may monitor the capacitance of liquid flow path 405 to determine whether liquid is present within the liquid flow path, which may be indicative of an overpressure or other faulty condition of relief valve 801. To accomplish that function, when fluid detection system 500 is installed as shown in FIG. 8A, a calibration operation may be executed to establish a baseline capacitance within liquid flow path 405. Alternatively, the baseline capacitance may be pre-set. In any case, the sensor element within fluid detection system 500 may monitor the capacitance of liquid flow path 405 and provide a sensor signal indicative of that capacitance to a controller, e.g., with electronics module 413. The controller may then determine the detected capacitance in the liquid flow path 405, and determine whether a wet, dry, and/or flood event is occurring in liquid flow path 405 based at least in part on the detected capacitance as previously described. When a wet event is detected (e.g., when the detected capacitance is at or above a capacitance threshold, either independently or for greater than or equal to a (first) measurement period), the controller may record the wet event, and may optionally determine whether a flood event is occurring. The controller may make that determination, for example, based at least in part on a comparison of a total number of wet events occurring within a (second) measurement period and a threshold number of wet events for that (second) measurement period. For example, if the total number of wet events in the (second) measurement period meets or exceeds the threshold number of wet events for that (second) measurement period, the controller may determine that a flood event is occurring. Conversely, if the total number of wet events is less than the threshold number of wet events for the (second) measurement period, the controller may determine that a flood event is not occurring.

Figure 9:
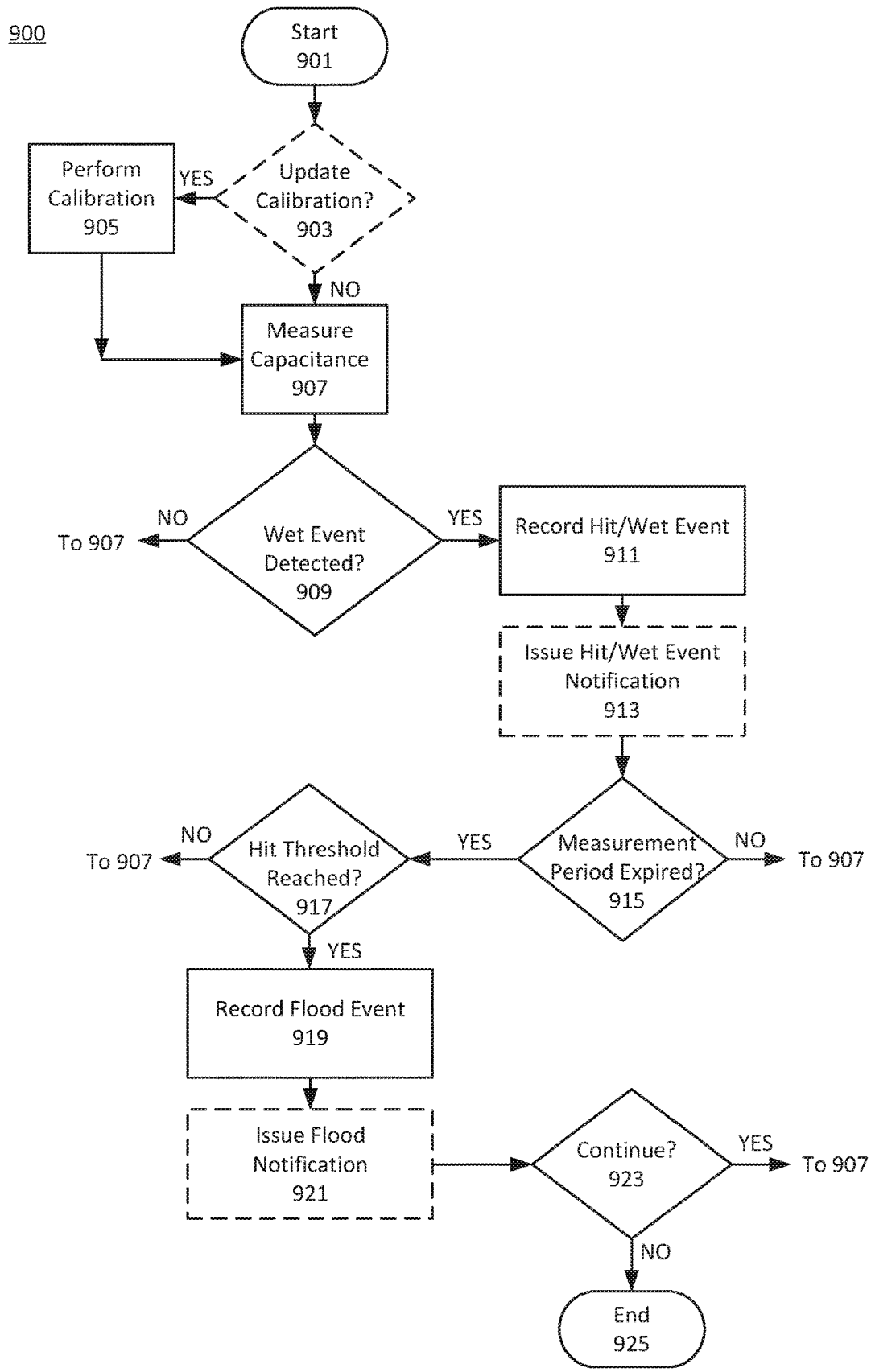
FIG. 9 is a flow diagram of one example of a method of detecting fluid, consistent with the present disclosure.

Reference is now made to FIG. 9, which is a flow diagram of one example of a method for detecting a fluid (e.g., with a fluid detection system) consistent with the present disclosure. As shown, method 900 begins with start block 901. The method may then proceed to optional block 903, pursuant to which a determination may be made as to whether a calibration of a fluid detection system consistent with the present disclosure needs to be updated. When such operations are performed the outcome of block 903 may depend on various such the length of time since the calibration of the fluid detection system was last set, whether a calibration button has been pressed on a user interface of the system, etc.

If the calibration is to be updated the method may proceed from block 903 to block 905, pursuant to which calibration operations consistent with the present disclosure are performed. In embodiments such calibration operations include measuring a capacitance within a liquid flow path with a sensor element, conveying a sensor signal indicative of that capacitance to a controller, determining the detected capacitance with the controller, and setting a baseline capacitance value to the detected capacitance. The calibration operations may also include setting a threshold capacitance value relative to the baseline capacitance value. For example, the threshold capacitance value may be set to a capacitance value that is offset above the baseline capacitance value by a predetermined margin, such as about 1, 5, 10, 15, 20, 25, 30, 35, 40, or even 50% of the baseline capacitance value.

Once calibration operations are performed or if the operations of block 903 are omitted the method may proceed to block 907, pursuant to which a capacitance of a liquid flow path is measured. Consistent with the foregoing discussion, the capacitance of a liquid flow path may be measured at least in part with a sensor element that is disposed at least partially around the liquid flow path. More specifically, the sensor element may sense the capacitance within the liquid flow path and output a sensor signal indicative of the capacitance to a controller. The controller may then determine the detected capacitance within the liquid flow path based at least in part on the sensor signal.

The method may then proceed to block 909, pursuant to which a determination may be made (e.g., by a controller) as to whether a wet event has occurred based at least in part on the detected capacitance in the liquid flow path as noted above. If not, the method may loop back to block 907. But if so, the method may proceed to block 911, pursuant to which the controller records a wet event (or "hit"), e.g., in a memory thereof. The method may then proceed to optional block 913, pursuant to which a hit/wet event notification may be sent, e.g., to an external device. For example, and consistent with the above description, in response to detection of a hit/wet event, the controller may cause communications circuitry to issue a notification message indicative of that event to an external device, via wired or wireless communication.

Following block 913 or if the operations of block 913 are omitted, the method may proceed to block 915, pursuant to which a determination may be made (e.g., by a controller) as to whether a (second) measurement period has expired. The (second) measurement period may be set to any desired amount of time and may fall within the second measurement period ranges described above. If the measurement period has not expired the method may loop back to block 907. If the measurement period has expired, however, the method may proceed to block 917.

Pursuant to block 917 a determination may be made (e.g., by a controller) as to whether a flood event is occurring within the liquid flow path. To that end a controller may perform flood event detection operations consistent with the present disclosure, wherein such operations include determining a total number of wet events detected in a (second) measurement period, comparing the total number of wet events to a threshold number of wet events for the (second) measurement period, and determining whether a flood event has occurred based on that comparison. When the total number of wet events in the (second) measurement period is less than the threshold number of wet events for that (second) measurement period, a determination is made that a flood event has not occurred and the method may loop back to block 907. When the total number of wet events for the (second) measurement period meets or exceeds the threshold number of wet events for that (second) measurement period, however, determination is made that a flood event has occurred and the method proceeds to block 919, pursuant to which a flood event may be recorded by the controller, e.g., in a memory thereof. The method may then proceed to optional block 921, pursuant to which a flood notification message may be issued in the same manner as the hit/wet notification message described above in connection with block 913.

Once a flood notification message has been sent or if the operations of block 921 are omitted the method may proceed to block 923, pursuant to which a determination may be made (e.g., by a controller) whether the leak detection method is to continue. If so, the method loops back to block 907. But if not, the method proceeds to block 925 and ends.

FIGS. 10A-10M illustrate another example of a fluid detection system consistent with the present disclosure. As shown, fluid detection system 1000 includes a sensor module 401 and an electronics module 413. The function of sensor module 401 and electronics module 413 are largely the same as described above in connection with FIG. 4, and so will not be reiterated in detail. This embodiment is also functionally similar to system 500 described above but lacks an air flow path 423. As may be appreciated, fluid detection system 1000 may be particularly useful to detect leaks from smaller water systems, such as residential water systems, recreational vehicle water systems, hot water heaters, and the like.

Figure 10A:
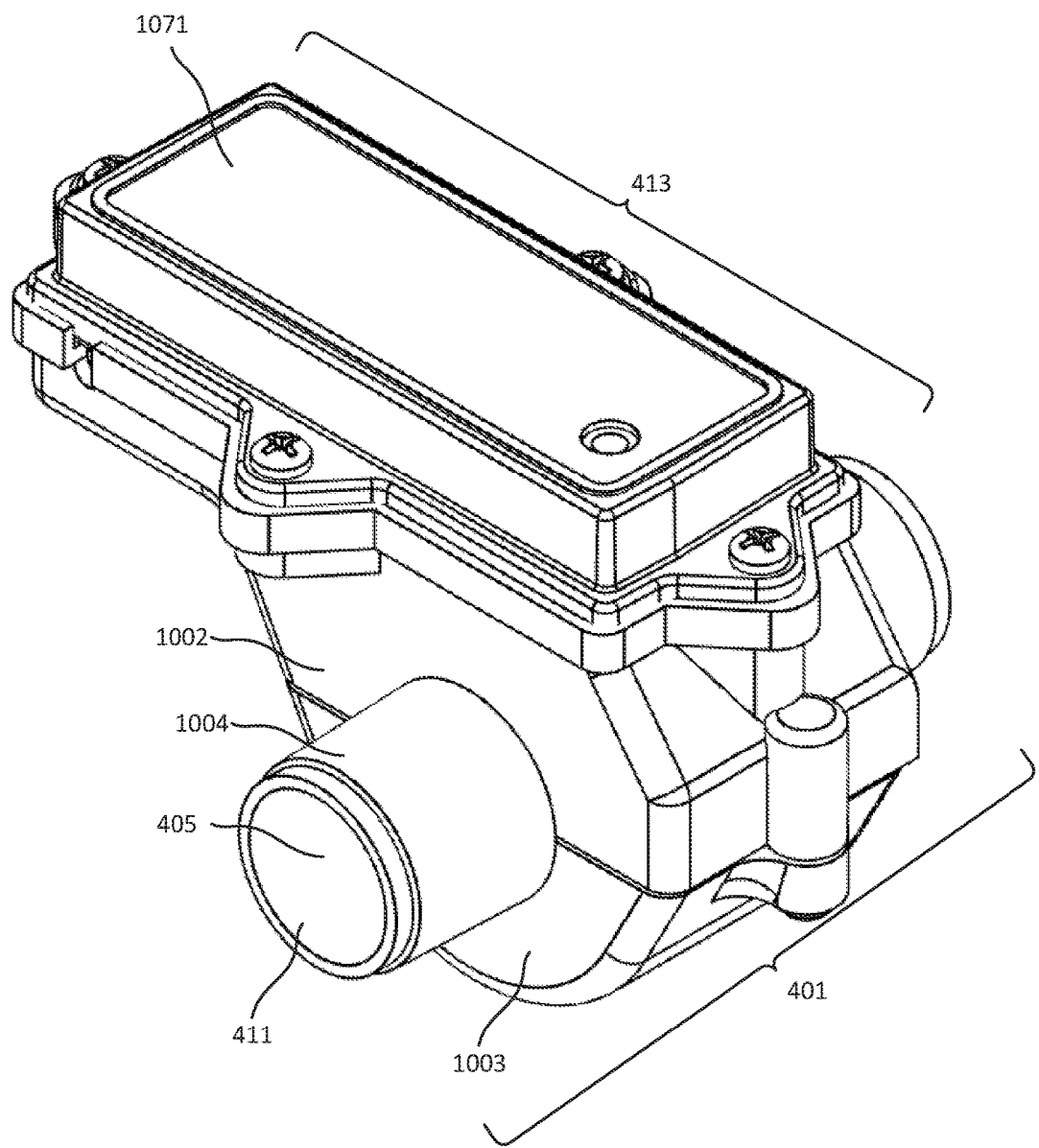
FIGS. 10A-10M depict various views of another example of a fluid detection system consistent with the present disclosure.
Figure 10B:
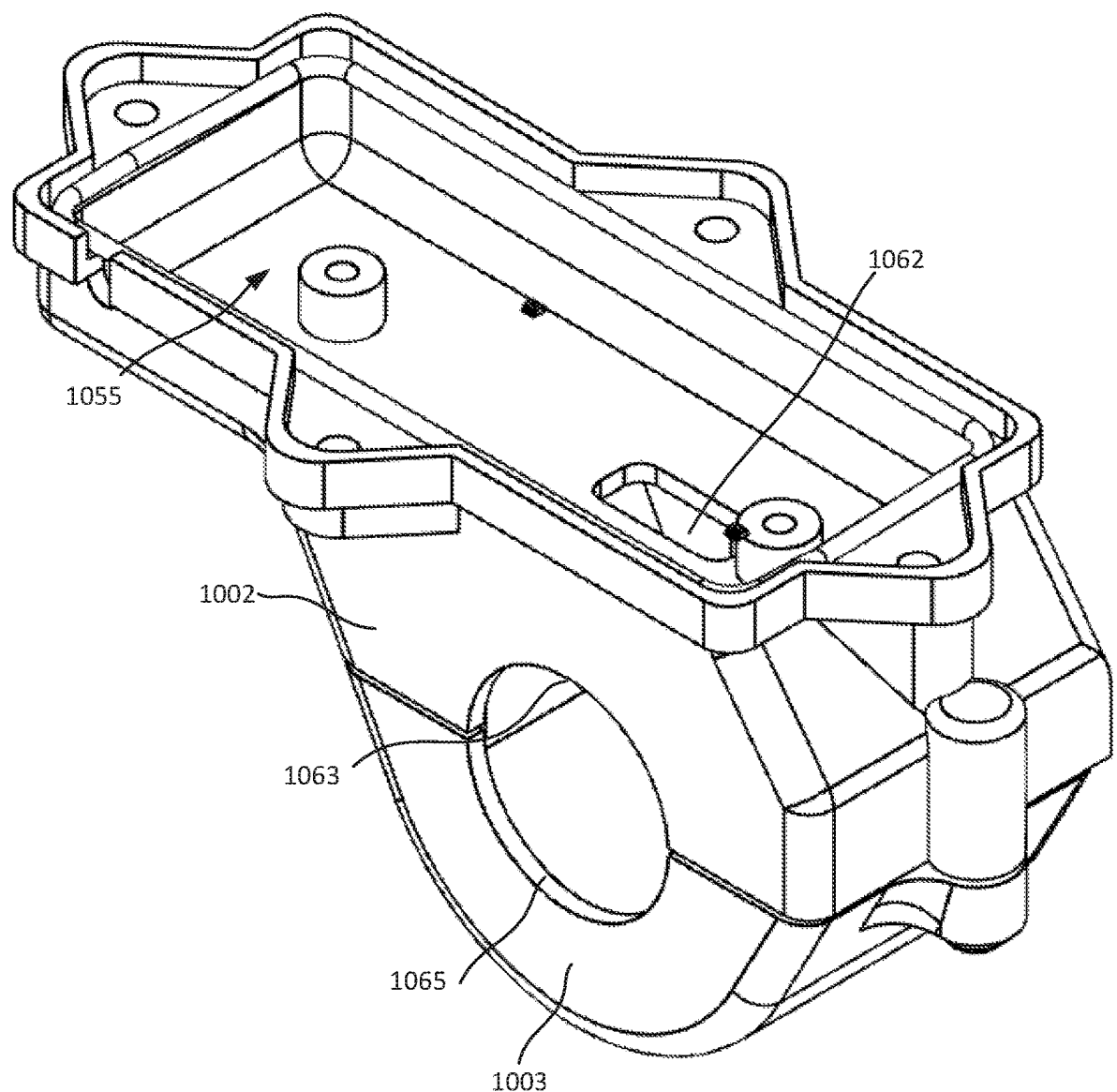
Figure 10C:
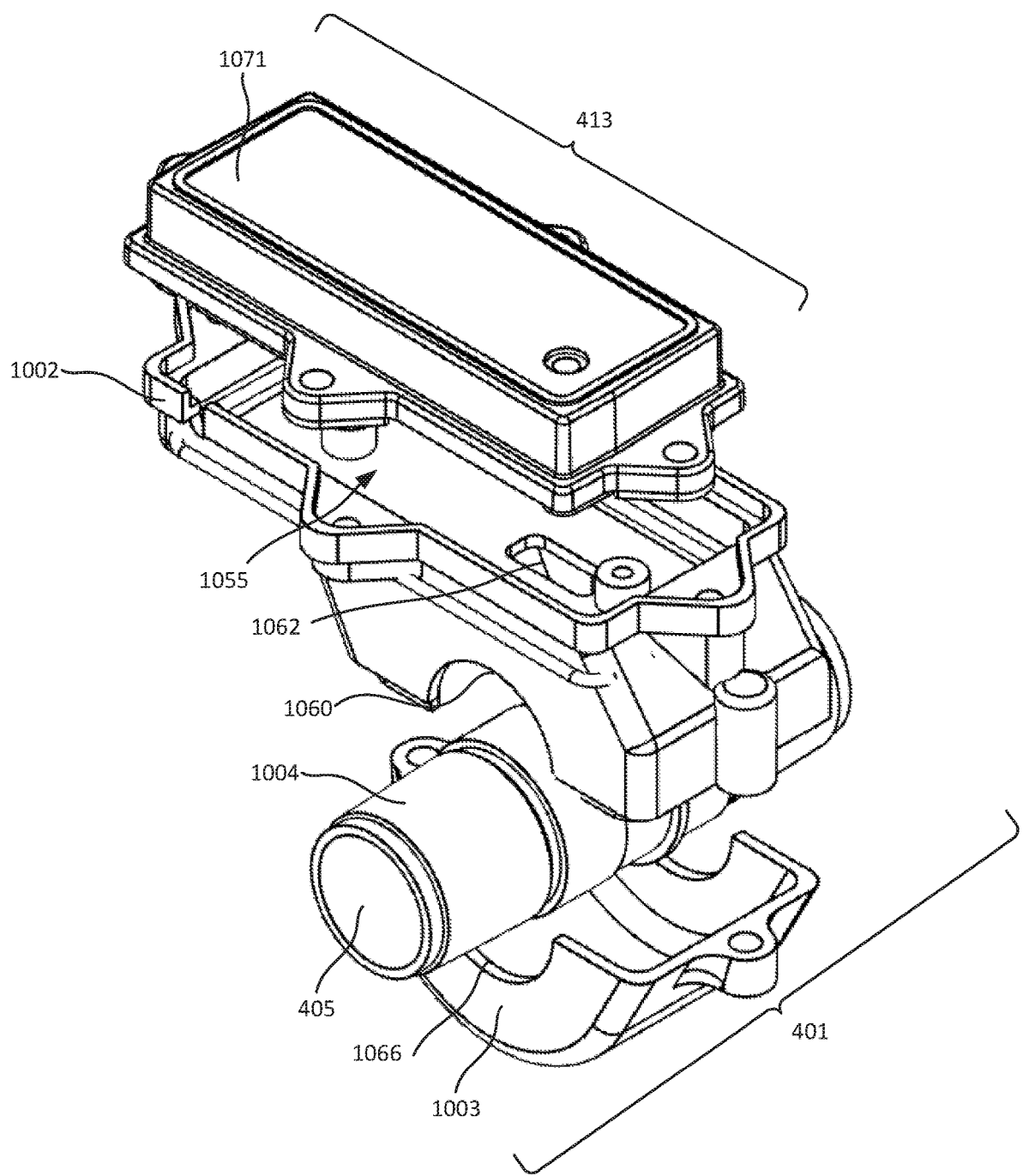
Figure 10D:
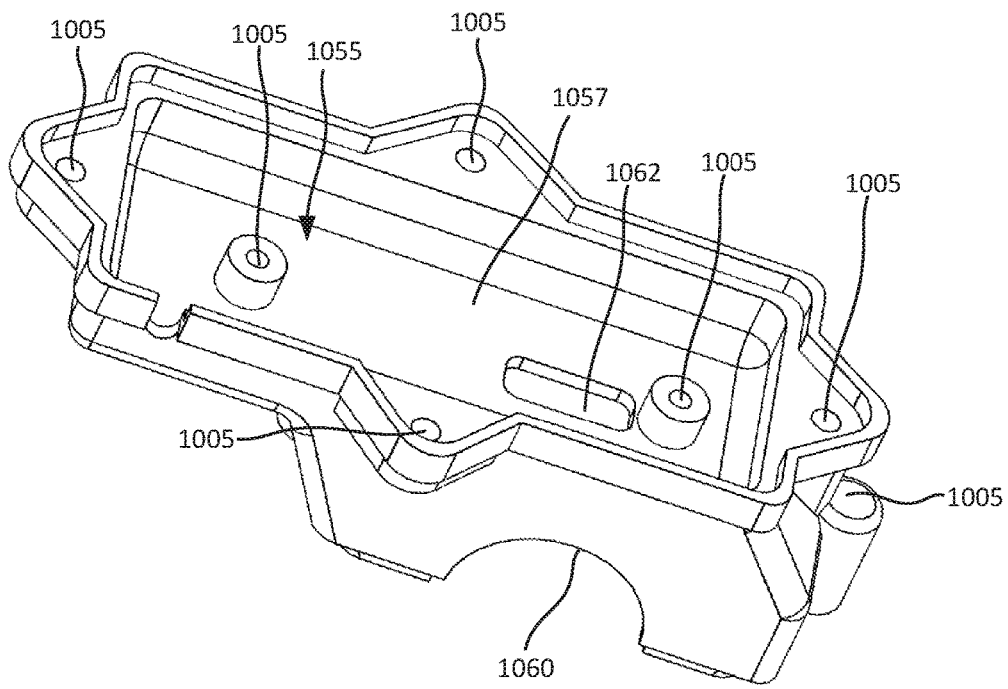
Figure 10E:
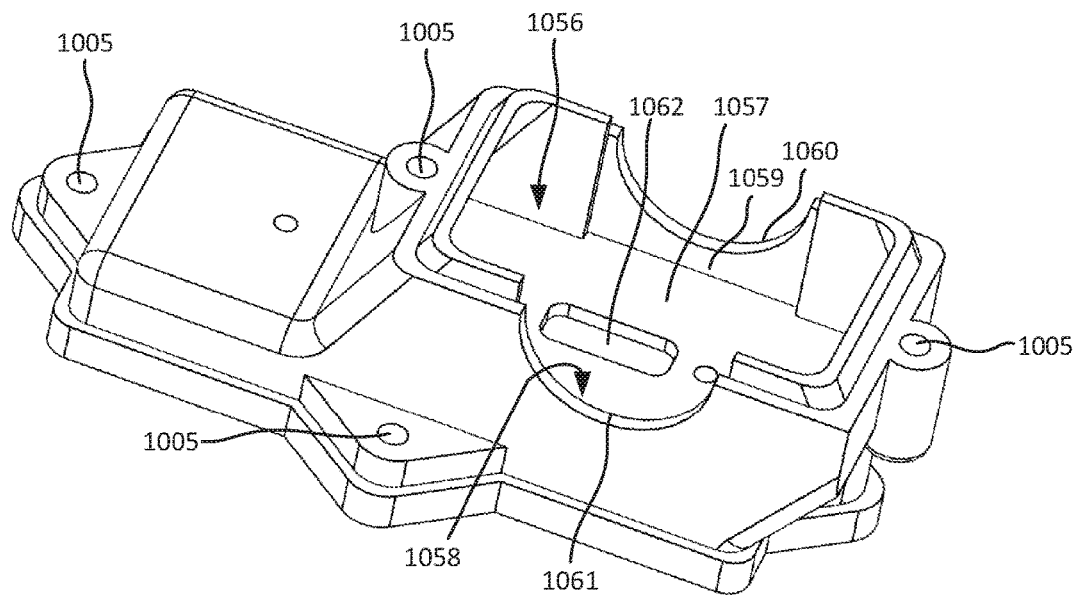
Figure 10F:
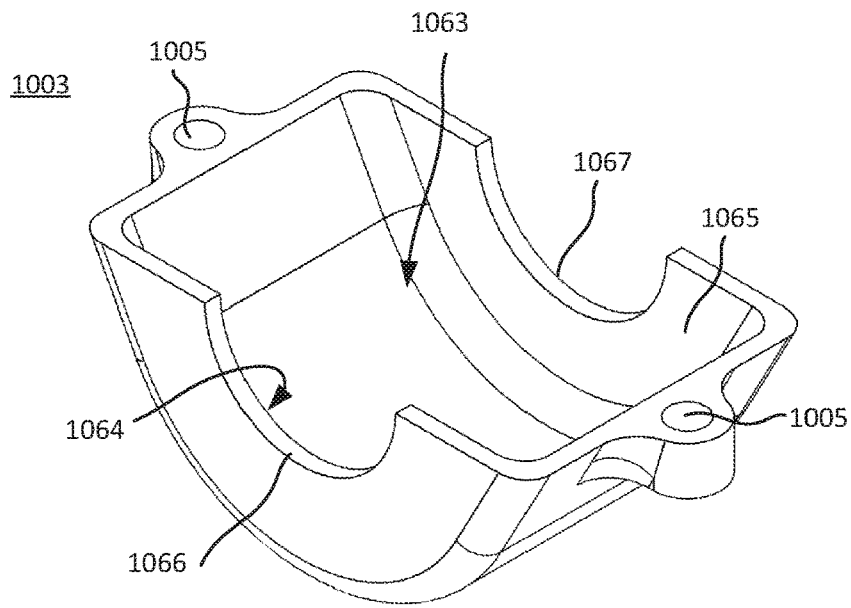
Figure 10G:
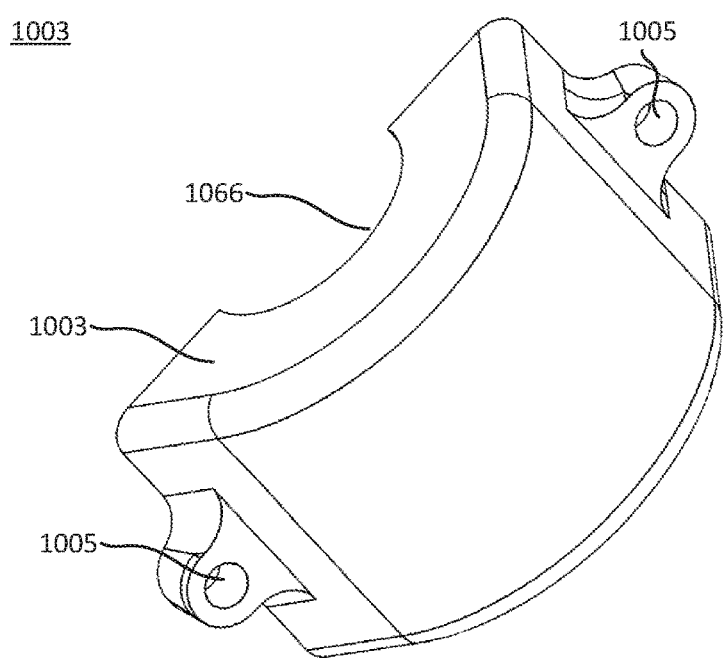
Figure 10H:
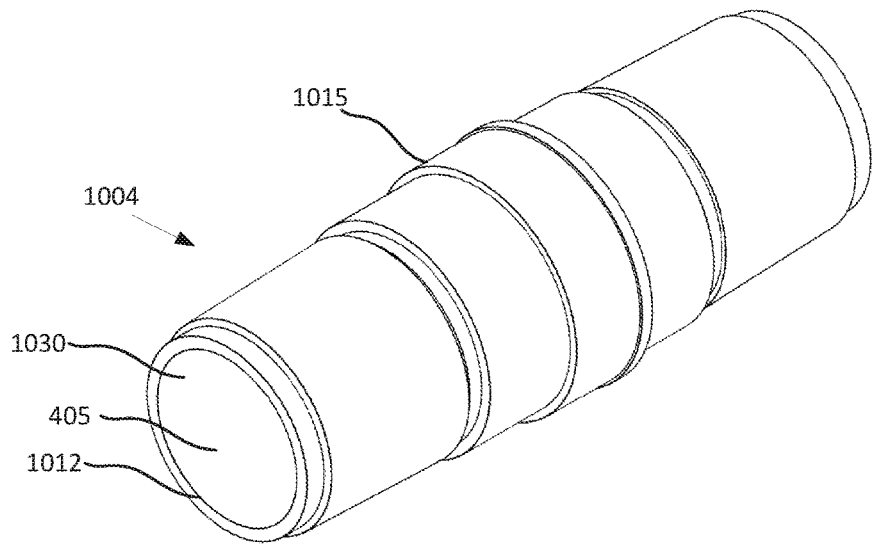
Figure 10I:
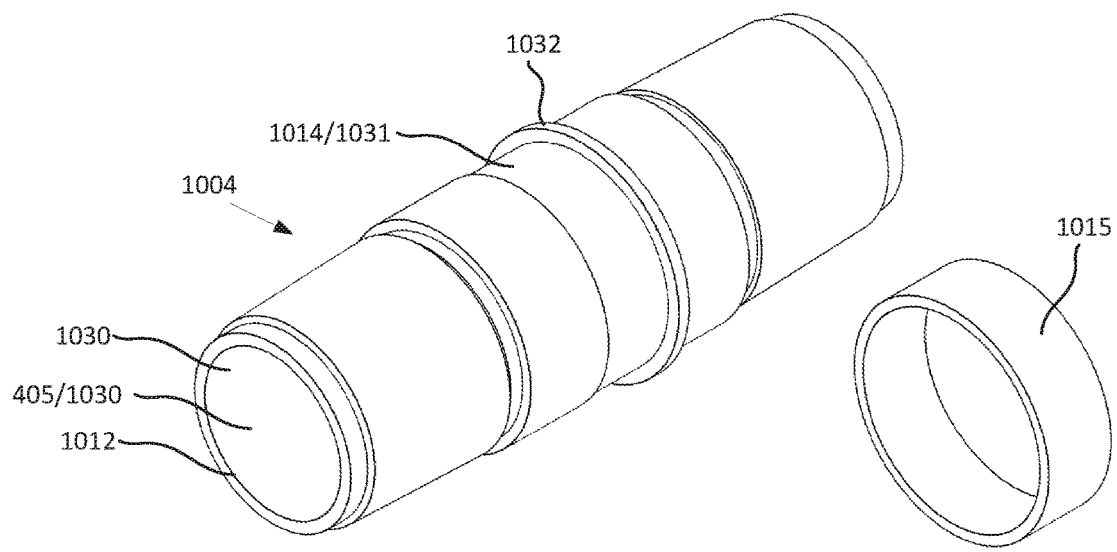
Figure 10J:
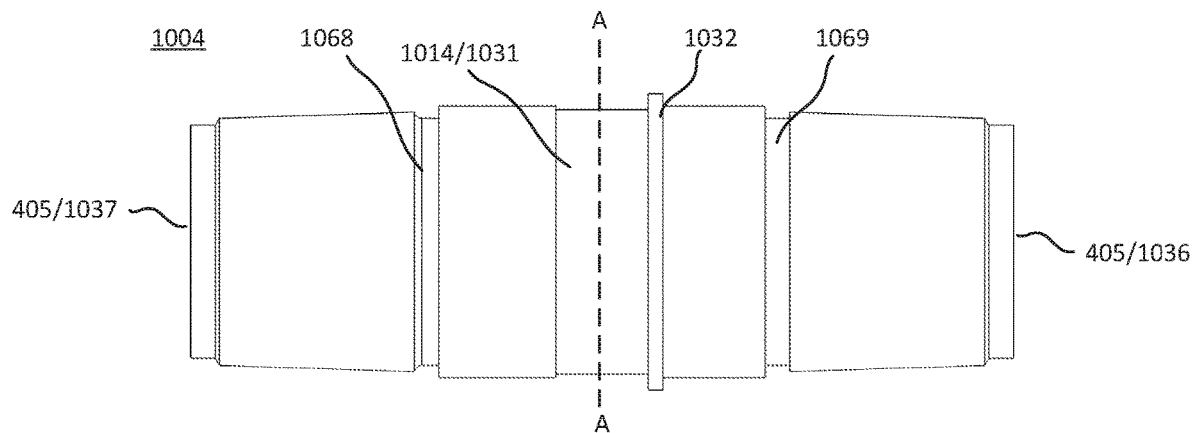
Figure 10K:
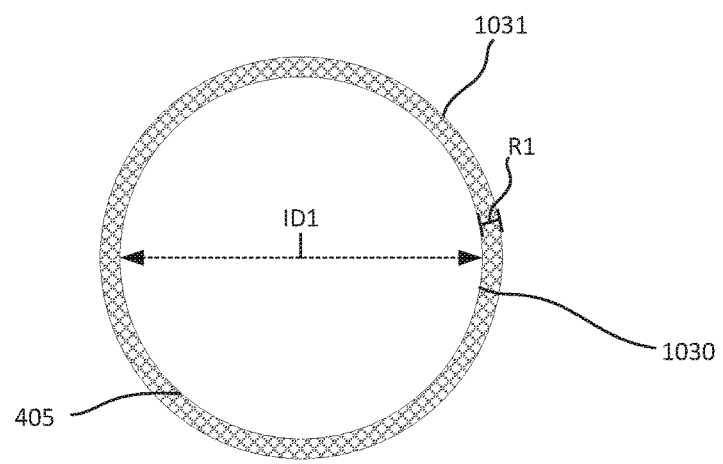
Figure 10L:
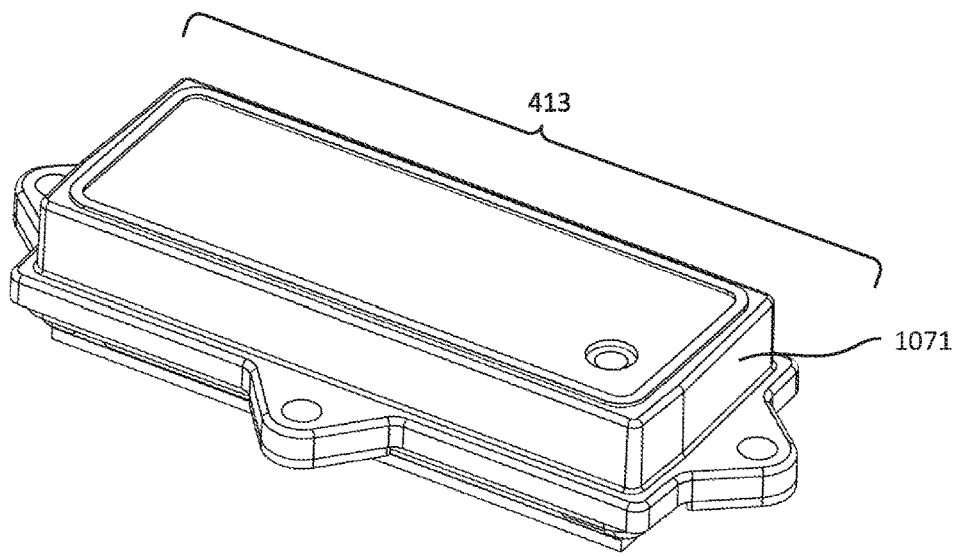
Figure 10M:
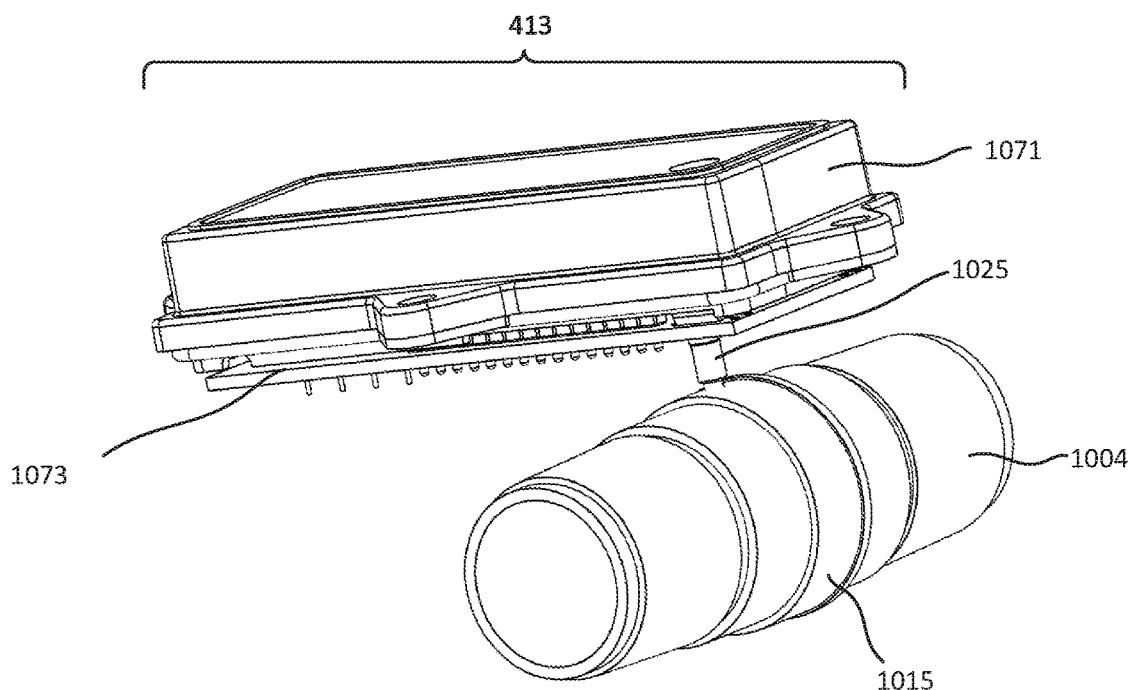

As best shown in FIGS. 10A, 10C, and 10M, electronics module 413 is separable from sensor module 401. That is, electronics module 413 may be physically connected and disconnected from sensor module 401, such that fluid detection system 1000 is in an assembled or disassembled state. In the assembled state a controller (e.g., a controller 419 as described above in connection with FIG. 4) is present within electronics module 413 and is communicatively coupled to a sensor element 1015 in sensor module 401. The controller within electronics module 413 may be communicatively coupled to sensor element 1015 in any suitable manner. For example, and as will be described later, when system 1000 is in an assembled state, sensor element 1015 is communicatively coupled to a controller in electronics module 413 by one or more contacts, such as one or more spring-loaded pins.

As best shown in FIG. 10C, sensor module 401 includes a sensor cover 1002, a sensor base 1003, a conduit part 1004, and a sensor element 1015. The sensor cover 1002 and sensor base 1003 are separable from one another. When sensor cover 1002 and sensor base 1003 are coupled to one another they form a sensor housing, as best shown in FIG. 10B. The way sensor cover 1002 and sensor base 1003 can be coupled to one another is not limited. In embodiments, sensor cover 1002 and sensor base 1003 are coupled by one or more fasteners (e.g., screws), a weld, an interference fit between corresponding parts of sensor cover 1002 and sensor base 1003, combinations thereof, and the like. To that end, sensor cover 1002 and sensor base 1003 may include one or more fastener openings 1005 that are configured facilitate coupling of sensor cover 1002 to sensor base 1003 and/or another structure, e.g., with one or more fasteners. The number of fastener openings 1005 is not limited, and any or all such openings may be omitted.

As shown in FIGS. 10B-10D, sensor cover 1002 includes a cover body that includes a first cover cavity 1055 and a second cover cavity 1056. The first cover cavity 1055 is generally configured to receive or otherwise couple to electronics module 413. The way sensor cover 1002 (and, more particularly, first cover cavity 1055) couples to electronics module 413 is not limited, and such components may be coupled in any suitable manner. For example, sensor cover 1002 may couple to electronics module 413 via one or more fasteners, an adhesive, a weld, an interference fit, or the like. In embodiments, sensor cover 1002 is configured to couple to electronics module 413 using one or more fasteners that extend through one or more fastener openings 1005, e.g., within first cover cavity 1055. At least some of the fastener openings 1005 of the sensor cover 1002 may be positioned to align with corresponding fastener openings 1005 of electronics module 413, such that a fastener may be placed therein to couple sensor cover 1002 with electronics module 413. Regardless of how sensor cover 1002 is coupled to electronics module 413, it may include an opening 1062 that facilitates coupling of a controller in electronics module 413 with sensor element 1015, as described in more detail later.

Second cover cavity 1056 is generally configured to form part of a passageway within sensor module 401 through which conduit part 1004 extends when sensor module 401 is in an assembled state. In that regard, second cover cavity 1056 includes opposing first and second cover sidewalls 1058, 1059, which respectively include a first cover receptacle 1060 and a second cover receptacle 1061. As will be described layer, first and second cover receptacles 1060, 1061 are configured to form part of a passageway through which conduit part 1004 can extend when sensor cover 1002 is coupled to sensor base 1003.

In embodiments and as shown in FIGS. 10D and 10E, second cover cavity 1056 may be positioned substantially opposite at least a portion of first cover cavity 1055, with a cover divider wall 1057 therebetween. In embodiments, cover divider wall 1057 preferably defines at least a portion of both first cover cavity 1055 and second cover cavity 1056. For example, and as shown in FIGS. 10D and 10E, cover divider wall 1057 may form at least part of a bottom wall of first cover cavity 1055 and may also form at least part of a top wall of second cover cavity 1056. In any case, an opening 1062 may be formed through cover divider wall 1057 to facilitate coupling of a controller in electronics module 413 with sensor element 1015.

As best shown in FIGS. 10F and 10G, sensor base 1003 includes a base body that defines a base cavity 1063. Like second cover cavity 1056, base cavity 1063 is generally configured to form part of a passageway within sensor module 401 through which conduit part 1004 extends when sensor module 401 is in an assembled state. Base cavity 1063 is defined at least in part by one or more sidewalls of the base body. For example, and as best shown in FIG. the base body includes opposing first and second base sidewalls 1064, 1065, which respectively include first and second base receptacles 1066, 1067—which are configured to form part of a passageway through which conduit part 1004 can extend when sensor base 1003 and is coupled to sensor cover 1002.

As noted above, sensor base 1003 is configured to couple to sensor cover 1002 to form a passageway for conduit part 1004. The way sensor base 1003 couples to sensor cover 1002 is not limited, and such components may be coupled in any suitable manner. For example, sensor base 1003 may couple to sensor cover 1002 via one more fasteners, an adhesive, a weld, an interference fit, or the like. In embodiments, sensor base 1003 is configured to couple to sensor cover 1002 using one or more fasteners that extend through one or more fastener openings 1005 on sensor base 1003 and sensor cover 1002, as best shown in FIGS. 10A and 10C. In such instances, at least some fastener openings 1005 of sensor base 1003 may be positioned to align with corresponding fastener openings 1005 of sensor cover 1002, such that a fastener may be placed therein to couple sensor base 1003 to sensor cover 1002.

Conduit part 1004 is configured to provide a liquid flow path through which a liquid may flow when system 1000 is in use. Conduit part 1004 is also configured to support and/or position sensor element 1015 relative to the liquid flow path, such that sensor element 1015 can detect a capacitance within the liquid flow path. With that in mind and as best shown in FIGS. 10A and 10H-10K, conduit part 1004 has a conduit part body that includes a liquid flow path 405 defined at least in part by an inner wall 1030 of the conduit part body, and which extends from an inlet 1036 to an outlet 1037. In the embodiment illustrated in FIGS. 10A-10M, inlet 1036 and outlet 1037 form have a circular-shaped perimeter 1012, but such openings may have any suitable shape. In the illustrated embodiment inlet 1036 and outlet 1037 are also substantially opposite to one another, such that the course liquid flow path 405 between the inlet and outlet 1036, 1037 is substantially straight. Inlet 1036 and outlet 1037 of liquid flow path 1035 can be sized and positioned differently, resulting in a corresponding difference in the shape and course of the passageway therebetween.

As best shown in FIG. 10J, conduit part 1004 includes a groove 1014 (which may also be referred to as a sensor channel) that extends at least partially (and preferably fully) around the outer wall 1031. The groove 1014 includes at least one groove sidewall and a bottom defined at least in part by outer wall 1031. The depth of groove 1014 (i.e., the height of one or more of the groove sidewalls) is not limited, and in some embodiments is greater than or equal to the thickness of sensor element 1015. In embodiments and as also shown in FIG. 10J, at least one of the sidewalls of the groove 1014 is or is adjacent to a ridge 1032 that extends radially outward from the surface of outer wall 1031. Regardless of its configuration, groove 1014 is configured to position sensor element 1015 at a desired location. In embodiments, ridge 1032 is configured to align sensor element 1015 within the sensor housing, e.g., to facilitate coupling of sensor element 1015 with a controller 419 in electronics module 413 via an electronics terminal 1025. Conduit part 1004 also includes first and second alignment rings 1068, 1069, as shown in FIG. 10J. In general, first alignment ring 1068 is positioned and configured to receive at least a portion of an edge of first cover receptacle 1060 and first base receptacle 1066 when fluid detection system 1000 is in an assembled state. Similarly, second alignment ring 1069 is positioned and configured to receive at least a portion of an edge of second cover receptacle 1061 and second base receptacle 1067 when fluid detection system 1000 is in an assembled state. In that way, first and second alignment rings 1068, 1069 can facilitate alignment of sensor element 1015 within the sensor housing.

The function of sensor element 1015 is the same as sensor elements 407 and 515 described above, and so is not reiterated in detail. That is, sensor element 1015 is generally configured to detect the capacitance within liquid flow path 405 of conduit part 1004. As shown in FIG. 10I, sensor element 1015 may be a band that is formed from or includes a conductive material, such as copper, aluminum, gold, or any other suitably conductive material. In any case, sensor element 1015 is configured to extend around the outer wall 1031 of conduit part 1004, e.g., within groove 1014.

Groove 1014 and outer wall 1031 may be configured to position sensor element 1015 such that sensor element 1015 can detect the capacitance (or a change in capacitance) within liquid flow path 405. More specifically, the groove 1014 and outer wall 1031 may be configured such a thickness R1 is defined between outer wall 1031 within groove 1014 and inner wall 1030 of liquid flow path 405 (best shown in FIG. 10K), wherein R1 is selected to space sensor element 1015 at a desired distance from the inner wall 1030. That concept is best shown in FIG. 10K, which illustrates an embodiment in which the distance R1 is equivalent to the thickness between inner wall 1030 and the surface of outer wall 1031 within groove 1014. The value of R may vary depending on the size of liquid flow path 405, the size of sensing element 1015, and other parameters. In embodiments, R1 is in a range of about 0.1 inches (2.5 millimeters (mm)) to about 0.5 inches (12.7 mm), such as about 0.15 inches (3.8 mm) to about inches (7.6 mm), or even about 0.2 inches (5.1 mm) to about 0.25 inches (6.4 mm) Without limitation, R1 is preferably about 0.2 to 0.3 inches (5.1-7.6 mm) when an when an internal diameter (ID1) of liquid flow path 405 is about 1 inch (25.4 mm) Of course, R1 is not limited to such ranges and liquid flow path 405 may have any suitable internal diameter.

As best shown in FIGS. 10H and 10I, sensor element 1015 preferably extends around substantially all (≥95%) of outer wall 1031. With reference to FIG. 10I, at least a portion of sensor element 1015 has a shape that substantially corresponds to a shape of the liquid flow path 1035 or, more specifically, the shape of the side of outer wall 1031 within groove 1014. For example, when liquid flow path 1035 or outer wall 1031 has a circular cross-sectional shape, a D shape, a C-shape, a 4 or more-sided shape, or the like, at least a portion of sensor element 1015 may have a corresponding shape. Notably, no portion of sensor element 1015 is present within liquid flow path 405.

In this embodiment electronics module 413 includes an electronics cover 1071 that is configured to couple to sensor cover 1002, e.g., via one or more fasteners as described above. Electronics module 413 further includes electronics circuitry 1073 (e.g., a controller), which is configured to be disposed between electronics cover 1071 and sensor cover 1002, e.g., within first cover cavity 1055. As best shown in FIG. 10M, electronics module 413 further includes an electronics terminal 1025 that is configured to communicatively couple a controller within electronics module 413 to sensor element 1015 when fluid detection system 1000 is in an assembled state. Electronics terminal 1025 may have any suitable configuration and may be formed of or include any suitable electrically conductive material (e.g., metals such as copper, aluminum, gold, and the like). In embodiments, electronics terminal 1025 is in the form of a pin that is configured to extend through opening 1062 within cover divider wall 1057, such that a first end of the pin electrically contacts electronics circuitry 1073 and a second end of the pin electrically contacts a portion of sensor element 1015. Without limitation, electronics terminal 1025 is preferably biased towards sensor element 1015, e.g., with a spring or other biasing mechanism. In such instances, electronics terminal 1025 may be referred to as a spring-loaded pin.

In an assembled state (as shown in FIG. 10A), sensor base 1003 and sensor cover 1002 are coupled to one another and define a passageway through which conduit part 1004 extends. An edge of first cover receptacle 1060 and an edge of first base receptacle 1066 are disposed within first alignment ring 1068, and an edge of second cover receptacle 1061 and an edge of second base receptacle 1067 are disposed within second alignment ring 1069. When conduit part 1004 is so positioned, at least a portion of sensor element 1015 within groove 1014 is aligned with the opening 1062 in cover divider wall 1057. Electronics module 413 is coupled to sensor cover 1002 via one or more fasteners as described above. When electronics module 413 is so coupled, electronics terminal 1025 (e.g., a spring-loaded pin) extends through opening 1062 to contact a portion of the surface of sensor element 1015 as described above. In that way, sensor element 1015 is communicatively coupled to the controller within electronics module 413 by electronics terminal 1025. The fluid sensor system 1000 may then be used to detect the presence or absence of fluid in liquid flow path 405, e.g., in the same manner as described above connection with fluid detection systems 400, 600, and 800.

Although not shown, fluid detection system 1000 may include a cable, e.g., for providing power to the components of electronics module 413, and optionally to provide a wired connection to a communications system that may be sued to send notifications in response to a detected wet and/or flood event. The cable may also provide a connection to earth ground for sensor element 1015. However, sensor element 1015 may be ground in another manner as discussed above in connection with sensor element 407.

Figure 13:
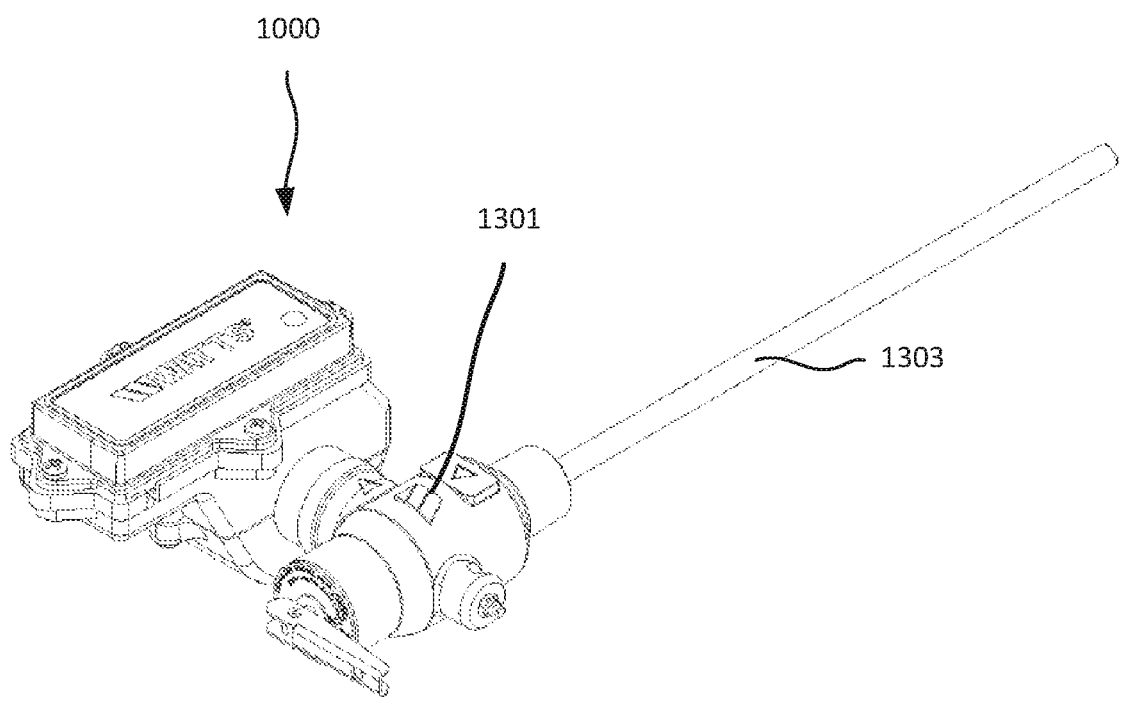
FIG. 13 shows one example of a valve system coupled to a fluid detection system consistent with FIGS. 10A-10M.

FIG. 13 depicts one example of a valve leak detection system that includes a fluid detection system 1000 consistent with the present disclosure. As shown, valve leak detection system 1400 includes a fluid detection system 1000 coupled to a valve system 1301. In this case valve system 1301 is in the form of a temperature and pressure (T & P) relief valve that includes a thermal actuator 1303, e.g., as described in U.S. Pre-Grant Publication No. 2020/0141773, which is incorporated herein by reference. More particularly, valve system includes and inlet proximate to thermal actuator 1303, an outlet fluidly coupled to fluid detection system 1000, and a control valve (not shown) that is located between the inlet and the outlet and is configured to fluidly couple the inlet to the outlet upon the detection of at least one fluid condition, such as a fluid overpressure or over temperature condition. In operation, the inlet of valve system 1301 may be coupled to a water storage device, such as a water heater, such that thermal actuator 1303 extends into the water storage device. So connected, valve system 1301 may monitor fluid conditions within the water storage device, such as fluid pressure and fluid temperature. When fluid conditions are within acceptable parameters, a control valve within valve system 1301 may be in a closed state, preventing a flow of fluid from the inlet of valve system 1301 to the outlet of valve system 1301 and thus, preventing the flow of fluid into the liquid flow path 405 of fluid detection system 1000. When fluid conditions are outside acceptable parameters (e.g., in an over pressure or over temperature condition), the control valve within valve system 1301 may move to an open state, fluidly coupling the inlet and outlet of valve system 1301. In that state, fluid may flow through valve system 1301 and into the liquid flow path 405 fluid detection system 1000.

Consistent with the foregoing disclosure, fluid detection system 1000 may monitor the capacitance of liquid flow path 405 to determine whether liquid is present within the liquid flow path—which may be indicative of a faulty condition of valve system 1301 or fluid conditions within the water storage device that are out of specification. To accomplish that function, when fluid detection system 1000 is installed as shown in FIG. 13, a calibration operation may be executed to establish a baseline capacitance within liquid flow path 405. Alternatively, the baseline capacitance may be pre-set. In any case, the sensor element 1015 within fluid detection system 1000 may monitor the capacitance of liquid flow path 405 and provide a sensor signal indicative of that capacitance to a controller, e.g., within electronics module 413. The controller may then determine the detected capacitance in the liquid flow path 405, and determine whether a wet, dry, and/or flood event is occurring in liquid flow path 405 based at least in part on the detected capacitance as previously described. The controller may also perform recording and reporting operations as previous described.

Figure 11A:
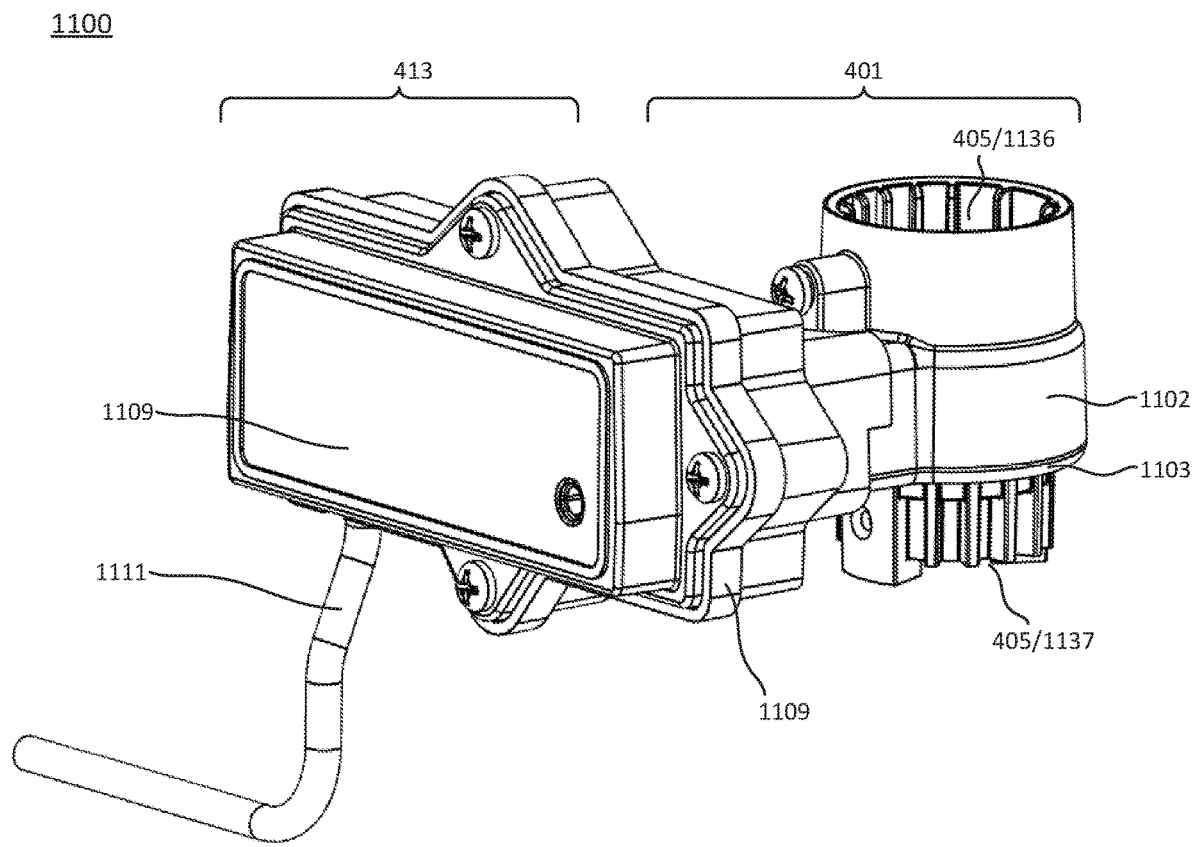
FIGS. 11A-11O depict various views of another example of a fluid detection system consistent with the present disclosure.
Figure 11B:
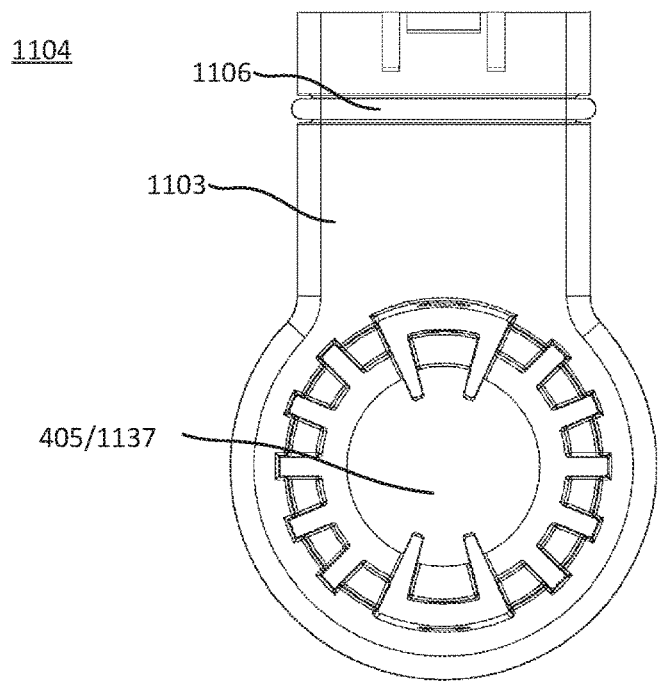
Figure 11C:
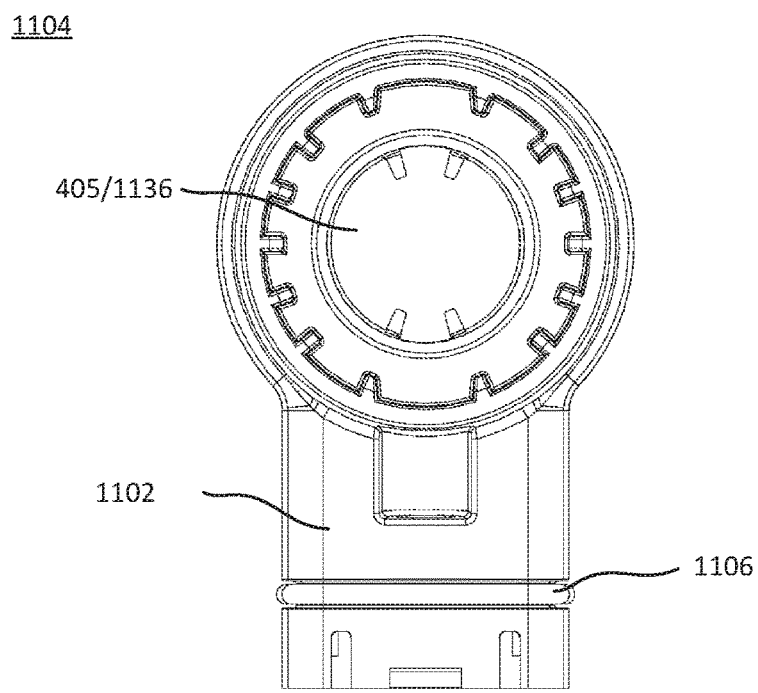
Figure 11D:
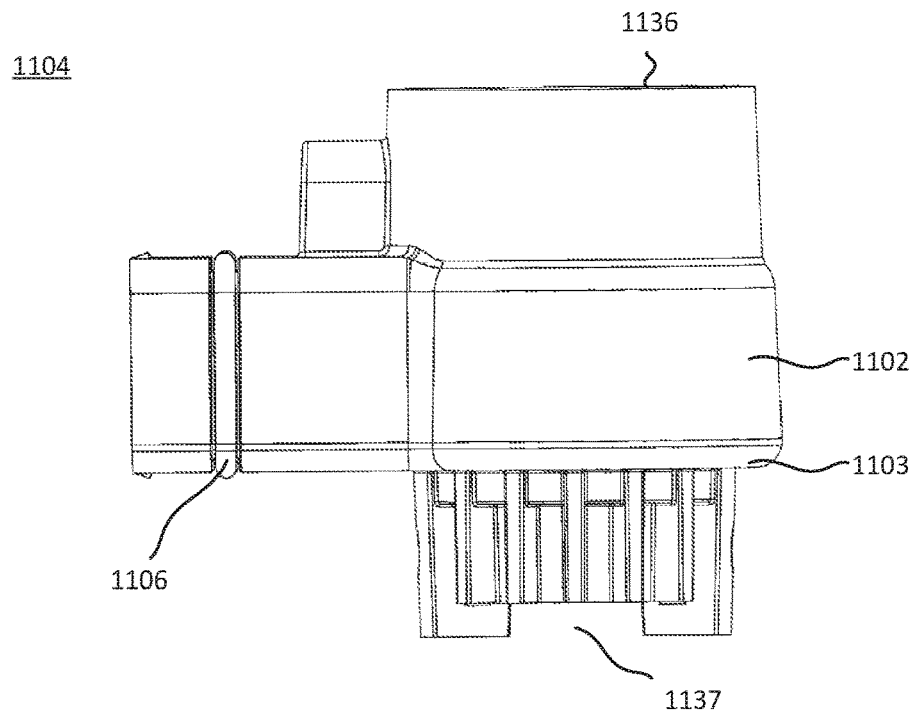
Figure 11E:
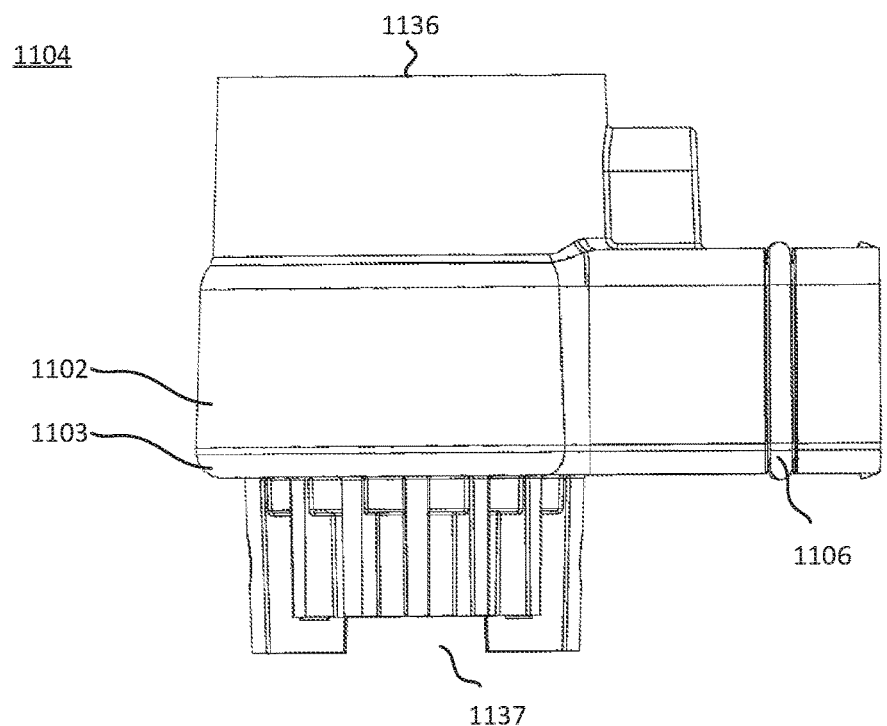
Figure 11F:
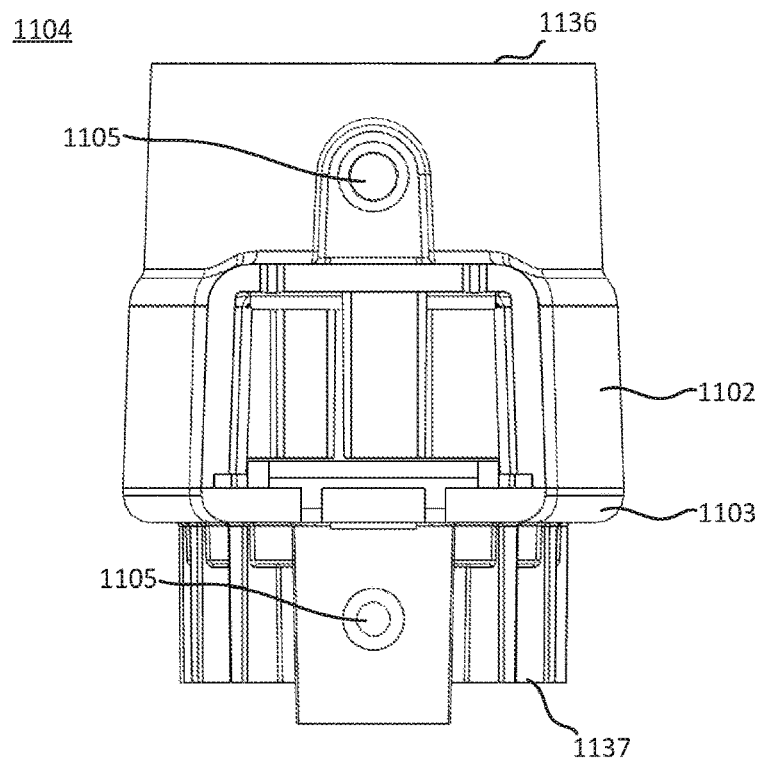
Figure 11G:
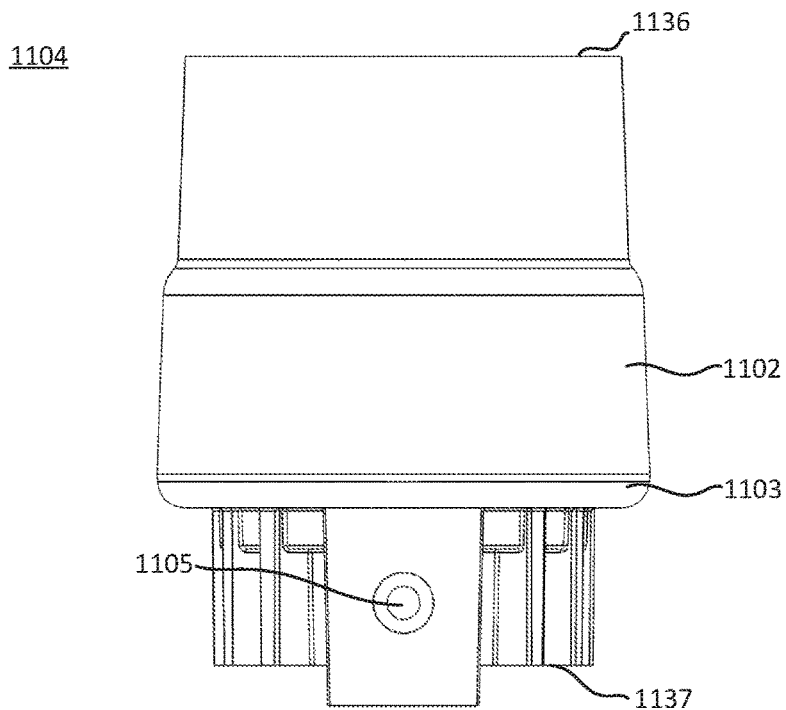
Figure 11H:
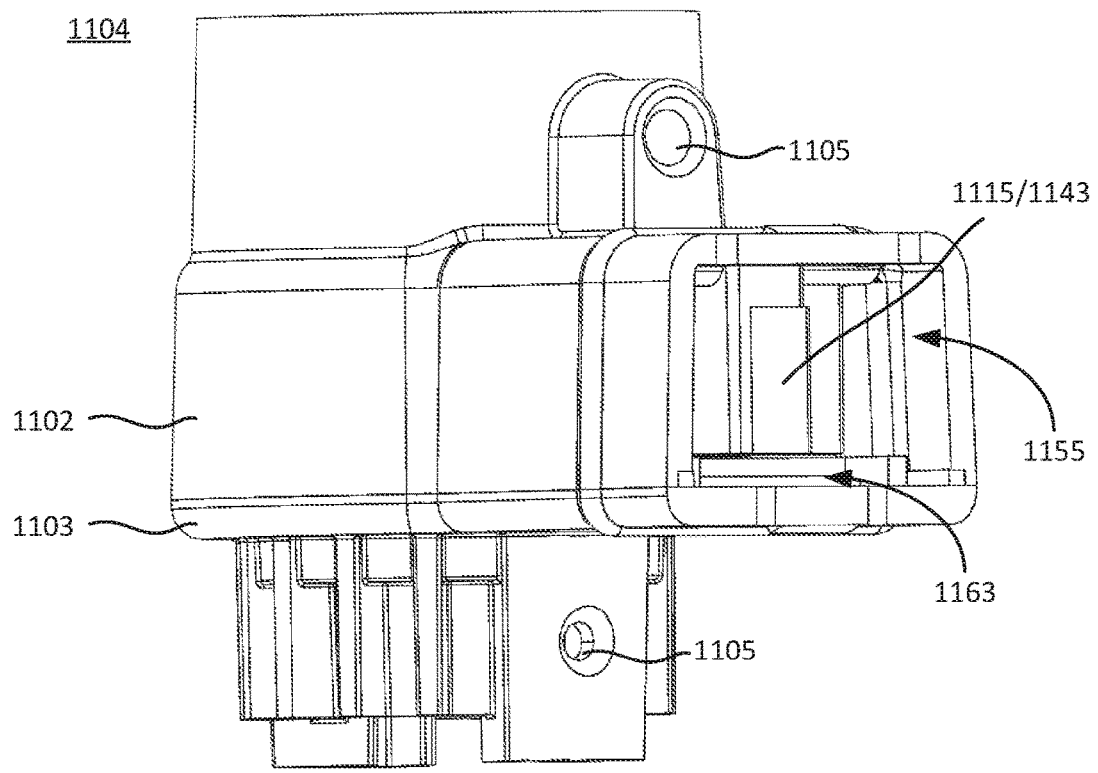
Figure 11I:
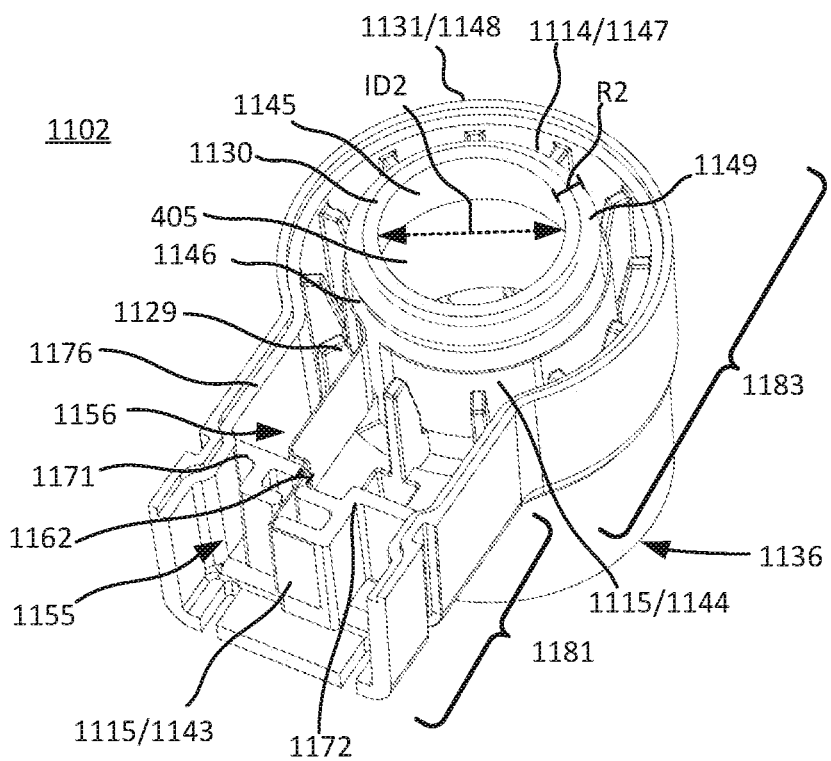
Figure 11J:
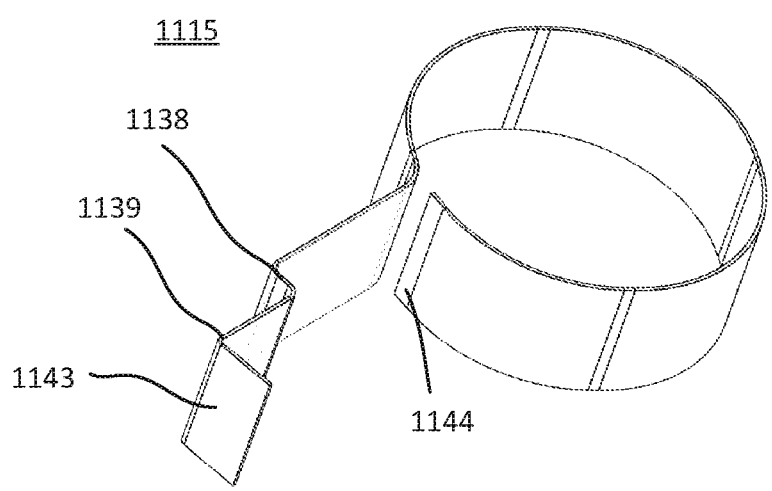
Figure 11K:
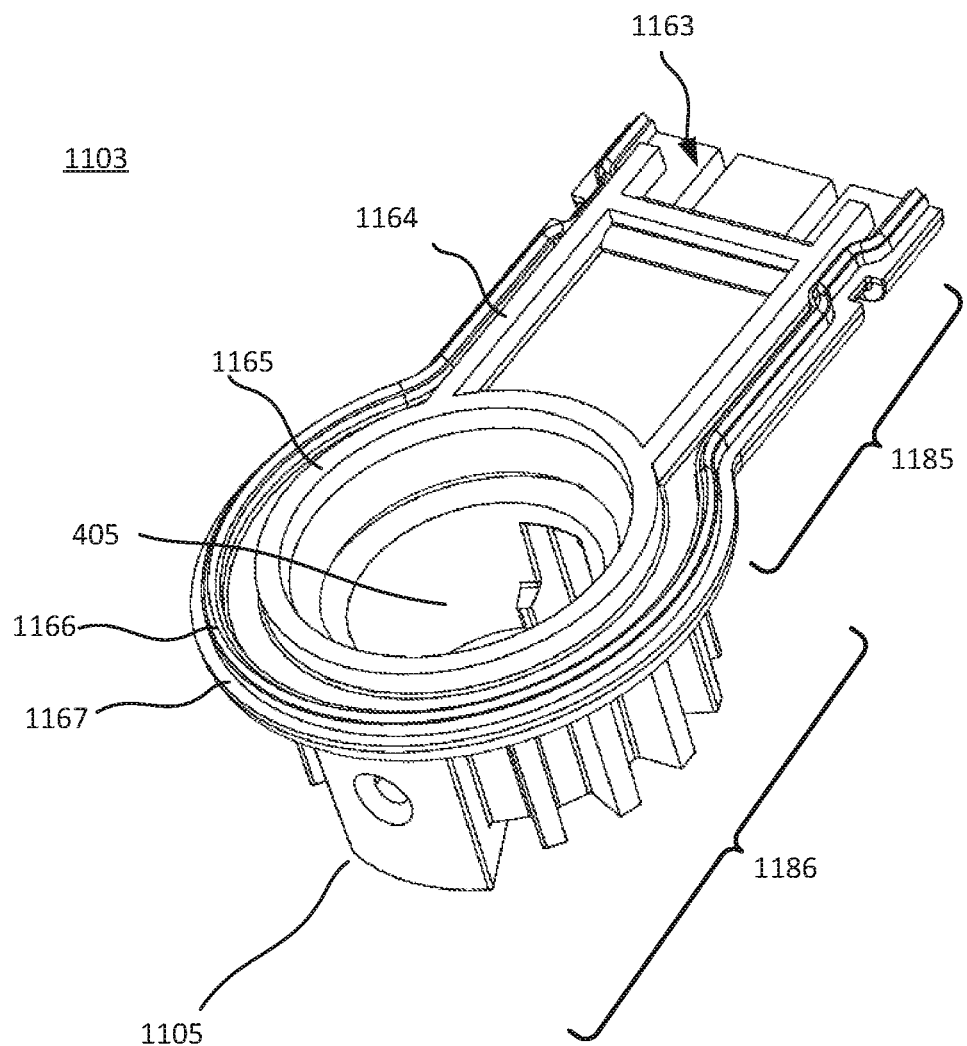
Figure 11L:
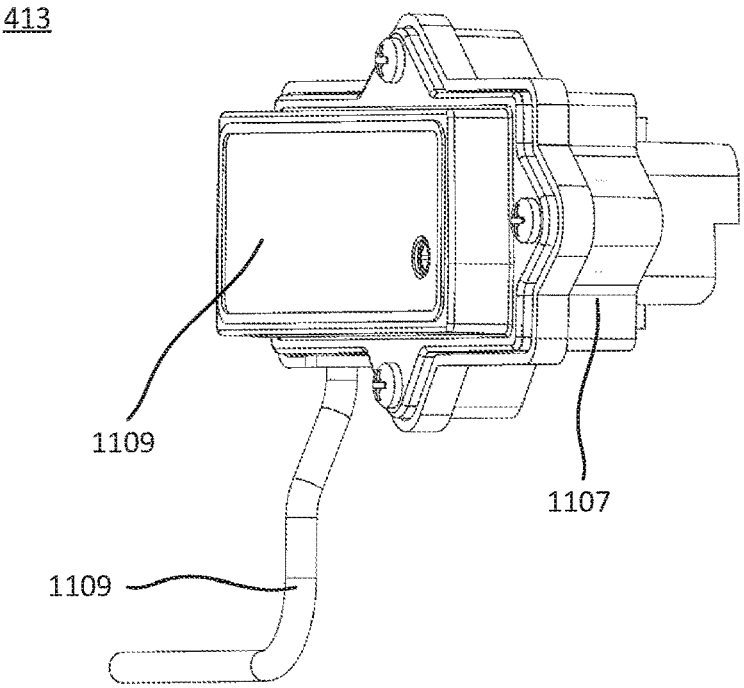
Figure 11M:
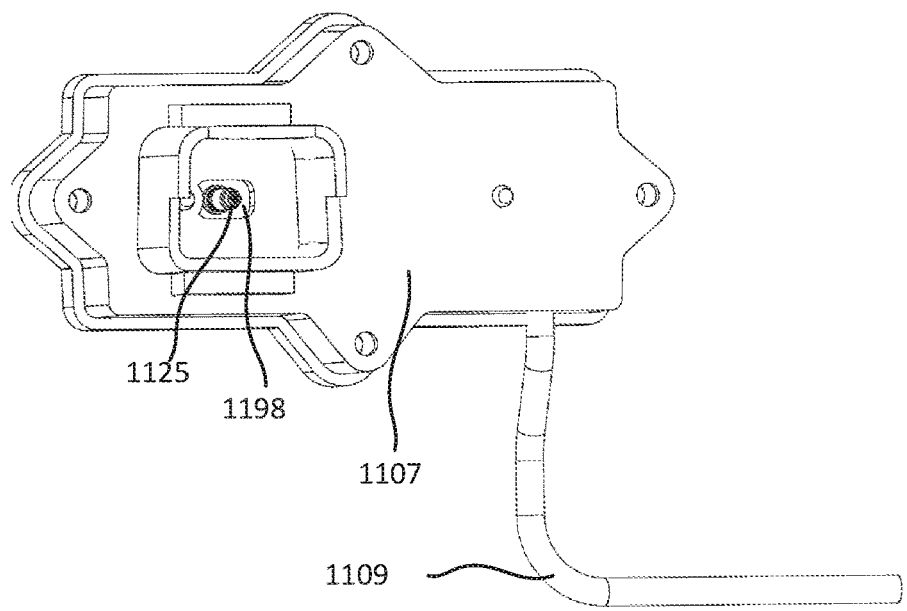
Figure 11N:
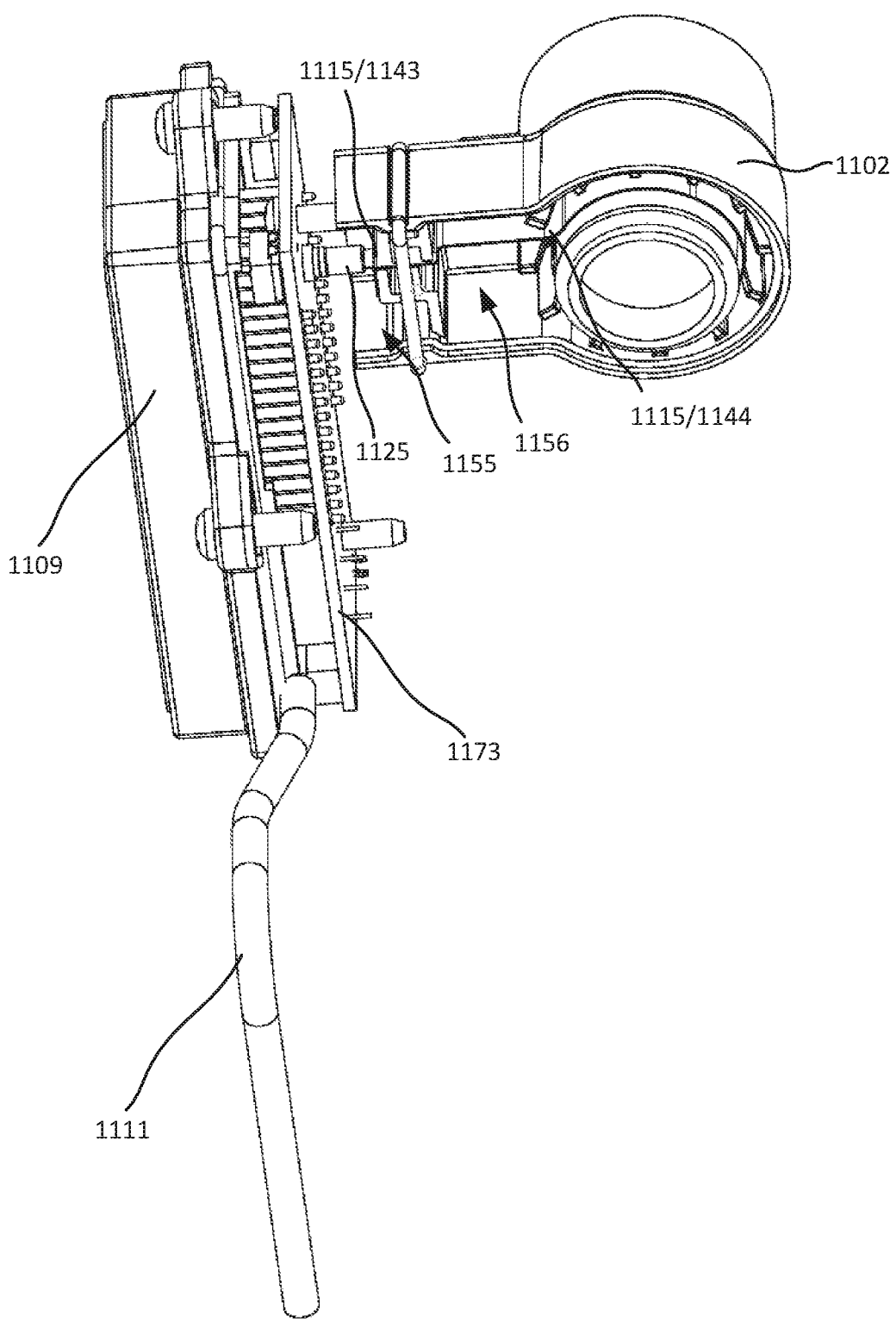
Figure 11O:
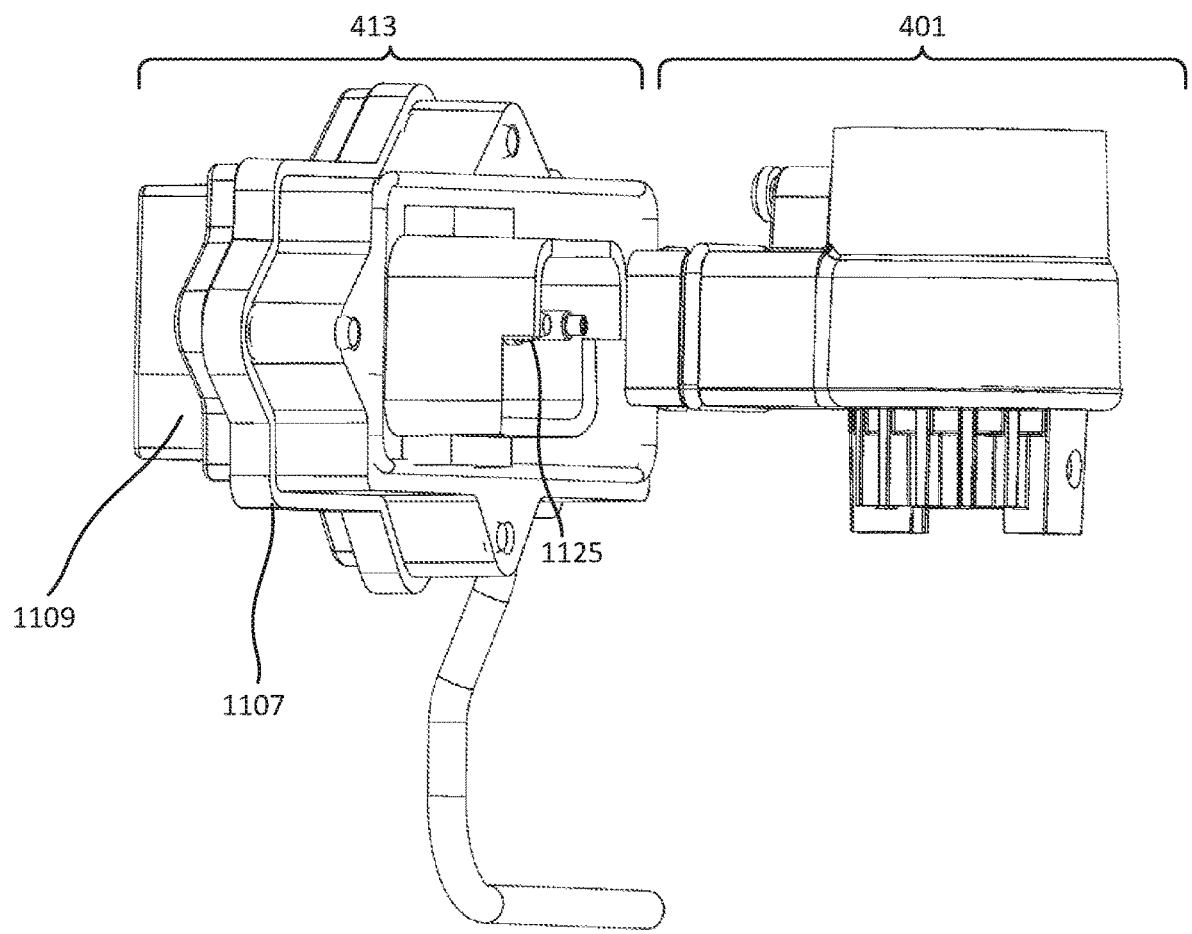

FIGS. 11A-11O illustrate another example of a fluid detection system consistent with the present disclosure. As shown, fluid detection system 1100 includes a sensor module 401 and an electronics module 413. A liquid flow path 405 extends through the sensor module 401. The function of sensor module 401 and electronics module 413 are largely the same as described above in connection with FIG. 4, and so are not reiterated. This embodiment is also functionally similar to system 500 described above, but lacks an air flow path 423. Like fluid detection system 1000, fluid detection system 1100 may be particularly useful for detecting leaks from smaller water systems, such as residential and RV water systems, hot water heaters, and the like.

As best shown in FIGS. 11A and 11O, electronics module 413 is separable from sensor module 401. That is, electronics module 413 may be physically connected and disconnected from sensor module 401, such that fluid detection system 1100 is in an assembled state (FIG. 11A) or in a disassembled state (FIG. 11O). In the assembled state a controller (e.g., a controller 419 as described above in connection with FIG. 4) is present within electronics module 413 and is communicatively coupled to a sensor element 1115 in sensor module 401. The controller within electronics module 413 may be communicatively coupled to sensor element 1115 in any suitable manner. For example, and as will be described later, when system 1100 is in an assembled state, a proximal portion 1143 of sensor element 1115 may be communicatively coupled to a controller in electronics module 413 by at least one electronics terminal 1125 that couples to electronics circuitry 1173 in electronics module 413.

As best shown in FIGS. 11A-11H, sensor module 401 includes a sensor cover 1102 and a sensor base 1103, which are separable from one another. When assembled as shown in FIGS. 11B-11H, the sensor cover 1102 and sensor base 1103 form a sensor housing 1104. The way sensor cover 1102 and sensor base 1103 can be coupled to one another is not limited. In embodiments, sensor cover 1102 and sensor base 1103 are coupled by one or more fasteners (e.g., screws), a weld, an interference fit between corresponding parts of sensor cover 1102 and sensor base 1103, combinations thereof, and the like. As best shown in FIG. 10H, sensor cover 1002 and sensor base 1003 may include one or more fastener openings 1105 that are configured facilitate coupling of sensor cover 1102 to sensor base 1103 and/or another structure, e.g., with one or more fasteners. The number of fastener openings 1105 is not limited, and any of such openings may be omitted.

As shown in FIG. 11I, sensor cover 1102 includes a cover body (not labeled) that includes a cover inner wall 1130, a cover outer wall 1131, a first cover cavity 1155, and a second cover cavity 1156. The first cover cavity 1155 is generally configured to receive or otherwise couple to electronics module 413. The way sensor cover 1102 (and, more particularly, first cover cavity 1155) couples to electronics module 413 is not limited, and such components may be coupled in any suitable manner. For example, sensor cover 1102 may couple to electronics module 413 via one more fasteners, an adhesive, a weld, an interference fit, or the like. In embodiments, electronics module 413 includes an electronics base 1107 that is configured to receive first cover cavity 1155, or to plug into first cover cavity 1155 and be retained therein. In either case, the electronics base 1107 and first cover cavity 1155 may be coupled to one another via an interference fit between corresponding components thereof. A seal 1106 may be provided in a channel around sensor cover 1102 and sensor base 1103, and may function to form a fluid tight seal with electronics module 413 with system 1100 is in an assembled state.

In embodiments at least a portion of second cover cavity 1156 is positioned substantially opposite at least a portion of first cover cavity 1155. The first and second cover cavities 1155, 1156 are preferably separated from each other by first and second cover dividers 1171, 1172, which in the illustrated embodiment extend inwardly from cover outer wall 1131. The first and second cover dividers each preferably define at least a portion of both first cover cavity 1155 and second cover cavity 1156. For example, and as shown in FIG. 11I, first and second cover dividers 1171, 1172 each form at least part of a wall of first cover cavity 1155 and second cover cavity 1156. In any case, first and second dividers may include or be spaced from one another such that an opening 1162 is provided to allow a portion of sensor element 1115 to extend into the first cover cavity 1155, facilitating coupling of the sensor element 1115 to a controller in electronics module 413 as described in more detail later.

Sensor cover 1102 is configured to receive at least a portion of sensor base when fluid sensor system 1100 is in an assembled state. As shown in FIG. 11I, sensor cover 1102 includes a cover neck portion 1181 and a cover conduit portion 1183. An outer cover shoulder 1176 is defined at least in part by an inward facing surface 1147 of cover outer wall 1131, and extends around the cover neck portion 1181 and cover conduit portion 1183. The outer cover shoulder 1176 is configured to receive a corresponding base shoulder 1167 (extending around base neck portion 1185 and a base conduit portion 1186) when sensor housing 1104 is in an assembled state. In any case, cover inner wall 1130 at least partially defines a portion of liquid flow path 405 extending through sensor cover 1102. For example, liquid flow path 405 is at least partially defined by the inward facing surface 1145 of cover inner wall 1130. The outward facing surface 1146 of cover inner wall 1130 tapers on one end of liquid flow path 405 to form an inner cover shoulder, in which a seal 1149 (e.g., an O-ring) is placed. The inner cover shoulder and seal 1149 are configured to be received by and form a seal with sealing surface 1165 of sensor base 1103 (best shown in FIG. 11K) when sensor module 401 is in an assembled state.

Returning to FIG. 11I, cover outer wall includes an inward facing surface 1147 and an outward facing surface 1148. A groove 1114 (which may also be referred to as sensor channel) is defined between an inward facing surface 1147 of cover outer wall 1131 and the outward facing surface 1146 of cover inner wall 1130. In general, groove 1114 is configured to support and maintain the position of a sensor element 1115 within sensor cover 1102. For example, a distal portion 1144 of sensor element 1115 may extend within groove 1114, and a proximal portion 1143 of sensor element 1115 may extend through an opening 1162 between first and second cover dividers 1171 and 1172 and into second cover cavity 1156. For example, and as shown in FIGS. 11I and 11J, the proximal portion 1143 of sensor element 1115 may include a first bend 1138 (e.g., within first cavity 1155) and a second bend 1139 (e.g., within second cover cavity 1156). The first bend 1138 is configured to facilitate passage of sensor element 1115 through opening 1162. The second bend 1139 is configured to provide a contact portion of sensor element 1115, e.g., for coupling to one or more electronics terminals 1125 of electronics module 413 as shown in FIG. 11M. In embodiments and as shown in FIG. HI, a plurality of standoffs 1129 may be provided to position sensor element 1115 within groove 1114.

Liquid flow path 405 is generally configured to provide a passageway for a flow of fluid through sensor cover 1102 and sensor housing 1104. For the sake of illustration liquid flow path 405 is illustrated in FIG. 11I with a circular cross sectional shape, but liquid flow path 405 may have any suitable shape. Moreover, in this embodiment liquid flow path 405 includes an inlet 1136 and an outlet 1137 that are positioned substantially opposite one another. Consequently, the course of liquid flow path 405 in this embodiment extends substantially straight between inlet 1136 and outlet 1137. Of course, inlet 1136 and outlet 1137 of liquid flow path 405 may be sized and positioned differently, with a corresponding difference in the shape and course of the passageway there between.

Cover inner wall 1130 and (optionally) standoffs 1129 may be configured to space the distal portion 1144 of sensor element 1115 a desired distance from liquid flow path 405 when distal portion 1144 is disposed within groove 1114. In that regard, the portion of cover inner wall proximate to (e.g., abutting, or adjacent to) sensor element 1115 may have a thickness R2 between outward facing surface 1146 and inward facing surface 1145 of cover inner wall 1130, as shown in FIG. HI. The value of R2 may vary depending on the size (e.g., internal diameter) of liquid flow path 405, the size of sensing element 1115, and other parameters. In embodiments, R2 is in a range of about 0.05 to about 0.5 inches (about 1.3 to about 12.7 millimeters (mm)), such as about 0.07 to 0.3 inches (about 1.8 to about 7.6 mm), or even 0.08 to about 0.1 inches (about 2.0 to about 2.5 mm) Without limitation, R2 is preferably about 0.08 inches (about 2.0 mm) when an internal diameter (ID2) of liquid flow path 405 is about 0.75 inches (about 19 mm) Of course, R2 is not limited to such ranges and liquid flow path 405 may have any suitable internal diameter.

Sensor base 1103 is generally configured to mate with sensor cover 1102 and to form at least a portion of liquid flow path 405. As noted above, sensor base 1103 includes a base neck portion 1185 and a base conduit portion 1186, which are configured to couple with corresponding portions of sensor cover 1102 (i.e., cover neck portion 1181 and cover conduit portion 1183). The base neck portion 1185 includes a base cavity 1163 which, together with first cover cavity 1155 forms a receptacle for receiving a portion of electronics base 1107 when sensor housing 1104 is in an assembled state. Sensor base 1103 further includes a base wall 1164, which at least partially defines base cavity 1163. The base wall 1164 may include substantially linear elements within base neck portion 1185, and one or more curvilinear elements in base conduit portion 1186. At least a portion of base wall 1164 defines a sealing surface 1165 within base conduit portion 1186. As noted above, the sealing surface 1165 is configured to receive a seal 1149 and a portion of cover inner wall 1130 therein when sensor housing 1104 is in an assembled condition. Sensor base 1103 further includes a base rim 1166, which extends around most of the perimeter of sensor base 1103, except for the portion of the perimeter that defines part of base cavity 1163. The base rim 1166 extends upwardly from the body of sensor base 1103 to define a base shoulder 1167, which is configured to mate with (e.g., be received within) an outer cover shoulder 1176 of sensor cover 1102 when sensor housing 1104 is in an assembled state.

When sensor module 401 is in an assembled state, sensor cover 1102 and sensor base 1103 form a receptacle for receiving or otherwise coupling to electronics module 413. More specifically, and as best shown in FIGS. 11H and 11O, the first cover cavity 1155 of sensor cover 1102 and the base cavity 1163 of sensor base 1103 form first and second portions of a receptacle that can plug into or otherwise couple to a corresponding receptacle in electronics base 1107. Of course, sensor module 401 need not be configured in that manner, and the receptacle for the electronics module 413 may be configured differently and/or defined by other portions of the sensor cover 1102 and/or sensor base 1103. For example, the receptacle for the electronics module 413 in sensor module 401 may be configured to receive a portion of electronics base therein.

The function of sensor element 1115 is the same as sensor elements 407, 515, and 1015 described above, and so is not reiterated in detail. Like those previously described elements, sensor element 1115 is generally configured to detect the capacitance within liquid flow path 405. As best shown in FIG. 11J, sensor element 1215 may include a proximal portion 1143 and a distal portion 1144, both of which may be formed from or include a band of conductive material such as copper, aluminum, gold, or the like. As discussed above, distal portion 1144 of sensor element 1115 is configured to be disposed within groove 1114 in sensor cover HI. As best shown in FIG. 11N, proximal portion 1143 may be coupled to electronics circuitry 1173 via electronics terminal 1125 (e.g., a spring loaded pin). As best shown in FIG. H, in embodiments at least a portion of proximal portion 1143 of sensor element 1115 includes a substantially flat region of conductive material, which can contact electronics terminal 1125 when electronics module 413 is coupled to sensor module 401.

In this embodiment and as shown in FIGS. 11A, 11L-11O, electronics module 413 includes electronics base 1107, electronics cover 1109, and cable 1111. The electronics base 1107 and electronics cover 11099 are detachably coupled to one another, e.g., via one or more fasteners. Electronics module 413 further includes electronics circuitry 1173 (e.g., a controller), which is configured to be disposed in an electronics cavity defined by electronics base 1107 and electronics cover 1109. As best shown in FIG. 11M, electronics base 1107 includes an opening 1198 through which an electronics terminal 1125 extends. The electronics terminal 1125 is configured to contact proximal portion 1143 of sensor element 1115 when fluid detection system 1100 is in an assembled state, thereby communicatively coupling sensor element 1115 with the controller in electronics module 413. Electronics terminal 1125 may have any suitable configuration and may be formed of or include any suitable electrically conductive material (e.g., metals such as copper, aluminum, gold, and the like). In embodiments, electronics terminal 1125 is/are in the form of one or more pins or pads that is/are configured to extend into first cover cavity 1155 such that it/they contact proximal portion 1143 of sensor element 1115. Without limitation, electronics terminal 1125 is preferably biased towards proximal portion 1143, e.g., with a spring or other biasing mechanism. In such instances, electronics terminal 1125 may be referred to as a spring-loaded terminal or a spring-loaded pin.

In an assembled state (as shown in FIG. 11A), sensor base 1103 and sensor cover 1102 are coupled to one another to form a sensor housing, with distal portion 1144 of sensor element 1115 disposed in groove 1114. The proximal portion 1143 of sensor element 1115 extends through opening 1162. A receptacle formed by electronics base 1109 receives the receptacle formed by the first cover cavity 1155 and base cavity 1163, such that electronics terminal 1125 contacts proximal portion 1143 of sensor element 1115. In that way, sensor element 1115 is communicatively coupled to the controller within electronics module 413 by electronics terminal 1125 and proximal portion 1143 of sensor element 1115. The fluid sensor system 1100 may then be used to detect the presence or absence of fluid in liquid flow path 405, e.g., in the same manner as described above connection with fluid detection systems 400, 600, 800 and 1000.

Figure 14:
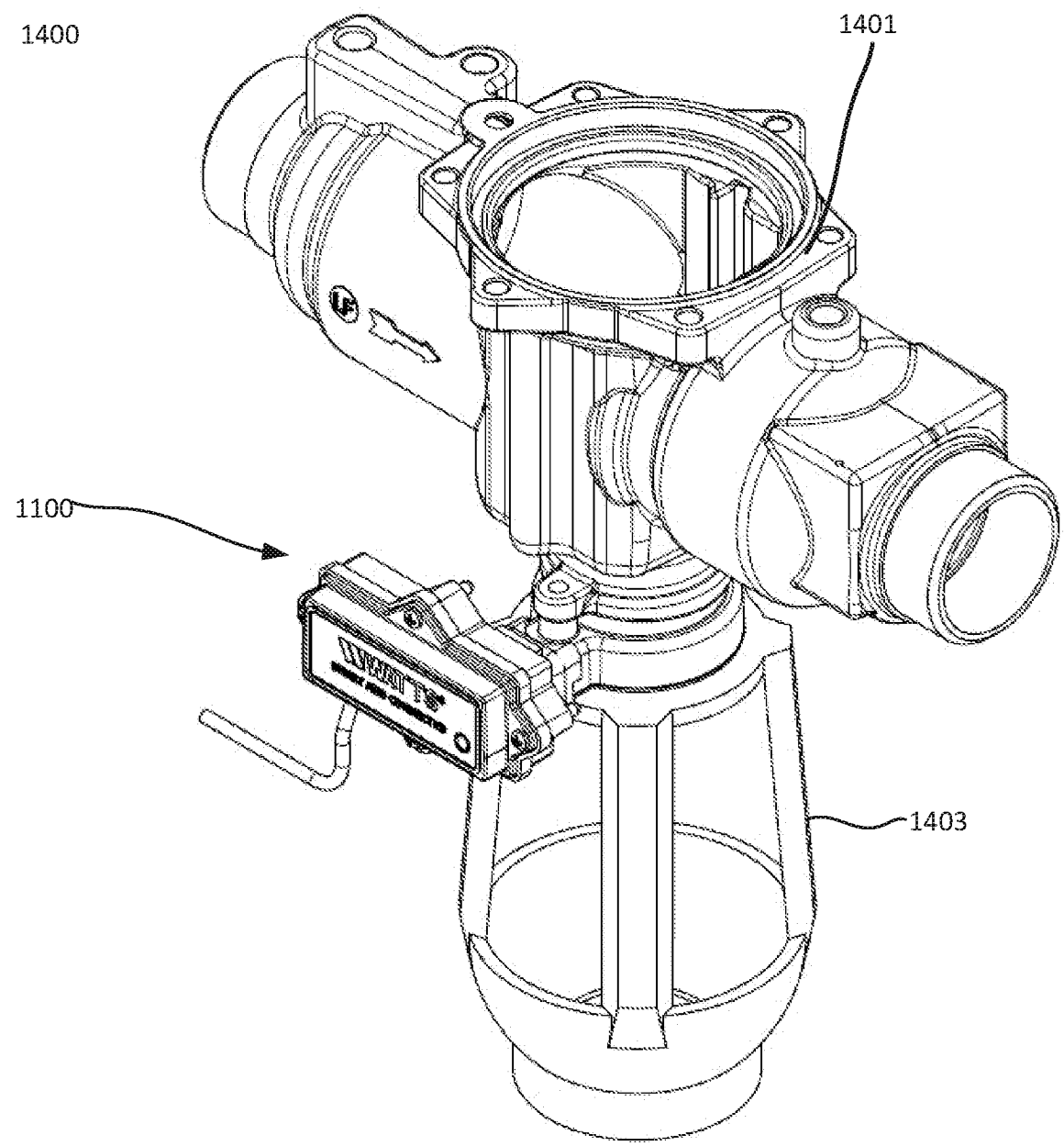
FIG. 14 shows one example of a valve system coupled to a fluid detection system consistent with FIGS. 11A-11O.

FIG. 14 depicts one example of a valve leak detection system that includes a fluid detection system 1100 consistent with the present disclosure. As shown, valve leak detection system 1400 includes a valve system 1401, fluid detection system 1100, and an air gap 1403. Similar to system 800, valve system 1401 includes a liquid flow path that includes an outlet coupled to the inlet 1136 of fluid detection system 1100. The outlet 1137 of fluid detection system 1100 is coupled to air gap 1403. The liquid flow path from valve system 1401 is configured to convey a liquid flow to the inlet 1136. In operation, valve system 1401 may regulate the flow of fluid in a liquid supply system, such as a water supply system. Under normal operating conditions liquid may flow through valve system 1401. Under certain conditions or if valve system 1401 fails, however, liquid may flow through the liquid flow path 405 in fluid detection system 1100, which, which flow may be facilitated by a flow of air provided by air gap 1403.

Consistent with the foregoing disclosure, fluid detection system 1100 may monitor the capacitance of liquid flow path 405 to determine whether liquid is present within the liquid flow path—which may be indicative of a faulty condition of valve system 1401. To accomplish that function, when fluid detection system 1100 is installed as shown in FIG. 14, a calibration operation may be executed to establish a baseline capacitance within liquid flow path 405. Alternatively, the baseline capacitance may be pre-set. In any case, the sensor element 1115 within fluid detection system 1100 may monitor the capacitance of liquid flow path 405 and provide a sensor signal indicative of that capacitance to a controller, e.g., within electronics module 413. The controller may then determine the detected capacitance in the liquid flow path 405, and determine whether a wet, dry, and/or flood event is occurring in liquid flow path 405 based at least in part on the detected capacitance as previously described. The controller may also perform recording and reporting operations as previous described.

Figure 12A:
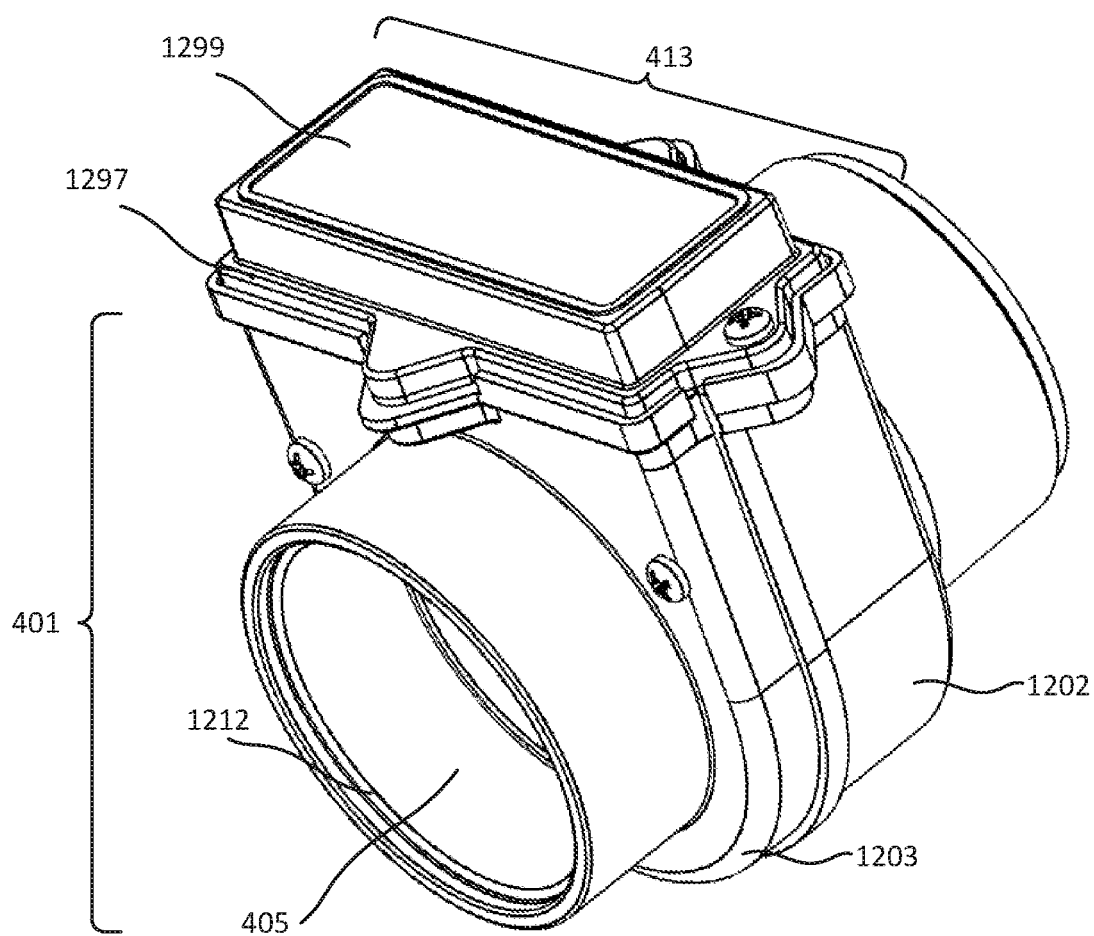
FIGS. 12A-12O depict various view of another example of a fluid detection system consistent with the present disclosure.
Figure 12B:
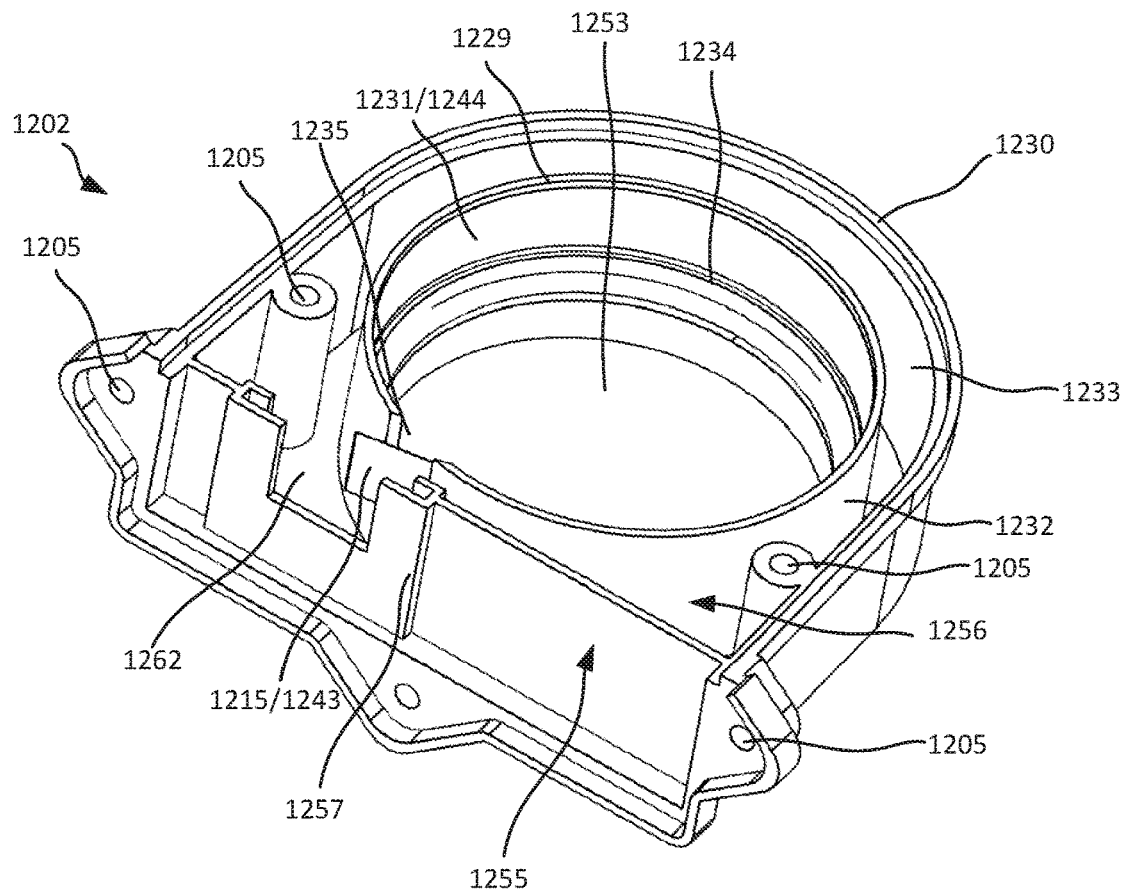
Figure 12C:
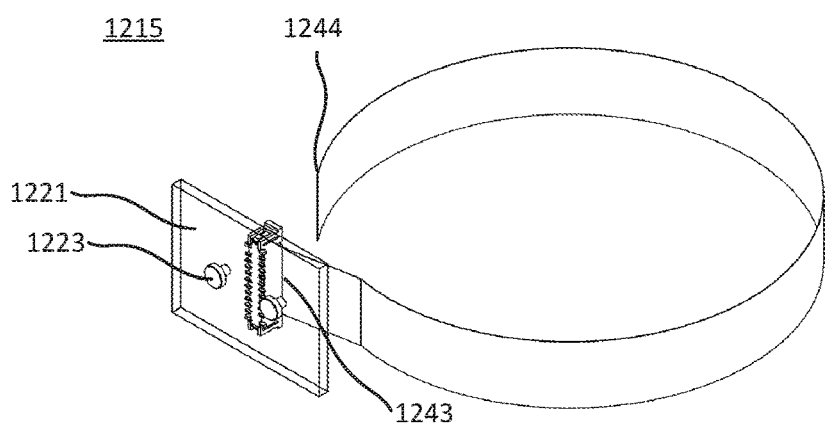
Figure 12D:
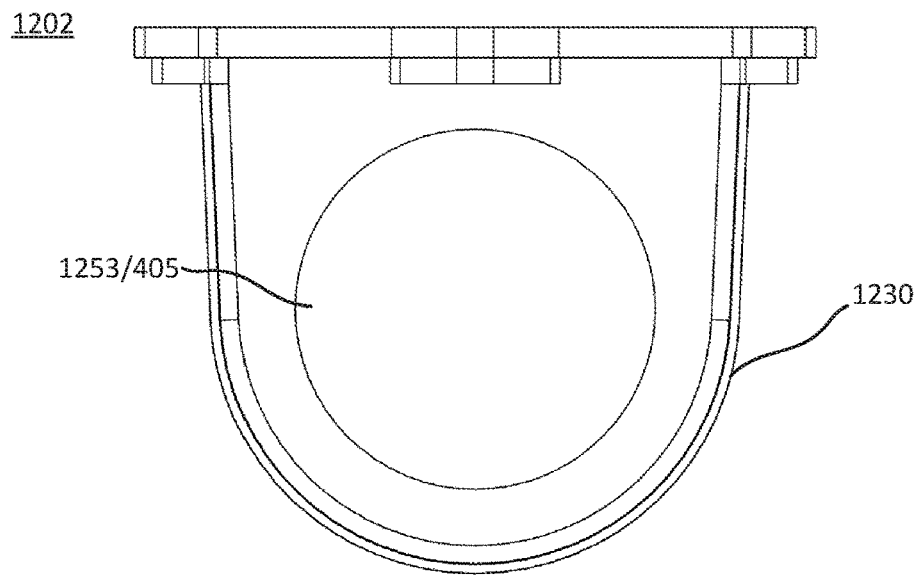
Figure 12E:
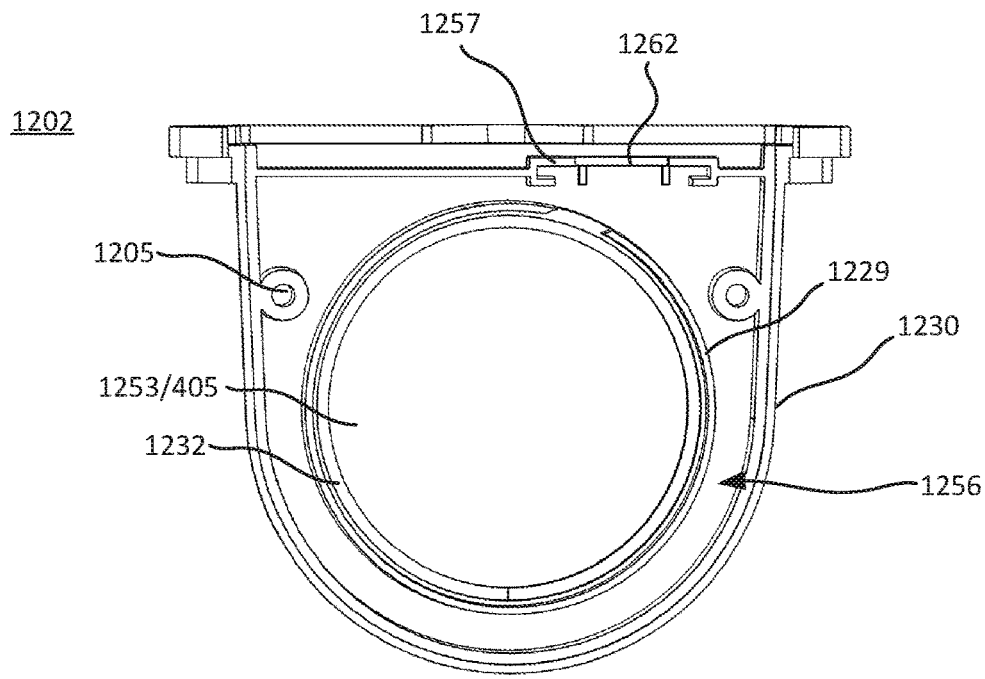
Figure 12F:
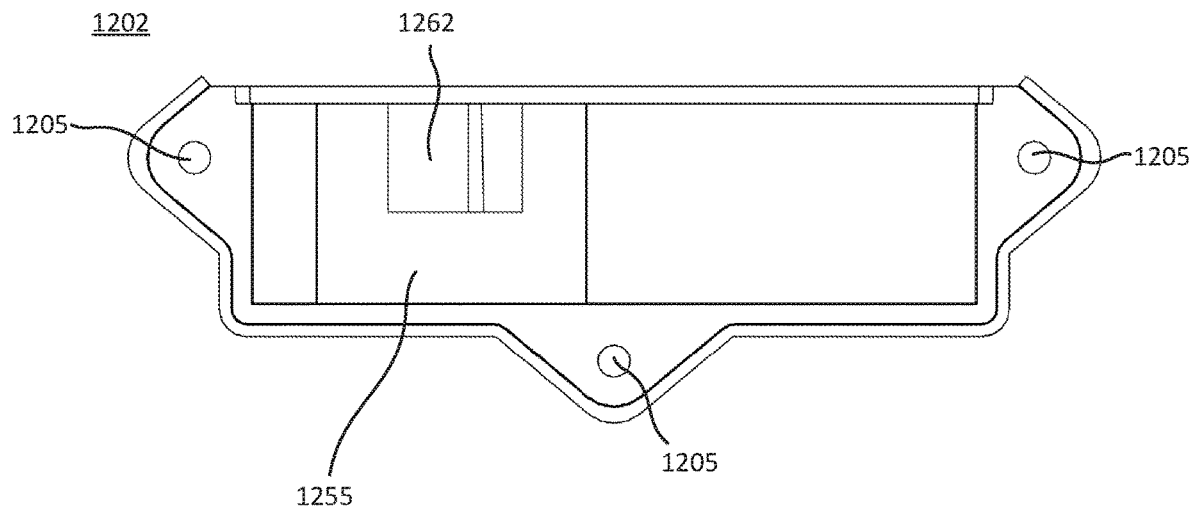
Figure 12G:
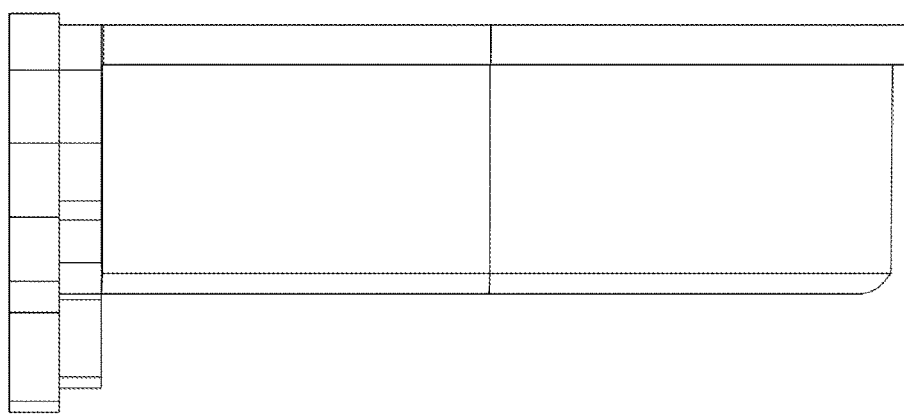
Figure 12H:
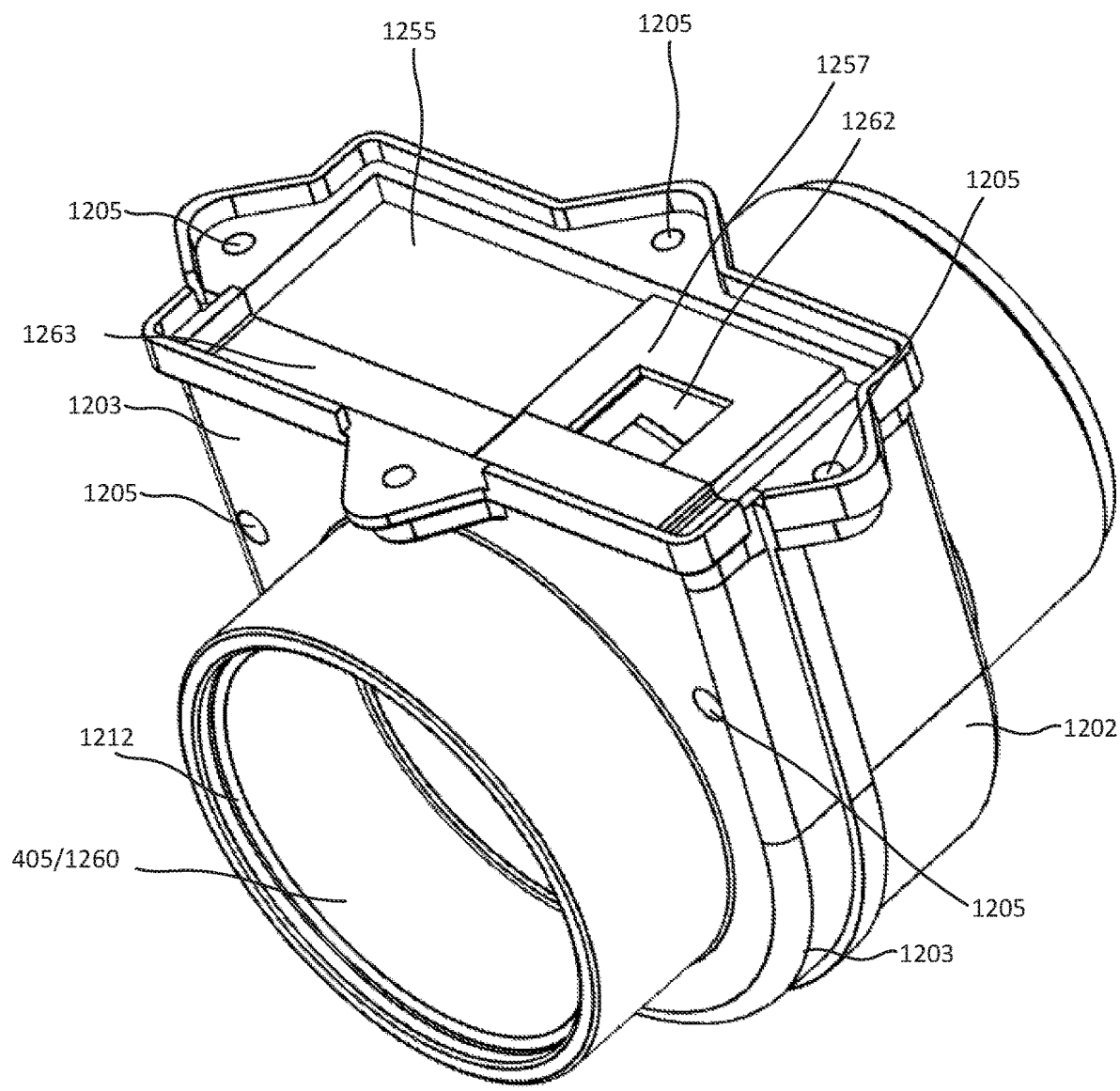
Figure 12I:
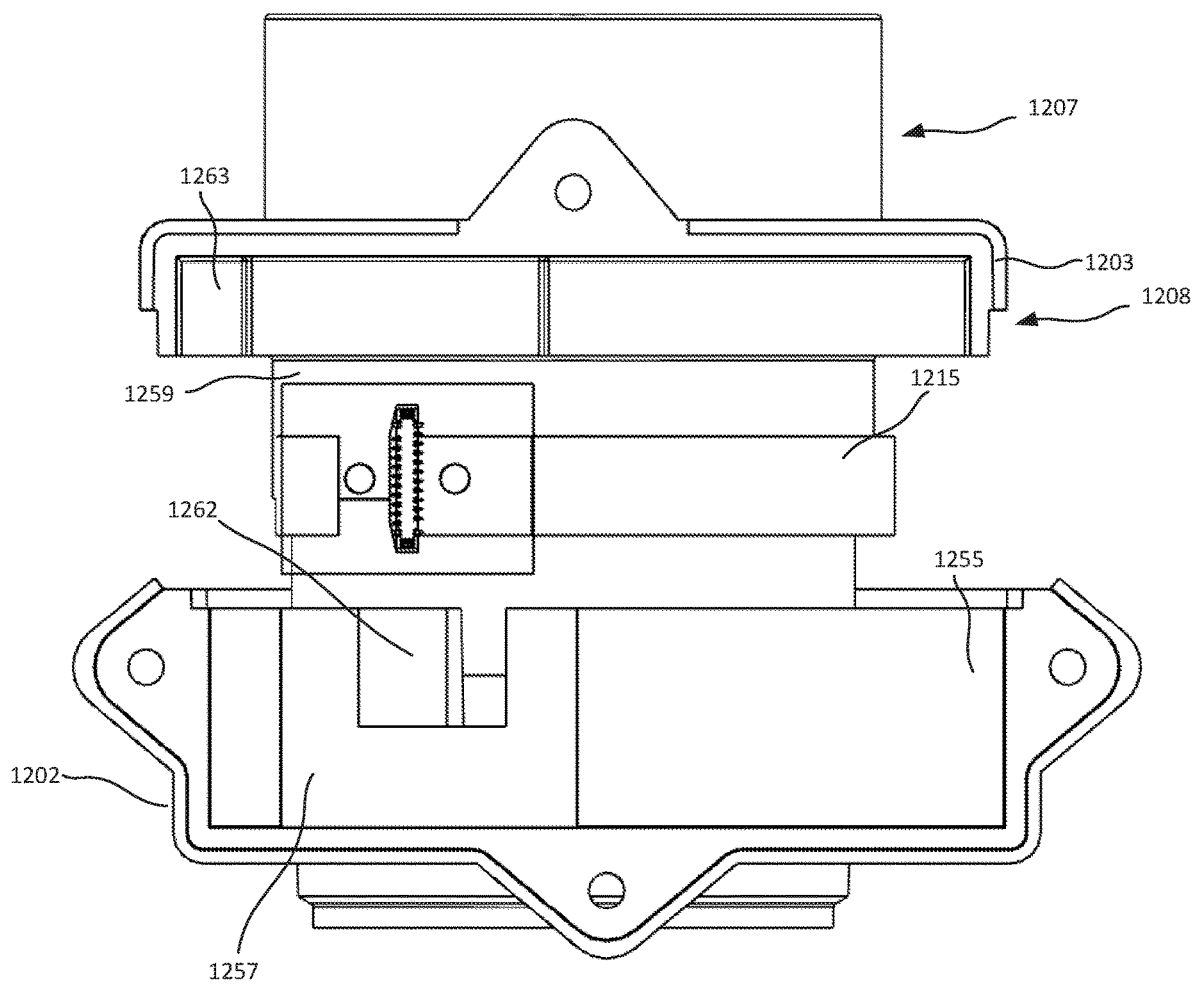
Figure 12J:
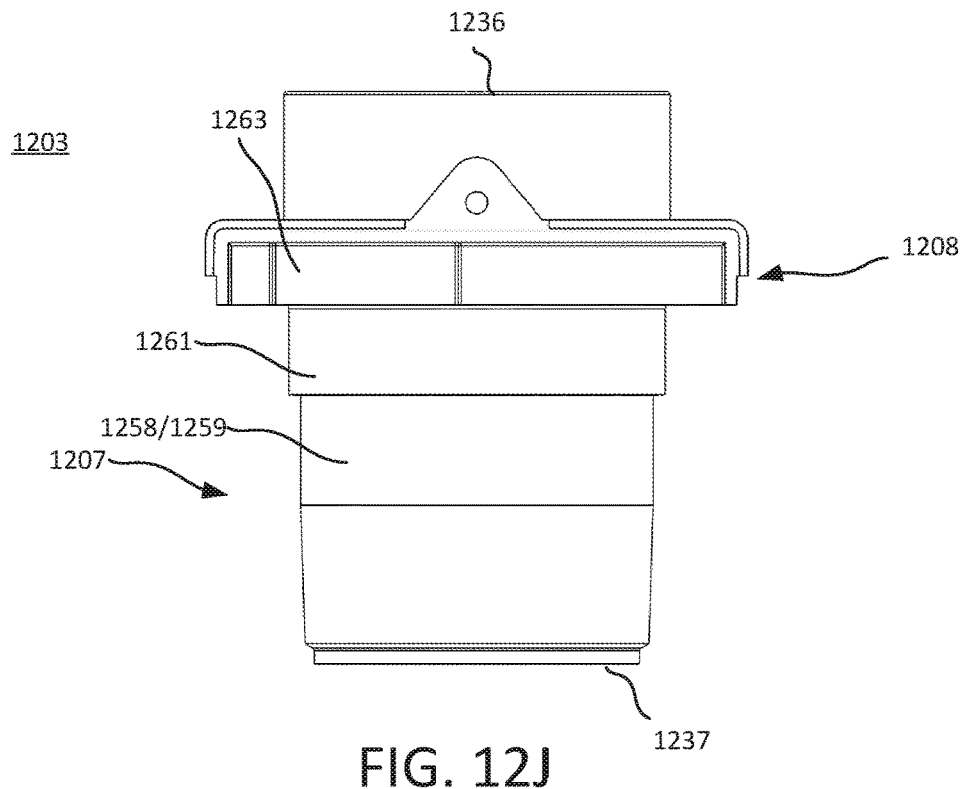
Figure 12K:
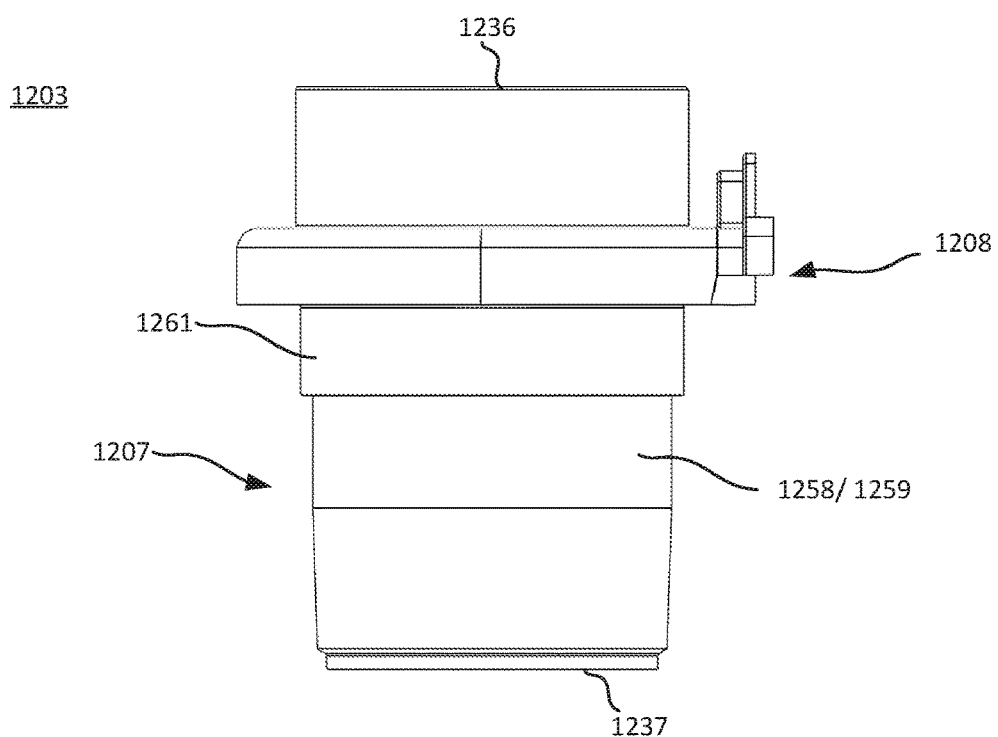
Figure 12L:
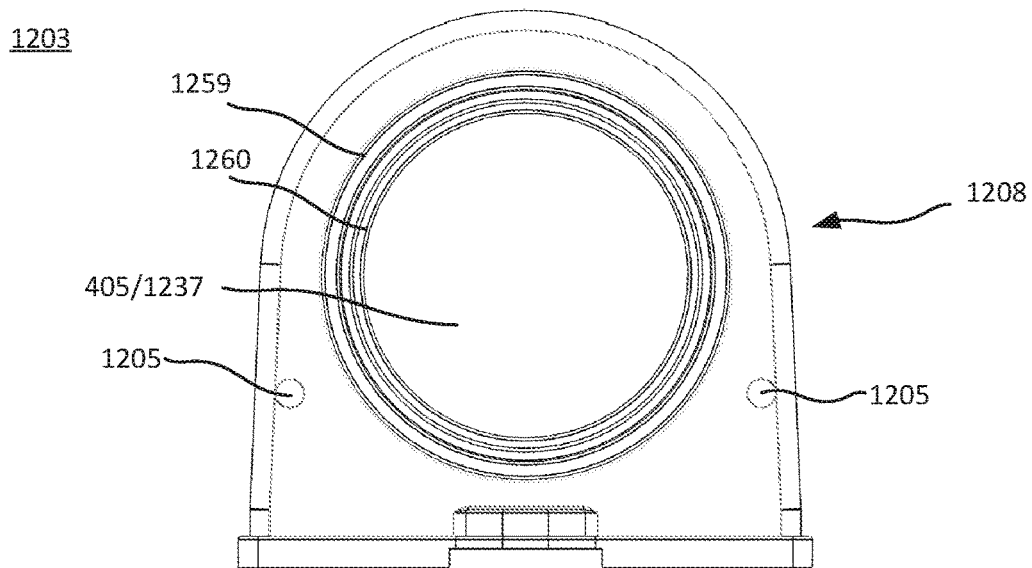
Figure 12M:
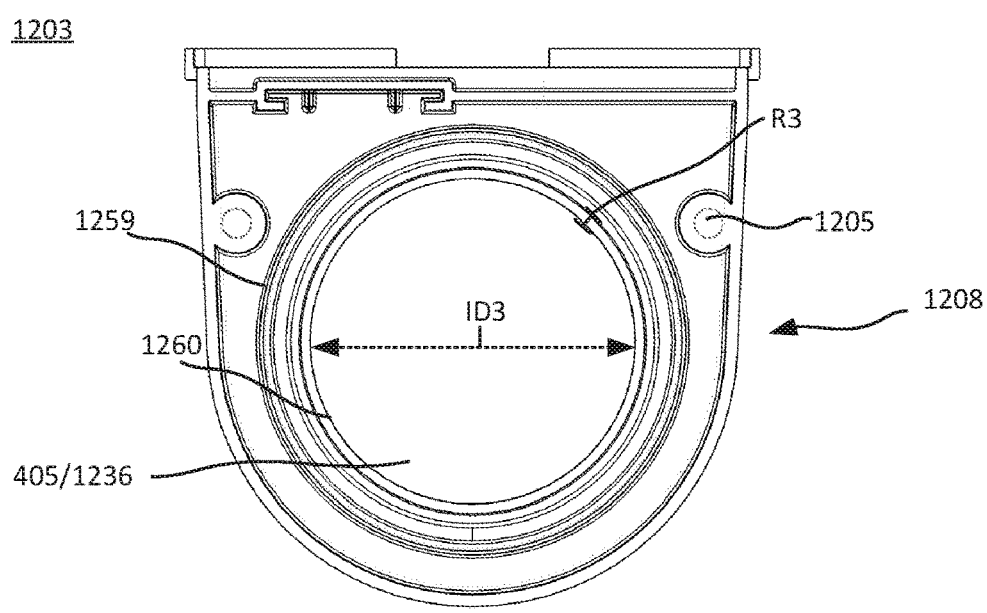
Figure 12N:
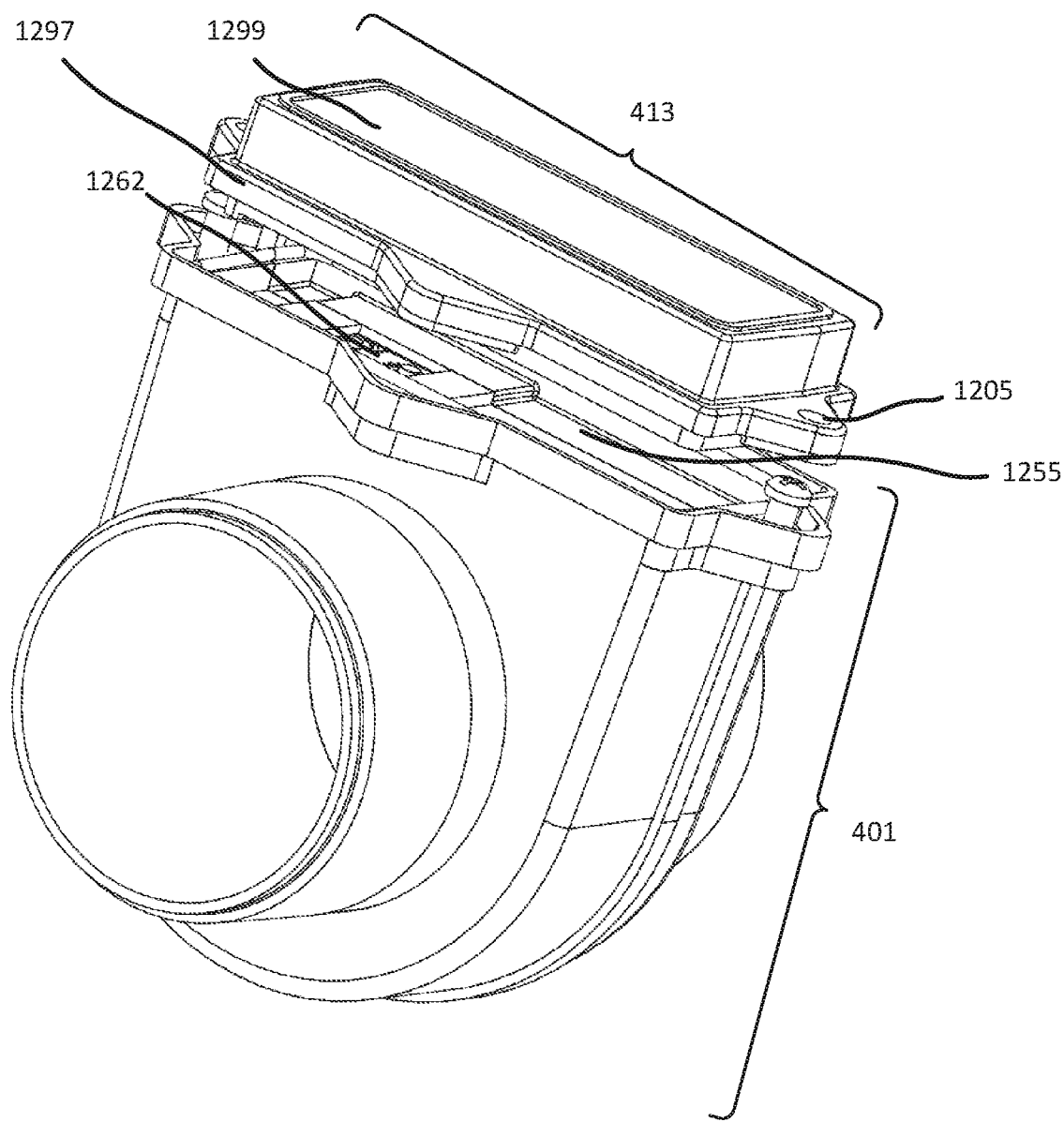
Figure 12O:
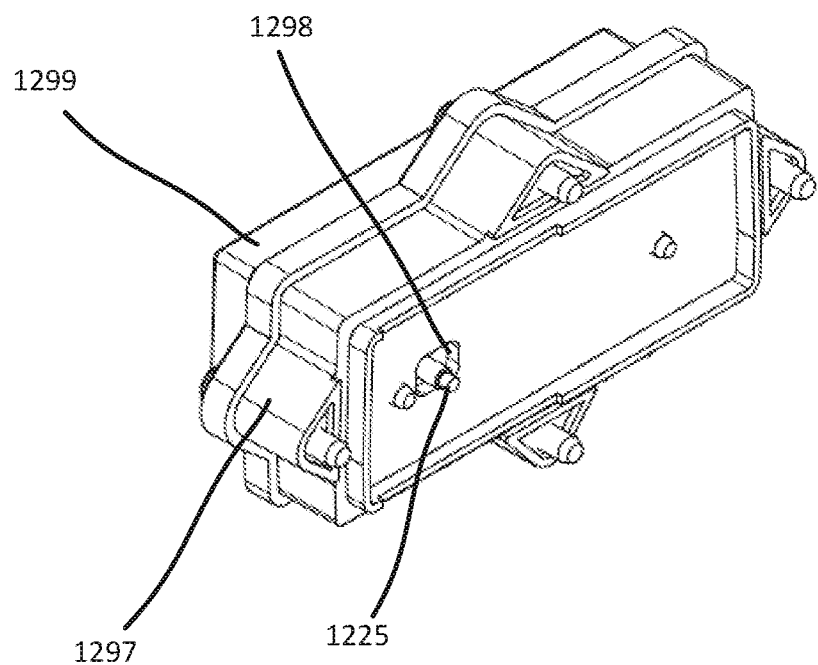

FIGS. 12A-12O illustrate another example of a fluid detection system consistent with the present disclosure. As shown, fluid detection system 1200 includes a sensor module 401 and an electronics module 413. A liquid flow path 405 extends through the sensor module 401. The function of sensor module 401 and electronics module 413 are largely the same as described above in connection with FIG. 4, and so will not be reiterated in detail. This embodiment is also functionally like systems 1000 and 1100 described above. Like fluid detection systems 1000, 1100, fluid detection system 1200 may be particularly useful to detect leaks from smaller water systems, such as residential water systems, recreational vehicle water systems, hot water heaters, and the like.

As best shown in FIGS. 12A, 12I, and 12N electronics module 413 is separable from sensor module 401. That is, electronics module 413 may be physically connected and disconnected from sensor module 401, such that fluid detection system 1200 is in an assembled or disassembled state. In the assembled state a controller (e.g., a controller 419 as described previously) in electronics module 413 is communicatively coupled to a sensor element 1215 in sensor module 401. The controller within electronics module 413 may be communicatively coupled to sensor element 1215 in any suitable manner. For example, and as will be described later, when fluid detection system 1200 is in an assembled state and sensor element 1215 includes a sensor printed circuit board (PCB) 1221, sensor element 1215 may be communicatively coupled to a controller in electronics module 413 by one or more electronics terminals that couple to a sensor PCB 1221 coupled to a proximal portion of sensor element 1215.

As best shown in FIGS. 12A and 12H, sensor module 401 includes a sensor cover 1202, a sensor base 1203, and sensor element 1215. The sensor cover 1202 and sensor base 1203 are separable from each other as shown in FIG. 12I. When sensor cover 1202 and sensor base 1203 are coupled to one another they form a sensor housing, as shown in FIG. 12H. As best shown in FIG. 12I, sensor cover 1202 and sensor base 1203 are detachable from one another. The way sensor cover 1202 and sensor base 1203 can be coupled to one another is not limited. In embodiments, sensor cover 1202 and sensor base 1203 are coupled by one or more fasteners (e.g., screws), a weld, an interference fit between corresponding parts of sensor cover 1202 and sensor base 1203, combinations thereof, and the like. For example, and as shown in FIGS. 12B, 12D, and 12H, sensor cover 1202 and sensor base 1203 may include one or more fastener openings 1205 that are configured facilitate coupling of sensor cover 1202 to sensor base 1203 with one or more fasteners. The number of fastener openings 1205 is not limited, and any of such openings may be omitted.

Sensor cover 1202 includes a cover body. The cover body includes a first cover cavity 1255 and a second cover cavity 1256. The first cover cavity 1255 is generally configured (e.g., along with a first base cavity 1263) to receive or otherwise couple to at least a portion of electronics module 413, as illustrated in FIGS. 12A and 12N. The way sensor cover 1202 (and, more particularly, first cover cavity 1255) couples to electronics module 413 is not limited, and such components may be coupled in any suitable manner. For example, sensor cover 1202 may couple to electronics module 413 via one more fasteners, an adhesive, a weld, an interference fit, or the like. In embodiments, sensor cover 1202 is configured to couple to electronics module 413 using one or more fasteners that extend through one or more fastener openings 1205 within first cover cavity 1055 and electronics module 413. In such instances, the fastener openings 1205 within first cover cavity 1255 may be positioned to align with corresponding fastener openings 1205 of electronics module 413, such that a fastener may be placed therein to couple sensor cover 1202 with electronics module 413.

In embodiments and as shown in FIG. 12B, at least a portion of second cover cavity 1256 is positioned substantially opposite at least a portion of first cover cavity 1255, with a cover divider 1257 therebetween. In embodiments, cover divider 1257 is or includes a wall that preferably defines at least a portion of both first cover cavity 1255 and second cover cavity 1256. For example, and as shown in FIGS. 12B and 12E, cover divider 1257 may form at least part of a wall of first cover cavity 1255 and may also form at least part of a wall of second cover cavity 1256. In any case, an opening 1262 may be formed through cover divider 1257 to facilitate coupling of a controller in electronics module 413 with sensor element 1215, as described in more detail later.

Second cover cavity 1256 may receive at least a portion of sensor base 1203 therein when fluid detection system 1200 is in an assembled state. As shown in FIGS. 12B, 12D and 12E, sensor cover 1202 includes a cover inner wall 1229 and a cover outer wall 1230. The cover inner wall 1229 defines at least a portion of a cover passageway 1252 through which at least a portion of sensor base 1203 extends when fluid detection system 1200 is in an assembled state. The outward facing surface 1232 of cover inner wall 1229 and an inward facing surface 1233 of cover outer wall 1230 define at least a portion of the second cover cavity 1256, as best shown in FIG. 12B.

A ridge 1234 projects inwardly from and extends at least partially (and in some embodiments continuously) around inward facing surface 1231 of cover inner wall 1230. Regardless of its configuration, ridge 1234 is configured to support and maintain the position of sensor element 1215 within sensor module 401. For example, and as shown in FIGS. 12B and 12C, a distal portion 1244 of sensor element 1215 may extend proximate to and around inward facing surface 1231 of cover inner wall 1229, and proximal portion 1243 of sensor element 1215 may extend through a gap 1235 in cover inner wall 1229 and into second cover cavity 1256. In such instances ridge 1234 may provide an abutment surface for abutting at least one edge of sensor element 1215, which can help to maintain the position and alignment of distal portion 1244 of sensor element 1215.

In general, sensor base 1203 is configured to provide a liquid flow path through which a liquid may flow when fluid detection system 1200 is in use. Sensor base 1203 is also configured to support and/or position sensor element 1215 relative to the liquid flow path, such that sensor element 1215 can detect a capacitance within the liquid flow path. With that in mind and as best shown in FIGS. 12I-12L, sensor base 1203 includes a tubular body 1207 and a flange 1208. A liquid flow path 405 extends through the tubular body 1207 from an inlet 1236 to an outlet 1237. The tubular body includes an outer wall 1258 with outward facing surface 1259 and an inward facing surface 1260. The liquid flow path 405 is at least partially defined by the perimeter of inward facing surface 1260. For the sake of illustration and ease of understanding liquid flow path 405, perimeter 1212, inward facing surface 1260 are depicted as having a circular cross section, but such components may have any suitable shape. In this embodiment, the inlet 1236 and outlet 1237 are positioned opposite to one another. Consequently, liquid flow path 405 is straight or substantially straight between the inlet 1236 and the outlet 1237. Of course, inlet 1236 and outlet 1237 of liquid flow path 405 may be sized and positioned differently, with a corresponding difference in the shape of the passageway there between.

As noted above and the tubular body 1207 of sensor base 1203 includes an outer wall 1258 with an outward facing surface 1259. At least a portion of the outward facing surface 1259 defines a base step 1261 (which may also be referred to as sensor support) that extends at least partially (and preferably fully) around the outer wall 1031. Base step 1261 may be a raised or recessed region of outer wall 1258 that is configured to support and/or receive at least a portion of sensor element 1215 when the sensor housing of fluid detection system 1200 is in an assembled state. Without limitation, base step 1261 is preferably a raised portion of outer wall 1258, as shown in FIGS. 12J and 12K. The height of base step 1261 is not limited, and may be selected to correspond to a shape of distal portion 1244 of sensor element 1215. In embodiments base step 1261 is sized and positioned such that it is disposed opposite to the inward facing surface 1233 of outer wall 1230 in sensor cover 1202 when the sensor housing is in an assembled state. In such instances, at least the distal portion 1244 of sensor element 1215 may be disposed between outer wall 1230 (of sensor cover 1202) and base step 1261 of sensor base 1203.

The portion of outer wall 1258 forming base step 1261 may have a thickness R3 between the outward facing surface 1259 and the inward facing surface 1260, as shown in FIG. 12M. The thickness R3 may be selected to space distal portion 1244 of sensor element 1215 a desired distance from liquid flow path 405 when distal portion 1244 is disposed about at least a portion of base step 1261. The value of R3 may vary depending on the size (e.g., internal diameter) of liquid flow path 405, the size of sensing element 1215, and other parameters. In embodiments, R3 is in a range of about 0.05 to about 0.5 inches (about 1.3 to about 12.7 millimeters (mm)), such as about 0.07 to 0.3 inches (about 1.8 to about 7.6 mm), or even 0.1 to about 0.25 inches (about 2.5 to about 6.35 mm) Without limitation, R3 is preferably about 0.22 inches (about 5.6 mm) when an internal diameter (ID3) of liquid flow path 405 is about 2 inches (about 50.8 mm) Of course, R3 is not limited to such ranges and the liquid flow path 405 may have any suitable diameter.

In an assembled state sensor cover 1202 and sensor base 1203 form a receptacle for receiving or otherwise coupling to electronics module 413. For example, and as best shown in FIGS. 12B, 12H, and 12I, sensor cover 1202 includes a first cover cavity 1255 and sensor base 1203 includes a first base cavity 1263. The first cover cavity 1255 and first base cavity 1263 together form respective first and second portions of a receptacle for receiving or otherwise coupling to electronics module 413. Of course, sensor module 401 need not be configured in that manner, and the receptacle for the electronics module 413 may be configured differently and/or defined by other portions of the sensor cover 1202 and/or sensor base 1203. For example, the receptacle for the electronics module 413 may be positioned entirely on sensor cover 1202 or entirely on sensor base 1203.

The function of sensor element 1215 is the same as sensor elements 407, 515, and 1015 described above, and so is not reiterated in detail. Like those previously described elements, sensor element 1215 is generally configured to detect the capacitance within liquid flow path 405. As shown in FIG. 12C, sensor element 1215 may include a proximal portion 1243 and a distal portion 1244, both of which may be formed from or include a band of conductive material such as copper, aluminum, gold, or the like. As discussed above, distal portion 1244 of sensor element 1215 is configured to be disposed between outward facing surface 1232 and base step 1261 when the sensor housing is in an assembled state. As shown in FIG. 12C, proximal portion 1243 may be coupled to a sensor printed circuit board (PCB) 1221 that includes a sensor terminal 1223. Although not shown in FIG. 12B, sensor PCB 1221 may be configured to align sensor terminal 1223 with opening 1262 in cover divider 1257, such that sensor terminal 1223 can contact corresponding electronics terminal 1225 of electronics module 413.

As shown in FIGS. 12A, 12N, and 12O, electronics module 413 includes an electronics base 1297 and an electronics cover 1299, which are detachably coupled to one another, e.g., via one or more fasteners. Electronics module 413 further includes electronics circuitry (e.g., a controller), which is configured to be disposed in an electronics cavity defined by electronics base 1297 and electronics cover 1299. As best shown in FIG. 12O, electronics base 1297 includes an opening 1298 through which electronics terminal 1225 extends. The electronics terminal(s) 1225 is/are configured to contact one or more sensor terminals 1223 when fluid detection system 1200 is in an assembled state, thereby communicatively coupling sensor element 1215 with the controller in electronics module 413. Electronics terminal(s) 1225 may have any suitable configuration and may be formed of or include any suitable electrically conductive material (e.g., metals such as copper, aluminum, gold, and the like). In embodiments, electronics terminal 1225 is in the form of one or more pins or pads that is/are configured to extend through opening 1262 within cover divider 1257 such that it/they contact sensor terminal 1223. Without limitation, electronics terminal 1225 is preferably biased towards sensor terminal(s) 1223, e.g., with a spring or other biasing mechanism. In such instances, electronics terminal 1225 may be referred to as a spring-loaded terminal or a spring load pin.

In an assembled state (as shown in FIG. 12A), sensor base 1203 and sensor cover 1202 are coupled to one another to form a sensor housing (FIG. 12H), with distal portion 1244 of sensor element 1215 disposed between outward facing surface 1232 and base step 1261. The proximal portion 1243 of sensor element 1215 is coupled to sensor PCB 1221, and sensor PCB 1221 is positioned to align sensor terminal 1223 with opening 1262 in cover divider 1257. Electronics module 413 is coupled to the sensor housing via one or more fasteners as described above. When electronics module 413 is so coupled, electronics terminal 1225 extends through opening 1262 to contact sensor terminal 1223 as described above. In that way, sensor element 1215 is communicatively coupled to the controller within electronics module 413 by electronics terminal 1225 and sensor terminal 1223. The fluid detection system 1200 may then be used to detect the presence or absence of fluid in liquid flow path 405, e.g., in the same manner as described above connection with fluid detection systems 400, 600, 800 and 1000.

Although not shown, fluid detection system 1200 may include a cable, e.g., for providing power to the components of electronics module 413, and optionally to provide a wired connection to a communications system that may be sued to send notifications in response to a detected wet and/or flood event. The cable may also provide a connection to earth ground for sensor element 1215. However, sensor element 1215 may be ground in another manner as discussed above in connection with sensor element 407.

Figure 15:
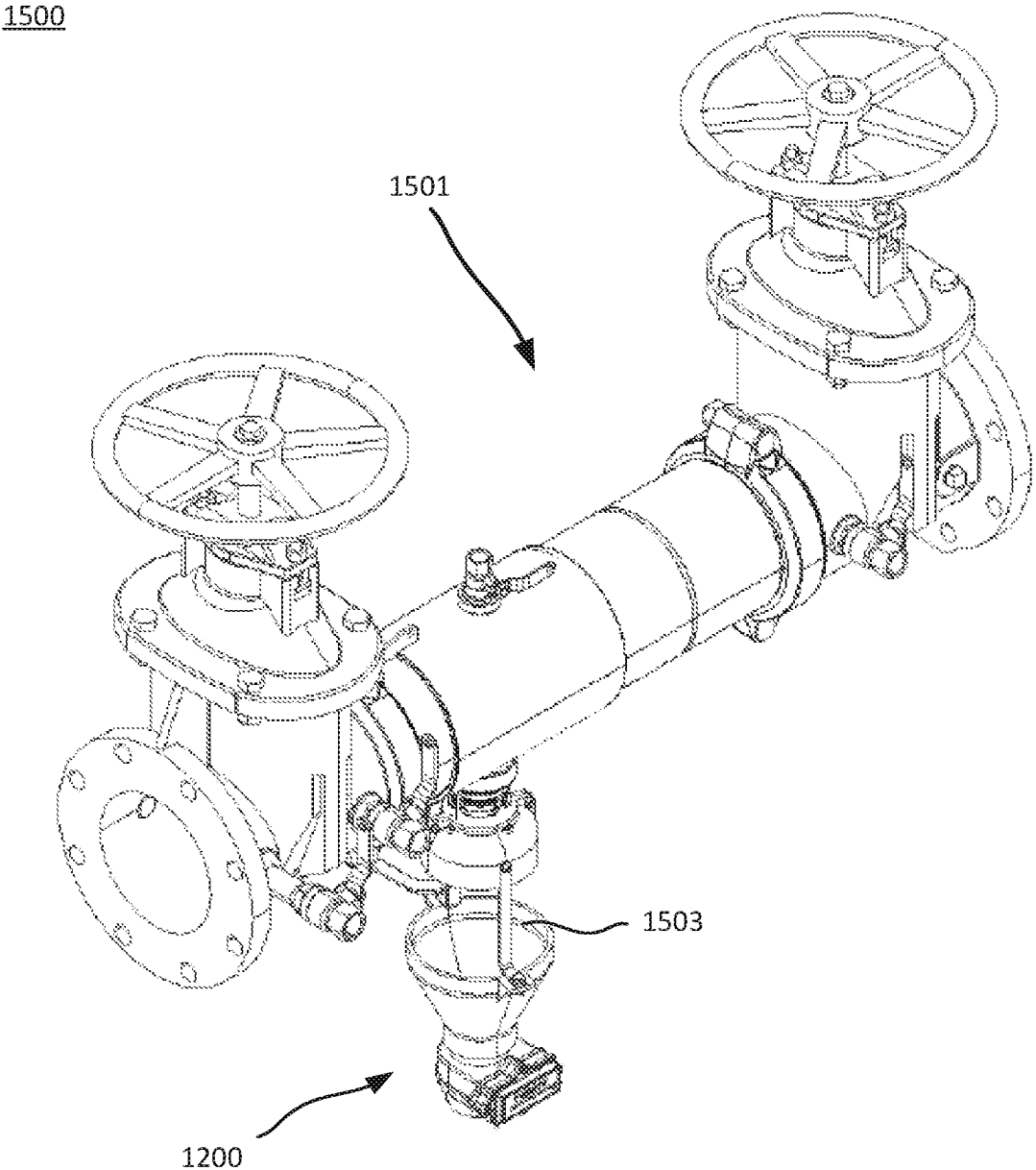
FIG. 15 shows one example of a valve system coupled to a fluid detection system consistent with FIGS. 12A-12O.

FIG. 15 depicts one example of a valve leak detection system that includes a fluid detection system 1200 consistent with the present disclosure. As shown, valve leak detection system 1500 includes a valve system 1501, fluid detection system 1200, and an air gap 1503. Valve system 1501 includes a liquid flow path that includes an outlet coupled to the inlet of air gap 1503. The outlet of the air gap 1503 is coupled to an inlet of fluid detection system 1200. In operation, valve system 1501 may regulate the flow of fluid in a liquid supply system, such as a water supply system. Under normal operating conditions liquid may flow through valve system 1501 from an inlet to an outlet thereof. Under certain conditions or if valve system 1501 fails, however, liquid may flow through the liquid flow path 405 in fluid detection system 1200, which, which flow may be facilitated by a flow of air provided by air gap 1503.

Consistent with the foregoing disclosure, fluid detection system 1200 may monitor the capacitance of liquid flow path 405 to determine whether liquid is present within the liquid flow path—which may be indicative of a faulty condition of valve system 1501. To accomplish that function, when fluid detection system 1200 is installed as shown in FIG. 15, a calibration operation may be executed to establish a baseline capacitance within liquid flow path 405. Alternatively, the baseline capacitance may be pre-set. In any case, the sensor element 1215 within fluid detection system 1200 may monitor the capacitance of liquid flow path 405 and provide a sensor signal indicative of that capacitance to a controller, e.g., within electronics module 413. The controller may then determine the detected capacitance in the liquid flow path 405, and determine whether a wet, dry, and/or flood event is occurring in liquid flow path 405 based at least in part on the detected capacitance as previously described. The controller may also perform recording and reporting operations as previous described.

EXAMPLES

The following are additional example embodiments of the present disclosure.

Example 1: According to this example there is provided a fluid detection system, including: a sensor module including: a sensor housing, the sensor housing including a liquid flow path that extends through the sensor housing; and a sensor element outside the liquid flow path, at least portion of the sensor element extending at least partially around a perimeter of the liquid flow path; wherein: the sensor element is configured to detect a capacitance within the liquid flow path and to provide a detection signal indicative of a detected capacitance within the liquid flow path; and the sensor element is configured to communicatively couple to a controller within an electronics module.

Example 2: This example includes any or all of the elements of example 1, wherein the sensor module further includes an air flow path extending through the sensor housing.

Example 3: This example includes any or all of the elements of example 2, wherein at least a portion of the liquid flow path and at least a portion of the air flow path extend parallel or substantially parallel to each other.

Example 4: This example includes any or all of the elements of example 1, wherein: the sensor module further includes a sensor channel; the sensor channel is at least partially disposed around the perimeter of the liquid flow path; and at least a portion of the sensor element is within the sensor channel.

Example 5: This example includes any or all of the elements of example 1, wherein:
 the sensor element includes a first portion and a second portion; the first portion of the sensor element is disposed around at least a portion of the perimeter of the liquid flow path; and the second portion of the sensor element is configured to communicatively couple to the controller.

Example 6: This example includes any or all of the elements of example 1, further including the electronics module, wherein: the controller is within the electronics module; and the electronics module is configured to physically couple to the sensor housing such that the sensor element is communicatively coupled to the controller.

Example 7: This example includes any or all of the elements of example 5, wherein the controller is configured to receive the detection signal from the sensor module, and to determine whether a liquid is present within the liquid flow path based at least in part on the detection signal.

Example 8: This example includes any or all of the elements of example 7, wherein the controller is configured to: determine the detected capacitance at least in part from the detection signal; compare the detected capacitance to a capacitance threshold; and determine whether liquid is present within the liquid flow path based at least in part on comparing the detected capacitance to the capacitance threshold, and to determine whether a wet event has occurred based on the determination.

Example 9: This example includes any or all of the elements of example 8, wherein the controller wherein the controller is configured to determine that a wet event has occurred when the detected capacitance is less than or equal to the capacitance threshold.

Example 10: This example includes any or all of the elements of example 7, wherein the controller is further configured to: compare a total number of wet events occurring within a measurement period to a threshold number of wet events for the measurement period; and determine that a flood event has occurred when the total number of wet events occurring within a measurement period meets or exceeds the threshold number of wet events for the measurement period.

Example 11: This example includes any or all of the elements of example 10, further including communications circuitry (COMMS), wherein the controller is configured to cause the COMMS to issue a flood notification via a wired or wireless communication protocol in response to detection of a flood event.

Example 12: This example includes any or all of the elements of example 8, further including a calibration module in communication with the controller, wherein: the calibration module is configured to cause the controller to establish a baseline capacitance within the liquid flow path; and the controller is configured to set the capacitance threshold relative to the baseline capacitance.

Example 13: This example includes any or all of the elements of example 12, wherein the electronics module includes the calibration module.

Example 14: This example includes any or all of the elements of example 12, wherein the calibration module includes a calibration button, wherein actuation of the calibration button causes the calibration module to establish the baseline capacitance based at least in part on the detection signal provided by the sensor element.

Example 15: According to this example there is provided a method of fluid detection, including, with a fluid detection system including a sensor module and an electronics module, the sensor module including a sensor housing, a liquid flow path extending through the sensor housing, and a sensor element disposed at least partially around a perimeter of the liquid flow path, the electronics module including a controller communicatively coupled to the sensor element: detecting, with the sensor element, a capacitance within the liquid flow path; conveying a sensor signal indicative of the capacitance to the controller; determining a detected capacitance within the liquid flow path with the controller; comparing, with the controller, the detected capacitance to a capacitance threshold; and determining, with the controller, whether a wet event has occurred in the liquid flow path based at least in part on the comparing the detected capacitance to the capacitance threshold.

Example 16: This example includes any or all of the elements of example 15, wherein the fluid detection system further includes an air flow path extending through the sensor housing, and at least a portion of the liquid flow path and at least a portion of the air flow path extend parallel or substantially parallel to each other.

Example 17: This example includes any or all of the elements of example 15, wherein the electronics module is physically coupled to the sensor housing such that the sensor element is communicatively coupled to the controller.

Example 18: This example includes any or all of the elements of example 15, wherein the controller is to determine that a wet event has occurred with the detected capacitance is less than or equal to the capacitance threshold.

Example 19: This example includes any or all of the elements of example 18, further including, with the controller: comparing a total number of wet events occurring within a measurement period to a threshold number of wet events for the measurement period; and determining that a flood event has occurred when the total number of wet events occurring within a measurement period meets or exceeds the threshold number of wet events for the measurement period.

Example 20: This example includes any or all of the elements of example 19, wherein the fluid detection system if communicatively coupled to communications circuitry (COMMS), and the method further includes: causing, with the controller, the COMMS to issue a flood notification via wired or wireless communication when the controller determines that a flood event has occurred.

Example 21: This example includes any or all of the elements of example 15, wherein the fluid detection system further includes a calibration module in communication with the controller, and the method further includes: causing, with the calibration module, the controller to establish a baseline capacitance within the liquid flow path based at least in part on the sensor signal provided by the sensor element; and setting, with the controller, the capacitance threshold relative to the baseline capacitance.

Example 22: This example includes any or all of the elements of example 21, wherein the electronics module includes the calibration module.

Example 23: This example includes any or all of the elements of example 21, wherein the calibration module includes a calibration button, wherein actuation of the calibration button causes the calibration module to establish the baseline capacitance.

Example 24: This example includes any or all of the elements of example 21, wherein the capacitance threshold is offset above the baseline capacitance by a predetermined margin.

Example 25: According to this example there is provided a fluid detection system, including: a sensor module including: a sensor base; a sensor cover coupled to the sensor base; and a sensor element; wherein: the sensor element is configured to detect a capacitance within a liquid flow path from a position outside the liquid flow path and to communicatively couple to a controller of an electronics module including a pin; and the sensor base or the sensor housing includes: a first cavity configured to house at least a portion of the sensor element; a second cavity configured to couple with an electronics module; and at least one divider to separate the first cavity from the second cavity, the divider including an opening to facilitate coupling of the sensor element with the pin of the electronics module.

Example 26: This example includes any or all of the features of example 25, further including the electronics module including the controller and the pin, wherein: the electronics module is coupled to the second cavity; and at least a portion of the pin extends through the opening in the at least one divider to electrically couple to the sensor element.

Example 27: This example includes any or all of the features of example 26, wherein: the sensor module further includes a conduit part including an outward facing surface and an inward facing surface, the inward facing surface of the conduit part defining at least a portion of the liquid flow path; and the sensor element is disposed around the outward facing surface of the conduit part.

Example 28: This example includes any or all of the features of example 27, wherein the sensor base and sensor cover at least partially define a passageway through which the conduit part extends.

Example 29: This example includes any or all of the features of example 27, wherein the sensor element includes a metal band.

Example 30: This example includes any or all of the features of example 26, wherein the pin is a spring loaded pin.

Example 31: This example includes any or all of the features of example 25, further including the electronics module including the controller and the pin, wherein: a proximal portion of the sensor element extends from the first cavity through the opening and into the second cavity; and the electronics module is coupled to the second cavity such that at least a proximal portion of the pin contacts the proximal portion of the sensor element.

Example 32: This example includes any or all of the features of example 31, wherein at least a portion of the liquid flow path is defined by an inner wall of the sensor cover.

Example 33: This example includes any or all of the features of example 31, wherein: the sensor cover includes the first cavity and the second cavity; the sensor cover includes a sensor channel around the liquid flow path; and at least a distal portion of the sensor element is disposed in the sensor channel.

Example 34: This example includes any or all of the features of example 33, wherein: the sensor base includes a base cavity; the electronics module includes an electronics base including a first receptacle; the base cavity and the second cavity at least partially define a second receptacle; and the electronics module is coupled to sensor module by coupling the first receptacle to the second receptacle.

Example 35: This example includes any or all of the features of example 34, wherein the electronics module is coupled to the sensor module by receiving the second receptacle in the first receptacle.

Example 36: This example includes any or all of the features of example 31, wherein the sensor element includes a first bend in the first cavity and a second bend in the second cavity.

Example 37: This example includes any or all of the features of example 32, wherein the sensor cover further includes at least one standoff to position the distal portion of the sensor element in the sensor channel.

Example 38: This example includes any or all of the features of example 32, wherein: the sensor cover includes a cover outer wall and a cover inner wall; the cover inner wall defines at least a portion of the liquid flow path; and the at least one divider includes first and second dividers that each extend from the cover outer wall.

Example 39: This example includes any or all of the features of example 32, wherein the pin is a spring loaded pin.

Example 40: This example includes any or all of the features of example 26, wherein: the sensor cover includes a cover inner wall that defines at least a portion of a cover passageway extending through the sensor cover; at least a portion of the sensor base is disposed through the cover passageway; and at least a portion of the sensor element is disposed between the cover inner wall and an outer wall of the sensor base.

Example 41: This example includes any or all of the features of example 40, wherein the outer wall of the sensor base includes a recessed region and at least a portion of the sensor element is disposed within the recessed region.

Example 42: This example includes any or all of the features of example 41, wherein the outer wall of the sensor base further includes a step proximate the recessed region.

Example 43: This example includes any or all of the features of example 40, wherein the cover inner wall includes a gap, and at least a proximal portion of the sensor element extends through the gap into the first cavity.

Example 44: This example includes any or all of the features of example 43, wherein: the proximal portion of the sensor element is coupled to a sensor printed circuit board including a sensor terminal; and the sensor PCB is configured to align at least the sensor terminal with the opening; and the pin is electrically coupled to the sensor terminal.

Example 45: This example includes any or all of the features of example 44, wherein the pin is a spring loaded pin.

As used herein the term "about" when used in connection with a value or a range, means+/−5% of said value or said range.

"Circuitry", as used in any embodiment herein, may comprise, for example, singly or in any combination, hard-wired circuitry, programmable circuitry such as computer processors comprising one or more individual instruction processing cores, data machine circuitry, software and/or firmware that stores instructions executed by programmable circuitry.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A fluid detection system, comprising:
a sensor module comprising:
a sensor base;
a sensor cover removably coupled to the sensor base; and
a sensor element; and
a conduit part comprising an outward facing surface and an inward facing surface, the inward facing surface of the conduit part defining at least a portion of said liquid flow path;
wherein:
the sensor element comprising at least one continuous conductor configured to detect a capacitance within a liquid flow path from a position outside the liquid flow path and to communicatively couple to a controller of an electronics module comprising a pin, the at least one continuous conductor configured to extend around substantially all of the outward facing surface of the conduit part; and
wherein the sensor base and sensor cover at least partially define a passageway through which the conduit part extends, the sensor base or the sensor cover comprising:
a first cavity configured to house at least a portion of the sensor element;
a second cavity configured to couple with an electronics module; and
at least one divider to separate the first cavity from the second cavity, the divider comprising an opening to facilitate coupling of the sensor element with the pin of the electronics module.

2. The fluid detection system of claim 1, further comprising the electronics module comprising said controller and said pin, wherein:
the electronics module is coupled to the second cavity; and
at least a portion of the pin extends through the opening in the at least one divider to electrically couple to said sensor element.

3. The fluid detection system of claim 2, wherein said pin is a spring loaded pin.

4. The fluid detection system of claim 2, wherein:
said sensor cover comprises a cover inner wall that defines at least a portion of a cover passageway extending through the sensor cover;
at least a portion of the sensor base is disposed through the cover passageway; and
at least a portion of the at least one conductor is disposed between the cover inner wall and an outer wall of the sensor base.

5. The fluid detection system of claim 4, wherein the outer wall of the sensor base comprises a recessed region and at least a portion of the at least one conductor is disposed within the recessed region.

6. The fluid detection system of claim 5, wherein the outer wall of the sensor base further comprises a step proximate the recessed region.

7. The fluid detection system of claim 4, wherein the cover inner wall comprises a gap, and at least a proximal portion of the sensor element extends through the gap into the first cavity.

8. The fluid detection system of claim 7, wherein:
the proximal portion of the at least one conductor is coupled to a sensor printed circuit board comprising a sensor terminal; and
the sensor PCB is configured to align at least the sensor terminal with the opening; and
the pin is electrically coupled to the sensor terminal.

9. The fluid detection system of claim 8, wherein the pin is a spring loaded pin.

10. The fluid detection system of claim 1, wherein the at least one conductor comprises a metal band.

11. The fluid detection system of claim 1, further comprising the electronics module comprising said controller and said pin, wherein:
- a proximal portion of the sensor element extends from the first cavity through the opening and into the second cavity; and
- the electronics module is coupled to the second cavity such that at least a proximal portion of the pin contacts the proximal portion of the sensor element.

12. The fluid detection system of claim 11, wherein at least a portion of the liquid flow path is defined by an inner wall of said sensor cover.

13. The fluid detection system of claim 12, wherein the sensor cover further comprises at least one standoff to position the distal portion of the sensor element in the sensor channel.

14. The fluid detection system of claim 12, wherein:
- the sensor cover comprises a cover outer wall and a cover inner wall;
- the cover inner wall defines at least a portion of the liquid flow path; and
- the at least one divider comprises first and second dividers that each extend from the cover outer wall.

15. The fluid detection system of claim 12, wherein said pin is a spring loaded pin.

16. The fluid detection system of claim 11, wherein:
- said sensor cover comprises the first cavity and the second cavity;
- the sensor cover comprises a sensor channel around the liquid flow path; and
- at least a distal portion of the at least one conductor is disposed in the sensor channel.

17. The fluid detection system of claim 16, wherein:
- the sensor base comprises a base cavity;
- the electronics module comprises an electronics base comprising a first receptacle;
- the base cavity and the second cavity at least partially define a second receptacle; and
- the electronics module is coupled to sensor module by coupling the first receptacle to the second receptacle.

18. The fluid detection system of claim 17, wherein the electronics module is coupled to the sensor module by receiving the second receptacle in the first receptacle.

19. The fluid detection system of claim 11, wherein the at least one conductor comprises a first bend in the first cavity and a second bend in the second cavity.

* * * * *